(12) United States Patent
Spanier et al.

(10) Patent No.: US 11,641,052 B2
(45) Date of Patent: *May 2, 2023

(54) WIRELESS INTELLIGENT ELECTRONIC DEVICE

(71) Applicant: Electro Industries/Gauge Tech, Westbury, NY (US)

(72) Inventors: Joseph Spanier, Brooklyn, NY (US); Tibor Banhegyesi, Northport, NY (US); Edward Martinez, Roosevelt, NY (US)

(73) Assignee: EI Electronics LLC, Westbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/232,366

(22) Filed: Apr. 16, 2021

(65) Prior Publication Data

US 2021/0232185 A1 Jul. 29, 2021

Related U.S. Application Data

(63) Continuation of application No. 16/101,936, filed on Aug. 13, 2018, now Pat. No. 11,009,922, which is a
(Continued)

(51) Int. Cl.
*G06F 1/16* (2006.01)
*H01Q 1/22* (2006.01)
(Continued)

(52) U.S. Cl.
CPC ......... *H01Q 1/2233* (2013.01); *G06F 1/1683* (2013.01); *G06F 1/1698* (2013.01);
(Continued)

(58) Field of Classification Search
CPC ... G06F 1/1683; G06F 1/1698; H01Q 1/2233; H01Q 1/243; H01Q 1/38; H01Q 21/28;
(Continued)

(56) References Cited

U.S. PATENT DOCUMENTS

D56,045 S 8/1920 White
D76,149 S 2/1924 Olsen
(Continued)

FOREIGN PATENT DOCUMENTS

CA 2299044 A 2/2001
DE 3636817 A1 5/1988
(Continued)

OTHER PUBLICATIONS

Anderson, D., USB System Architecture, Nov. 2000, Addison-Wesley Professional, 9th Printing, pp. 22-23.
(Continued)

*Primary Examiner* — Hirdepal Singh
(74) *Attorney, Agent, or Firm* — Michael J Porco

(57) ABSTRACT

An intelligent electronic device (IED) is provided. The IED includes a metering sub-assembly and an input base module sub-assembly. The metering sub-assembly is hinged to the input base module sub-assembly, where when in an open position, various cables, connectors, and input/output cards/modules are accessible. Various input/output cards/modules are interchangeable to add/change functionality and/or communication capabilities to the IED. In one embodiment, a communication card is provided with at least one antenna disposed internal or external to a housing of the IED.

25 Claims, 65 Drawing Sheets

Related U.S. Application Data continuation-in-part of application No. 15/218,984, filed on Jul. 25, 2016, now Pat. No. 10,048,088, and a continuation-in-part of application No. 15/056,537, filed on Feb. 29, 2016, now Pat. No. 9,897,461.

(60) Provisional application No. 62/196,719, filed on Jul. 24, 2015, provisional application No. 62/126,049, filed on Feb. 27, 2015.

(51) Int. Cl.
- *H01Q 1/24* (2006.01)
- *H01Q 1/38* (2006.01)
- *H01Q 21/28* (2006.01)
- *H02J 50/05* (2016.01)
- *H02J 50/10* (2016.01)

(52) U.S. Cl.
CPC .............. *H01Q 1/243* (2013.01); *H01Q 1/38* (2013.01); *H01Q 21/28* (2013.01); *H02J 50/05* (2016.02); *H02J 50/10* (2016.02)

(58) Field of Classification Search
CPC .. H02J 50/40; H02J 50/05; H02J 50/10; H02J 50/005
USPC .......................................... 455/575.1; 340/870
See application file for complete search history.

(56) References Cited

U.S. PATENT DOCUMENTS

| | | |
|---|---|---|
| 1,705,301 A | 3/1929 | Miller |
| 1,863,741 A | 6/1932 | Leon |
| 2,105,369 A | 1/1938 | Paton |
| 2,292,163 A | 8/1942 | Shea |
| 2,902,629 A | 9/1959 | Little et al. |
| D187,740 S | 4/1960 | Littlejohn |
| 3,002,481 A | 10/1961 | Hutters |
| D199,808 S | 12/1964 | Road |
| D201,100 S | 5/1965 | Little |
| 3,355,630 A | 11/1967 | Orr |
| 3,391,384 A | 7/1968 | Hughes |
| 3,496,420 A | 2/1970 | Leonard et al. |
| 3,541,225 A | 11/1970 | Raciti |
| 3,656,112 A | 4/1972 | Paull |
| 3,780,433 A | 12/1973 | Lynch |
| 3,796,953 A | 3/1974 | Zisa et al. |
| 3,880,494 A | 4/1975 | Reed et al. |
| 3,915,546 A | 10/1975 | Cobaugh et al. |
| 3,943,413 A | 3/1976 | Keever |
| D241,006 S | 8/1976 | Wallace |
| 3,989,334 A | 11/1976 | Fortino |
| 3,991,347 A | 11/1976 | Hollyday |
| 4,034,290 A | 7/1977 | Warren |
| 4,050,621 A | 9/1977 | Bouley |
| 4,072,385 A | 2/1978 | Wallner |
| 4,092,592 A | 5/1978 | Milkovic |
| 4,121,147 A | 10/1978 | Becker et al. |
| 4,259,746 A | 3/1981 | Sandstedt |
| 4,264,960 A | 4/1981 | Gurr |
| 4,298,839 A | 11/1981 | Johnston |
| 4,393,438 A | 7/1983 | Schelhorn |
| 4,400,783 A | 8/1983 | Locke, Jr. et al. |
| D273,574 S | 4/1984 | Overs |
| 4,455,612 A | 6/1984 | Girgis et al. |
| 4,477,970 A | 10/1984 | Alexander et al. |
| 4,542,469 A | 9/1985 | Brandyberry et al. |
| 4,571,691 A | 2/1986 | Kennon |
| 4,592,137 A | 6/1986 | Tanaka et al. |
| 4,609,247 A | 9/1986 | Annoot |
| 4,744,004 A | 5/1988 | Hammond |
| 4,791,362 A | 12/1988 | Philpot |
| 4,839,819 A | 6/1989 | Begin et al. |
| 4,843,311 A | 6/1989 | Rozman et al. |
| 4,851,614 A | 7/1989 | Duncan, Jr. |
| 4,886,981 A | 12/1989 | Lentini et al. |
| 4,959,607 A | 9/1990 | Coryea et al. |
| 5,012,301 A | 4/1991 | Xu et al. |
| 5,014,213 A | 5/1991 | Edwards et al. |
| 5,021,763 A | 6/1991 | Obear |
| D332,923 S | 2/1993 | Polydoris et al. |
| 5,207,595 A | 5/1993 | Learmont et al. |
| 5,229,713 A | 7/1993 | Bullock et al. |
| 5,233,131 A | 8/1993 | Liang et al. |
| 5,243,338 A | 9/1993 | Brennan, Jr. et al. |
| 5,271,548 A | 12/1993 | Maiwald |
| D343,786 S | 2/1994 | Hines et al. |
| 5,315,527 A | 5/1994 | Beckwith |
| D348,019 S | 6/1994 | Kocol et al. |
| 5,326,937 A | 7/1994 | Watanabe |
| 5,345,225 A | 9/1994 | Davis |
| 5,347,464 A | 9/1994 | McEachern et al. |
| 5,364,290 A | 11/1994 | Hartman |
| 5,385,486 A | 1/1995 | Robinson et al. |
| 5,390,078 A | 2/1995 | Taylor |
| 5,402,314 A | 3/1995 | Amago et al. |
| 5,412,166 A | 5/1995 | Krupp et al. |
| 5,414,223 A | 5/1995 | Suski et al. |
| D366,434 S | 1/1996 | Brown, III et al. |
| 5,514,953 A | 5/1996 | Schultz et al. |
| 5,514,959 A | 5/1996 | Horan et al. |
| 5,530,846 A | 6/1996 | Strong |
| 5,539,304 A | 7/1996 | Payne et al. |
| 5,544,064 A | 8/1996 | Beckwith |
| 5,548,209 A | 8/1996 | Lusignan et al. |
| 5,556,308 A | 9/1996 | Brown et al. |
| 5,559,719 A | 9/1996 | Johnson et al. |
| 5,567,181 A | 10/1996 | Lentz et al. |
| 5,571,031 A | 11/1996 | Robinson et al. |
| 5,574,654 A | 11/1996 | Bingham et al. |
| 5,581,173 A | 12/1996 | Yalla et al. |
| 5,581,470 A | 12/1996 | Pawloski |
| 5,600,526 A | 2/1997 | Russell et al. |
| 5,620,337 A | 4/1997 | Pruehs |
| D381,281 S | 7/1997 | Miller et al. |
| 5,646,373 A | 7/1997 | Collins et al. |
| 5,650,936 A | 7/1997 | Loucks et al. |
| 5,661,623 A | 8/1997 | McDonald et al. |
| 5,704,535 A | 1/1998 | Thompson |
| 5,706,204 A | 1/1998 | Cox et al. |
| 5,715,438 A | 2/1998 | Silha |
| 5,736,847 A | 4/1998 | Doorn et al. |
| 5,742,512 A | 4/1998 | Edge et al. |
| 5,745,114 A | 4/1998 | King et al. |
| 5,764,523 A | 6/1998 | Yoshinaga et al. |
| 5,774,336 A | 6/1998 | Larson |
| 5,774,366 A | 6/1998 | Beckwith |
| 5,801,643 A | 9/1998 | Williams et al. |
| 5,819,203 A | 10/1998 | Moore et al. |
| 5,822,165 A | 10/1998 | Moran |
| 5,828,576 A | 10/1998 | Loucks et al. |
| 5,832,210 A | 11/1998 | Akiyama et al. |
| 5,834,932 A | 11/1998 | May |
| 5,861,742 A | 1/1999 | Miller et al. |
| 5,862,391 A | 1/1999 | Salas et al. |
| 5,874,903 A | 2/1999 | Shuey et al. |
| 5,892,758 A | 4/1999 | Argyroudis |
| 5,897,661 A | 4/1999 | Baranovsky et al. |
| 5,898,387 A | 4/1999 | Davis et al. |
| 5,899,960 A | 5/1999 | Moore et al. |
| 5,930,117 A | 7/1999 | Gengel |
| 5,933,004 A | 8/1999 | Jackson et al. |
| 5,958,060 A | 9/1999 | Premerlani |
| 5,963,146 A | 10/1999 | Johnson et al. |
| 5,973,481 A | 10/1999 | Thompson et al. |
| 5,978,655 A | 11/1999 | Ohura et al. |
| 5,986,574 A | 11/1999 | Colton |
| 5,995,911 A | 11/1999 | Hart |
| 5,997,347 A | 12/1999 | Robinson et al. |
| 6,000,034 A | 12/1999 | Lightbody et al. |
| 6,008,711 A | 12/1999 | Bolam |
| 6,011,519 A | 1/2000 | Sadler et al. |
| 6,015,314 A | 1/2000 | Benfante |

(56) References Cited

U.S. PATENT DOCUMENTS

| | | |
|---|---|---|
| 6,018,690 A | 1/2000 | Saito et al. |
| 6,018,700 A | 1/2000 | Edel |
| 6,038,516 A | 3/2000 | Alexander et al. |
| 6,043,642 A | 3/2000 | Martin et al. |
| 6,043,986 A | 3/2000 | Kondo et al. |
| 6,049,791 A | 4/2000 | Lerner |
| 6,073,169 A | 6/2000 | Shuey et al. |
| D427,533 S | 7/2000 | Cowan et al. |
| D429,655 S | 8/2000 | Cowan et al. |
| 6,098,175 A | 8/2000 | Lee |
| 6,100,817 A | 8/2000 | Mason, Jr. et al. |
| 6,124,806 A | 9/2000 | Cunningham et al. |
| D435,471 S | 12/2000 | Simbeck et al. |
| 6,157,329 A | 12/2000 | Lee et al. |
| 6,172,616 B1 | 1/2001 | Johnson et al. |
| 6,177,884 B1 | 1/2001 | Hunt et al. |
| 6,181,294 B1 | 1/2001 | Porter et al. |
| 6,183,274 B1 | 2/2001 | Allum |
| 6,185,508 B1 | 2/2001 | Doorn et al. |
| 6,186,842 B1 | 2/2001 | Hirschbold et al. |
| 6,195,614 B1 | 2/2001 | Kochan |
| D439,535 S | 3/2001 | Cowan et al. |
| 6,236,949 B1 | 5/2001 | Hart |
| D443,541 S | 6/2001 | Hancock et al. |
| 6,271,523 B1 | 8/2001 | Weaver et al. |
| 6,289,267 B1 | 9/2001 | Alexander et al. |
| 6,304,517 B1 | 10/2001 | Ledfelt et al. |
| 6,316,932 B1 | 11/2001 | Horan et al. |
| 6,363,057 B1 | 3/2002 | Ardalan et al. |
| D455,066 S | 4/2002 | Kolinen |
| 6,396,839 B1 | 5/2002 | Ardalan et al. |
| 6,397,155 B1 | 5/2002 | Przydatek et al. |
| D458,863 S | 6/2002 | Harding et al. |
| D459,259 S | 6/2002 | Harding et al. |
| 6,407,357 B1 | 6/2002 | Bellino et al. |
| 6,429,785 B1 | 8/2002 | Griffin et al. |
| 6,437,692 B1 | 8/2002 | Petite et al. |
| 6,462,713 B2 | 10/2002 | Porter et al. |
| 6,476,595 B1 | 11/2002 | Heuell et al. |
| 6,476,729 B1 | 11/2002 | Liu |
| 6,493,644 B1 | 12/2002 | Jonker et al. |
| 6,513,091 B1 | 1/2003 | Blackmon et al. |
| 6,519,537 B1 | 2/2003 | Yang |
| 6,528,957 B1 | 3/2003 | Luchaco |
| 6,538,577 B1 | 3/2003 | Ehrke et al. |
| 6,555,997 B1 | 4/2003 | Vries et al. |
| 6,557,552 B1 | 5/2003 | Cox et al. |
| 6,561,844 B1 | 5/2003 | Johnson |
| 6,563,697 B1 | 5/2003 | Simbeck et al. |
| 6,563,705 B1 | 5/2003 | Kuo |
| 6,611,773 B2 | 8/2003 | Przydatek et al. |
| 6,611,922 B2 | 8/2003 | Ozcetin et al. |
| 6,615,147 B1 | 9/2003 | Jonker et al. |
| 6,636,030 B1 | 10/2003 | Rose et al. |
| 6,654,842 B1 | 11/2003 | Park |
| 6,657,424 B1 | 12/2003 | Voisine et al. |
| 6,657,552 B2 | 12/2003 | Belski et al. |
| 6,671,635 B1 | 12/2003 | Forth et al. |
| 6,671,654 B1 | 12/2003 | Forth et al. |
| 6,671,802 B1 | 12/2003 | Ott |
| 6,677,742 B1 | 1/2004 | Voisine et al. |
| 6,687,627 B1 | 2/2004 | Gunn et al. |
| 6,694,270 B2 | 2/2004 | Hart |
| 6,717,394 B2 | 4/2004 | Elms |
| 6,734,633 B2 | 5/2004 | Matsuba et al. |
| 6,734,663 B2 | 5/2004 | Fye et al. |
| 6,735,535 B1 | 5/2004 | Kagan et al. |
| 6,737,855 B2 | 5/2004 | Huber et al. |
| 6,745,138 B2 | 6/2004 | Przydatek et al. |
| 6,751,562 B1 | 6/2004 | Blackett et al. |
| 6,751,563 B2 | 6/2004 | Spanier et al. |
| 6,792,337 B2 | 9/2004 | Blackett et al. |
| 6,792,364 B2 | 9/2004 | Jonker et al. |
| 6,798,190 B2 | 9/2004 | Harding et al. |
| 6,798,191 B1 | 9/2004 | Macfarlane et al. |
| 6,804,357 B1 | 10/2004 | Ikonen et al. |
| 6,813,571 B2 | 11/2004 | Lightbody et al. |
| 6,824,391 B2 | 11/2004 | Mickievicz et al. |
| 6,825,776 B2 | 11/2004 | Lightbody et al. |
| 6,836,108 B1 | 12/2004 | Balko et al. |
| 6,836,737 B2 | 12/2004 | Petite et al. |
| 6,838,955 B1 | 1/2005 | Compton |
| 6,842,707 B2 | 1/2005 | Raichle et al. |
| 6,853,978 B2 | 2/2005 | Forth et al. |
| 6,871,150 B2 | 3/2005 | Huber et al. |
| 6,871,654 B1 | 3/2005 | Berke et al. |
| 6,873,836 B1 | 3/2005 | Sorrells et al. |
| 6,885,185 B1 | 4/2005 | Makinson et al. |
| D505,087 S | 5/2005 | Ricci et al. |
| 6,900,738 B2 | 5/2005 | Crichlow |
| 6,903,699 B2 | 6/2005 | Porter et al. |
| 6,944,555 B2 | 9/2005 | Blackett et al. |
| 6,957,158 B1 | 10/2005 | Hancock et al. |
| 6,961,641 B1 | 11/2005 | Forth et al. |
| 6,972,555 B2 | 12/2005 | Balko et al. |
| 6,982,490 B1 | 1/2006 | Dewey |
| 6,982,651 B2 | 1/2006 | Fischer |
| 6,983,211 B2 | 1/2006 | Macfarlene et al. |
| 6,985,087 B2 | 1/2006 | Soliman |
| 6,988,025 B2 | 1/2006 | Ransom et al. |
| 6,988,182 B2 | 1/2006 | Teachman et al. |
| 6,990,395 B2 | 1/2006 | Ransom et al. |
| 7,006,934 B2 | 2/2006 | Jonker et al. |
| 7,009,379 B2 | 3/2006 | Ramirez |
| 7,010,438 B2 | 3/2006 | Hancock et al. |
| 7,043,459 B2 | 5/2006 | Peevey |
| 7,049,975 B2 | 5/2006 | Vanderah et al. |
| 7,050,808 B2 | 5/2006 | Janusz et al. |
| 7,072,779 B2 | 7/2006 | Hancock et al. |
| D525,893 S | 8/2006 | Kagan et al. |
| D526,920 S | 8/2006 | Kagan et al. |
| 7,085,824 B2 | 8/2006 | Forth et al. |
| 7,089,089 B2 | 8/2006 | Cumming et al. |
| 7,127,328 B2 | 10/2006 | Ransom |
| D532,747 S | 11/2006 | Ricci et al. |
| 7,136,384 B1 | 11/2006 | Wang |
| D534,120 S | 12/2006 | Ricci et al. |
| 7,155,350 B2 | 12/2006 | Kagan |
| 7,158,050 B2 | 1/2007 | Lightbody et al. |
| 7,174,258 B2 | 2/2007 | Hart |
| 7,174,261 B2 | 2/2007 | Gunn et al. |
| 7,184,904 B2 | 2/2007 | Kagan |
| 7,188,003 B2 | 3/2007 | Ransom et al. |
| 7,191,076 B2 | 3/2007 | Huber et al. |
| 7,196,673 B2 | 3/2007 | Savage et al. |
| 7,216,043 B2 | 5/2007 | Ransom et al. |
| D545,181 S | 6/2007 | Kagan et al. |
| 7,243,050 B2 | 7/2007 | Armstrong |
| 7,246,014 B2 | 7/2007 | Forth et al. |
| 7,248,977 B2 | 7/2007 | Hart |
| 7,248,978 B2 | 7/2007 | Ransom |
| 7,249,265 B2 | 7/2007 | Carolsfeld et al. |
| 7,256,709 B2 | 8/2007 | Kagan |
| 7,265,532 B2 | 9/2007 | Karanam et al. |
| 7,271,996 B2 | 9/2007 | Kagan et al. |
| 7,274,187 B2 | 9/2007 | Loy |
| 7,294,997 B2 | 11/2007 | Kagan |
| 7,304,586 B2 | 12/2007 | Wang et al. |
| 7,305,310 B2 | 12/2007 | Slota et al. |
| 7,337,081 B1 | 2/2008 | Kagan |
| 7,417,419 B2 | 8/2008 | Tate |
| 7,554,320 B2 | 6/2009 | Kagan |
| 7,656,649 B2 | 2/2010 | Loy et al. |
| D615,895 S | 5/2010 | Beattie |
| 7,747,733 B2 | 6/2010 | Kagan |
| 7,868,782 B2 | 1/2011 | Ehrke et al. |
| 7,962,298 B2 | 6/2011 | Przydatek et al. |
| D642,083 S | 7/2011 | Blanc et al. |
| 7,994,934 B2 | 8/2011 | Kagan |
| D653,572 S | 2/2012 | Ohtani et al. |
| 8,126,665 B1 | 2/2012 | Whitson |
| 8,176,174 B2 | 5/2012 | Kagan |
| 8,177,580 B2 | 5/2012 | Feldman et al. |
| D666,933 S | 9/2012 | Hoffman et al. |

(56) References Cited

U.S. PATENT DOCUMENTS

| | | |
|---|---|---|
| 8,310,403 B2 | 11/2012 | Nahar |
| 8,325,057 B2 | 12/2012 | Salter |
| D682,720 S | 5/2013 | Kagan et al. |
| D682,721 S | 5/2013 | Kagan et al. |
| 8,442,660 B2 | 5/2013 | Kagan |
| 8,515,348 B2 | 8/2013 | Kagan |
| 8,587,949 B2 | 11/2013 | Banhegyesi et al. |
| D695,207 S | 12/2013 | Dams |
| D703,077 S | 4/2014 | Kagan et al. |
| D703,563 S | 4/2014 | Kagan et al. |
| 8,717,007 B2 | 5/2014 | Banhegyesi |
| 8,723,750 B2 | 5/2014 | Podduturi |
| D706,659 S | 6/2014 | Banhegyesi et al. |
| D706,660 S | 6/2014 | Banhegyesi et al. |
| D708,082 S | 7/2014 | Banhegyesi et al. |
| D708,533 S | 7/2014 | Banhegyesi et al. |
| D712,289 S | 9/2014 | Kagan et al. |
| D712,290 S | 9/2014 | Kagan et al. |
| D712,291 S | 9/2014 | Kagan et al. |
| D753,003 S | 4/2016 | Banhegyesi et al. |
| 9,891,253 B2 | 2/2018 | Kagan |
| 9,897,461 B2 | 2/2018 | Banhegyesi et al. |
| 9,921,245 B2 | 3/2018 | Loy |
| 10,048,088 B2 | 8/2018 | Spanier et al. |
| 10,066,999 B2 | 9/2018 | Loy et al. |
| 2001/0010689 A1 | 8/2001 | Awater et al. |
| 2001/0027500 A1 | 10/2001 | Matsunaga |
| 2001/0038343 A1 | 11/2001 | Meyer et al. |
| 2002/0018399 A1 | 2/2002 | Schultz et al. |
| 2002/0032535 A1 | 3/2002 | Alexander et al. |
| 2002/0054619 A1 | 5/2002 | Haas |
| 2002/0105435 A1 | 8/2002 | Yee et al. |
| 2002/0109608 A1 | 8/2002 | Petite et al. |
| 2002/0112183 A1 | 8/2002 | Baird et al. |
| 2002/0114326 A1 | 8/2002 | Mahalingaiah |
| 2002/0120723 A1 | 8/2002 | Forth et al. |
| 2002/0129342 A1 | 9/2002 | Kil et al. |
| 2002/0162014 A1 | 10/2002 | Przydatek et al. |
| 2002/0165677 A1 | 11/2002 | Lightbody et al. |
| 2002/0169570 A1 | 11/2002 | Spanier et al. |
| 2002/0172190 A1 | 11/2002 | Vatanen |
| 2003/0014200 A1 | 1/2003 | Jonker et al. |
| 2003/0065459 A1 | 4/2003 | Huber et al. |
| 2003/0093429 A1 | 5/2003 | Nishikawa et al. |
| 2003/0101008 A1 | 5/2003 | Hart |
| 2003/0105608 A1 | 6/2003 | Hart |
| 2003/0132742 A1 | 7/2003 | Harding et al. |
| 2003/0146839 A1 | 8/2003 | Ehlers et al. |
| 2003/0154471 A1 | 8/2003 | Teachman et al. |
| 2003/0167178 A1 | 9/2003 | Jarman et al. |
| 2003/0175025 A1 | 9/2003 | Watanabe et al. |
| 2003/0178982 A1 | 9/2003 | Elms |
| 2003/0187550 A1 | 10/2003 | Wilson et al. |
| 2003/0210699 A1 | 11/2003 | Holt et al. |
| 2003/0212512 A1 | 11/2003 | Hart |
| 2003/0220752 A1 | 11/2003 | Hart |
| 2003/0226058 A1 | 12/2003 | Miller et al. |
| 2004/0066311 A1 | 4/2004 | Giles et al. |
| 2004/0083066 A1 | 4/2004 | Hayes et al. |
| 2004/0113810 A1 | 6/2004 | Mason et al. |
| 2004/0122833 A1 | 6/2004 | Forth et al. |
| 2004/0128260 A1 | 7/2004 | Amedure et al. |
| 2004/0138786 A1 | 7/2004 | Blackett et al. |
| 2004/0138787 A1 | 7/2004 | Ransom et al. |
| 2004/0138835 A1 | 7/2004 | Ransom et al. |
| 2004/0150565 A1 | 8/2004 | Paun |
| 2004/0172207 A1 | 9/2004 | Hancock et al. |
| 2004/0177062 A1 | 9/2004 | Urquhart et al. |
| 2004/0183522 A1 | 9/2004 | Gunn et al. |
| 2004/0193329 A1 | 9/2004 | Ransom et al. |
| 2004/0203988 A1 | 10/2004 | Yang |
| 2004/0208182 A1 | 10/2004 | Boles et al. |
| 2004/0229578 A1 | 11/2004 | Lightbody et al. |
| 2004/0258135 A1 | 12/2004 | Higgins |
| 2005/0017874 A1 | 1/2005 | Lightbody et al. |
| 2005/0027464 A1 | 2/2005 | Jonker et al. |
| 2005/0060110 A1 | 3/2005 | Jones et al. |
| 2005/0065742 A1 | 3/2005 | Rodgers |
| 2005/0071106 A1 | 3/2005 | Huber et al. |
| 2005/0093571 A1 | 5/2005 | Suaris et al. |
| 2005/0184881 A1 | 8/2005 | Dusenberry et al. |
| 2005/0187725 A1 | 8/2005 | Cox |
| 2005/0210283 A1 | 9/2005 | Kato |
| 2005/0220079 A1 | 10/2005 | Asokan |
| 2005/0273280 A1 | 12/2005 | Cox |
| 2005/0273281 A1 | 12/2005 | Wall et al. |
| 2005/0275397 A1 | 12/2005 | Lightbody et al. |
| 2005/0288876 A1 | 12/2005 | Doig et al. |
| 2005/0288877 A1 | 12/2005 | Doig et al. |
| 2006/0047787 A1 | 3/2006 | Agarwal et al. |
| 2006/0052958 A1 | 3/2006 | Hancock et al. |
| 2006/0066903 A1 | 3/2006 | Shiimori |
| 2006/0070416 A1 | 4/2006 | Teratani |
| 2006/0071813 A1 | 4/2006 | Kagan |
| 2006/0077999 A1 | 4/2006 | Kagan et al. |
| 2006/0085419 A1 | 4/2006 | Rosen |
| 2006/0086893 A1 | 4/2006 | Spanier et al. |
| 2006/0145843 A1 | 7/2006 | Lin |
| 2006/0161400 A1 | 7/2006 | Kagan |
| 2006/0170409 A1 | 8/2006 | Kagan et al. |
| 2006/0200599 A1 | 9/2006 | Manchester et al. |
| 2006/0230394 A1 | 10/2006 | Forth et al. |
| 2006/0271244 A1 | 11/2006 | Cumming et al. |
| 2007/0057812 A1 | 3/2007 | Cornwall |
| 2007/0058634 A1 | 3/2007 | Gupta et al. |
| 2007/0067119 A1 | 3/2007 | Loewen et al. |
| 2007/0067121 A1 | 3/2007 | Przydatek et al. |
| 2007/0096765 A1* | 5/2007 | Kagan .................. G01R 22/063 |
| | | 455/41.2 |
| 2007/0096942 A1 | 5/2007 | Kagan et al. |
| 2007/0136010 A1 | 6/2007 | Gunn et al. |
| 2007/0190926 A1 | 8/2007 | Lu et al. |
| 2007/0285320 A1* | 12/2007 | Hayes .................... H01Q 21/28 |
| | | 343/702 |
| 2008/0046205 A1 | 2/2008 | Gilbert et al. |
| 2008/0065335 A1 | 3/2008 | Doig et al. |
| 2008/0202300 A1 | 8/2008 | Steidinger et al. |
| 2008/0238713 A1 | 10/2008 | Banhegyesi et al. |
| 2009/0168307 A1 | 7/2009 | Loy et al. |
| 2010/0036830 A1 | 2/2010 | Lee |
| 2011/0063172 A1 | 3/2011 | Podduturi |
| 2011/0151811 A1* | 6/2011 | Lagnado ................ H04B 1/006 |
| | | 455/150.1 |
| 2012/0010831 A1 | 1/2012 | Kagan |
| 2012/0075777 A1* | 3/2012 | Nehete ................... G01R 11/04 |
| | | 361/659 |
| 2013/0031201 A1 | 1/2013 | Kagan et al. |
| 2013/0120219 A1 | 5/2013 | Tikka et al. |
| 2013/0279049 A1 | 10/2013 | Fossen et al. |
| 2013/0297840 A1 | 11/2013 | Kagan et al. |
| 2013/0321240 A1 | 12/2013 | O'Shea et al. |
| 2014/0127935 A1 | 5/2014 | Scott et al. |
| 2014/0180613 A1 | 6/2014 | Banhegyesi et al. |
| 2015/0192625 A1 | 7/2015 | Sato |
| 2015/0310191 A1 | 10/2015 | Koval et al. |
| 2016/0146868 A1 | 5/2016 | Banhegyesi et al. |
| 2016/0370204 A1 | 12/2016 | Spanier et al. |
| 2017/0085969 A1* | 3/2017 | Sato ........................ G08C 17/00 |
| 2017/0117616 A1 | 4/2017 | Chen et al. |
| 2017/0344047 A1* | 11/2017 | Cioraca ................... G05B 15/02 |
| 2019/0041920 A1 | 2/2019 | Spanier et al. |

FOREIGN PATENT DOCUMENTS

| | | |
|---|---|---|
| JP | 621603 | 1/1994 |
| JP | 661630 | 3/1994 |
| JP | 0834263 | 2/1996 |
| WO | WO0101079 | 1/2001 |

OTHER PUBLICATIONS

BE1-951 Multifunction Protection System, Basler Electric, Sep. 2012 pp. 1-12.

(56) References Cited

OTHER PUBLICATIONS

Clark, Raymond H.; Printed Circuit Engineering: Optimizing for Manufacturability, 1989, pp. 34-35, 38-40, 163.
Embedded Flexible 4G LITE MIMO 2*2 Antenna, Specification; taoglas antenna solutions; pdf file date Sep. 21, 2014 pp. 1-21.
Ge Ku2 tm Malfunction Meter, Product Description, Operating Instructions, Maintenance Instructions, Upgrading, Site Analysis Guides, Diagrams, pp. 1-1-2-32, Dec. 2000.
Hwang, Jennie S.; Modern Solder Technology for Competitive Electronics Manufacturing (1996).
IEEE Standard Common Format for Transient Data Exchange, Oct. 15, 1999, IEEE, pp. 1-55.
Jemstar High Accuracy Revenue Meter For Generation, Transmission, and Industrial Power Measurement, Ametek Power Instruments, 2012, pp. 1-2.
Jemstar Retrofit For Generation, Transmission, and Industrial Power Measurement, Ametek Power Instruments, 2007, pp. 1-2.
Judd, Mike & Brindley, Keith; Soldering in Electronics Assembling (1992).
Lambert, Leo P.; Soldering for Electronic Assemblies (1988).
Lau, John H.; Solder Joint Reliability: Theory and Applications (1991).
Manko, Howard H.; Soldering Handbook for Printed Circuits and Surface Mounting (2nd ed. 1995).
Manko, Howard H.; Solders and Soldering (2d ed. 1979).
Mark-V EMS60 Intelligent Energy Meter, Advanced High-Accuracy Meter With Integrated Data Telemetry Solutions and Power Quality Monitoring, Transdata Energy Metering and Automation, 2010, pp. 1-2.
Nexus 1262/1272 High Performance Utility Billing Meters With Communication & Advanced Power Quality, Electro Industries/ Gaugetech, Jun. 21, 2012 pp. 1-12.
Nexus 1262/1272 Switchboard Meter Quick Start, Electro Industries-Gaugetech, Aug. 31, 2012, pp. 1-4.
Power Quality Standards Coordinating Committee, IEEE P1159.3/ D9 Draft: Recommended Practice for the Transfer of Power Quality Data, Aug. 1, 2002, IEEE Standards Activities Department, pp. 1-129.
Powerlogic ION8650, Schneider Electric, 2011, pp. 1-12.
Quantum (R) Q1000 "Sandy Creek Plant Lonworks (R) Communication" brochure, (c) Copyright 1997 Schlumberger Industries, Inc., MK/1662/9-97, pp. 1-4.
Rahn, Armin; The Basics of Soldering (1993).
Schlumberger "Quantum (R) Q100 Multimeasurement Meter Technical Reference Guide," Effective Oct. 1999, (c) Copyright 1999, Schlumberger Resource Management Services, Inc.
Schlumberger Electricity "One of your largest customers is concerned about power quality . . . " brochure, (c) Copyright 1996 Schlumberger Industries, Inc., pp. 1633/6-1633/96m pp. 1-5.
Singman, Andrew; Modern Electronics Soldering Techniques (2000).
Smith, H. Ted; Quality Hand Soldering and Circuit Board Repair (1994).
SQ7 2G/3G/4G/LTE Internal GSM PCB Antenna, Product Specification; Embedded Antenna Design, Ltd.; 2017, pp. 1-2.
Using Antenna Diversity to Create Highly Robust Radio Links; Silicon Labs, Austin, TX.; Copyright 2009, pp. 1-13.

\* cited by examiner

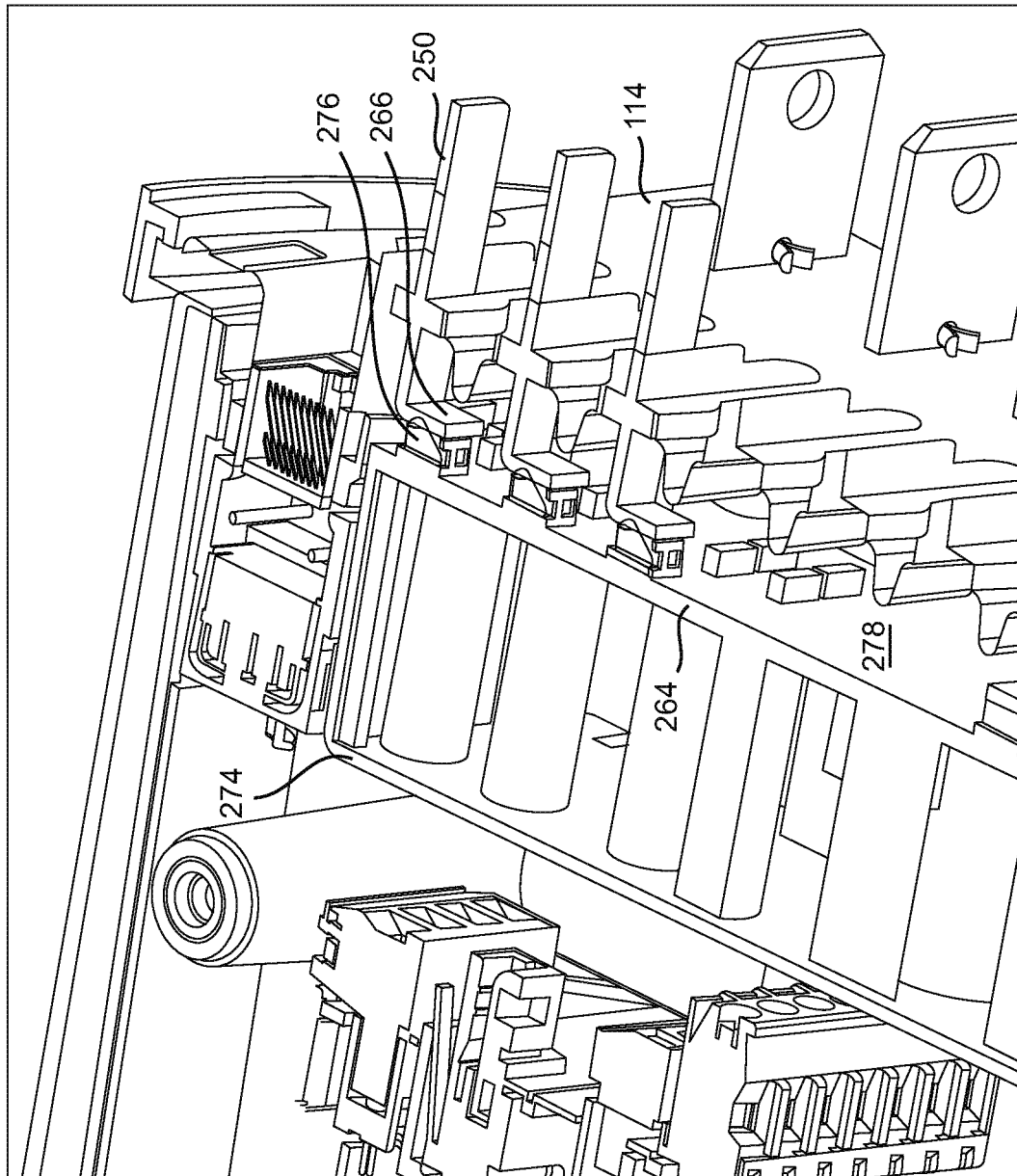

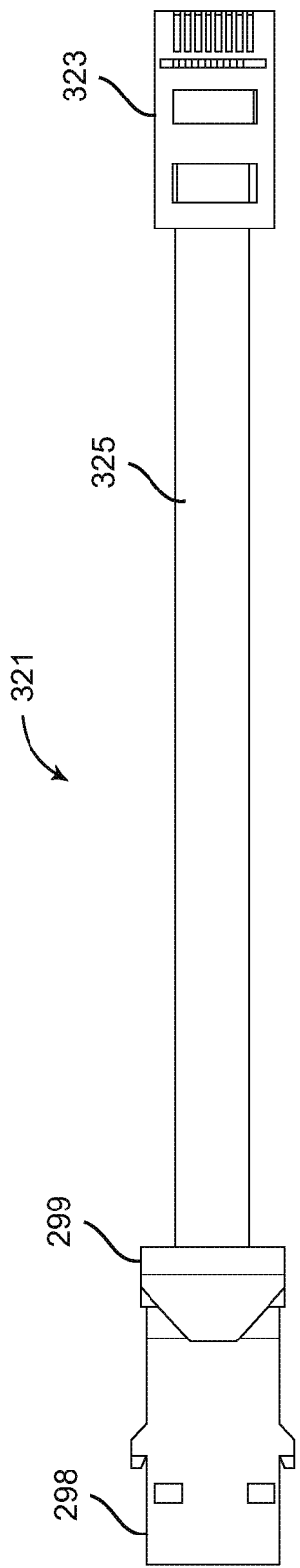
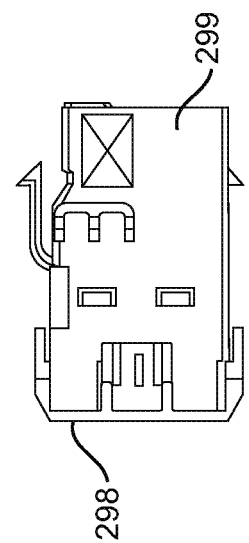
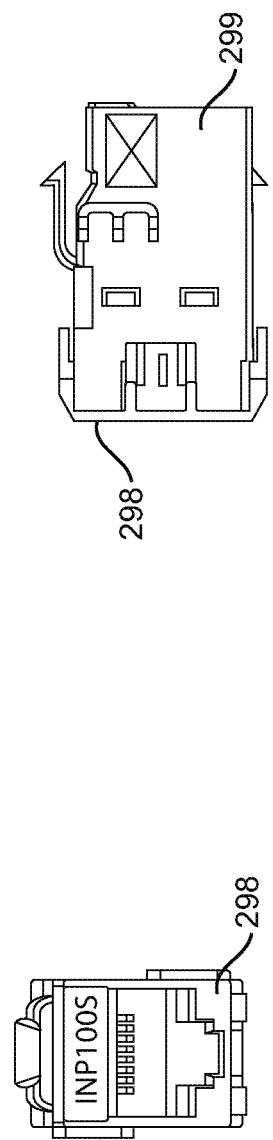
FIG. 23B
FIG. 23D
FIG. 23C

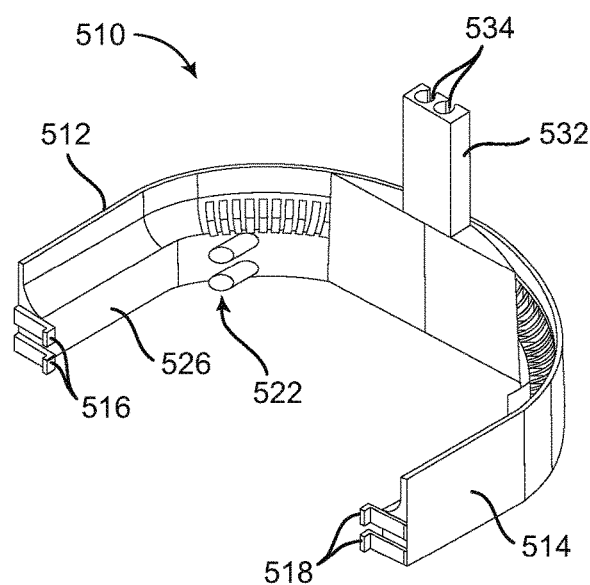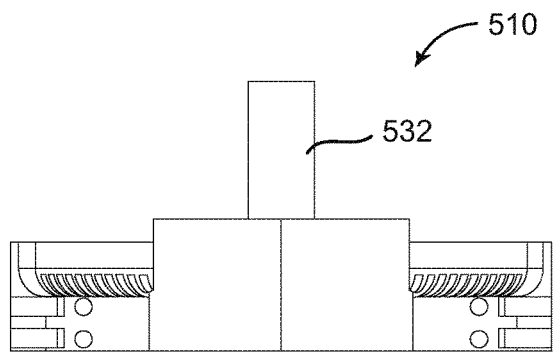
FIG. 31A
FIG. 31B
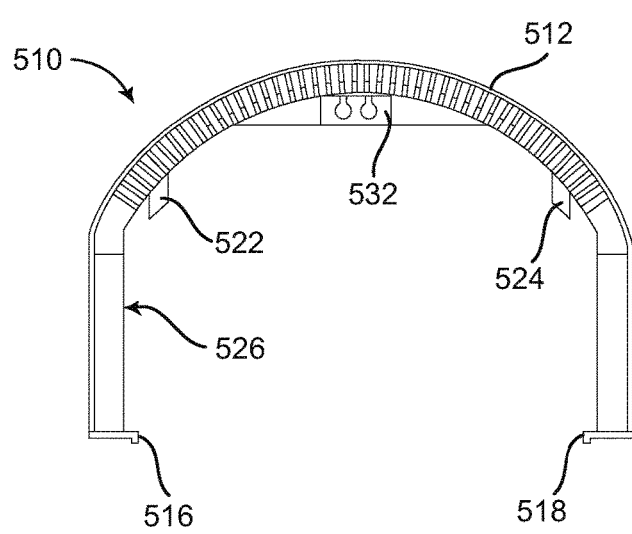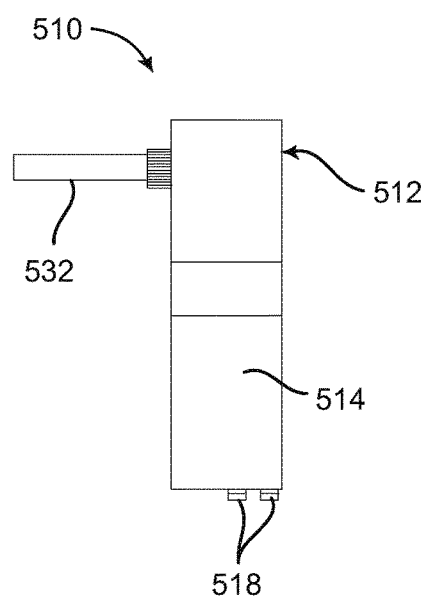
FIG. 31C
FIG. 31D

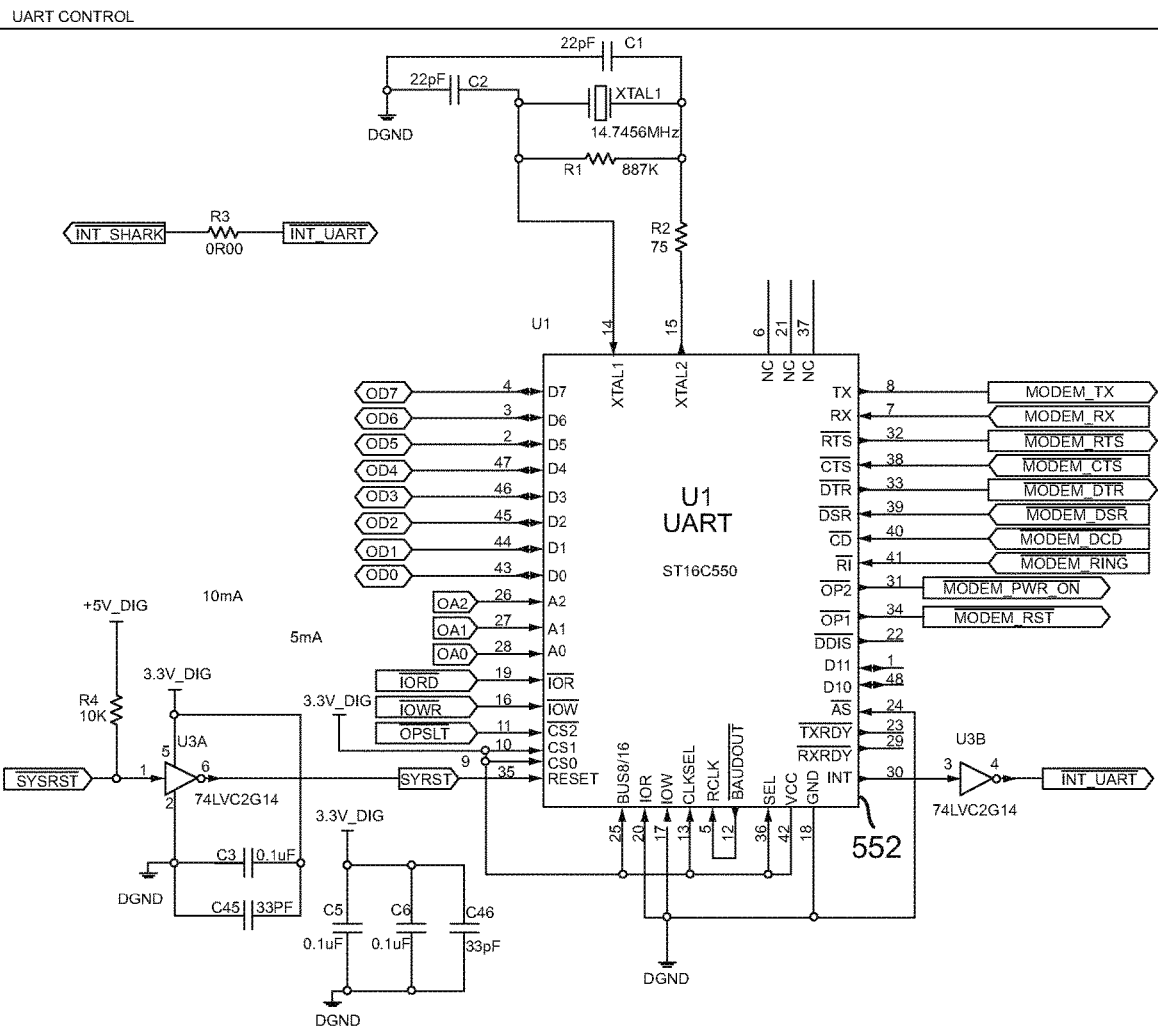
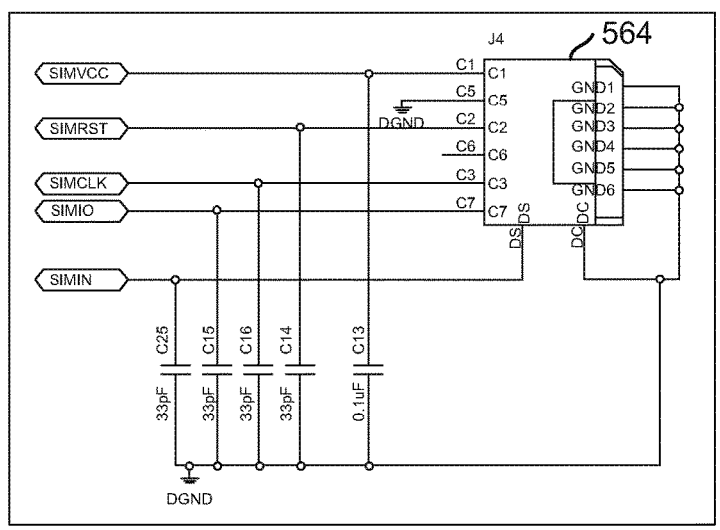
FIG.35B

WIRELESS INTELLIGENT ELECTRONIC DEVICE

PRIORITY

This application is a continuation-in-part application of U.S. patent application Ser. No. 15/218,984, filed Jul. 25, 2016, which claims priority to U.S. Provisional Patent Application No. 62/196,719, filed Jul. 24, 2015, entitled "WIRELESS INTELLIGENT ELECTRONIC DEVICE", the contents of which are hereby incorporated by reference in its entirety.

U.S. patent application Ser. No. 15/218,984 is also a continuation-in-part application of U.S. patent application Ser. No. 15/056,537, filed Feb. 29, 2016, U.S. now U.S. Pat. No. 9,897,461, which claims priority on U.S. Provisional Patent Appl. No. 62/126,049, filed Feb. 27, 2015, the content of all of which are hereby incorporated by reference in their entireties.

BACKGROUND

Field

The present disclosure relates generally to intelligent electronic devices (IEDs).

Description of the Related Art

Monitoring of electrical energy by consumers and providers of electric power is a fundamental function within any electric power distribution system. Electrical energy may be monitored for purposes of usage, equipment performance and power quality. Electrical parameters that may be monitored include volts, amps, watts, vars, power factor, harmonics, kilowatt hours, kilovar hours and any other power related measurement parameters. Typically, measurement of the voltage and current at a location within the electric power distribution system may be used to determine the electrical parameters for electrical energy flowing through that location.

Devices that perform monitoring of electrical energy may be electromechanical devices, such as, for example, a residential billing meter or may be an intelligent electronic device ("IED"). Intelligent electronic devices typically include some form of a processor. In general, the processor is capable of using the measured voltage and current to derive the measurement parameters. The processor operates based on a software configuration. A typical consumer or supplier of electrical energy may have many intelligent electronic devices installed and operating throughout their operations IEDs may be positioned along the supplier's distribution path or within a customer's internal distribution system. IEDs include revenue electric watt-hour meters, protection relays, programmable logic controllers, remote terminal units, fault recorders and other devices used to monitor and/or control electrical power distribution and consumption. IEDs are widely available that make use of memory and microprocessors to provide increased versatility and additional functionality. Such functionality includes the ability to communicate with remote computing systems, either via a direct connection, e.g., a modem, a wireless connection or a network IEDs also include legacy mechanical or electromechanical devices that have been retrofitted with appropriate hardware and/or software allowing integration with the power management system.

Typically, an IED is associated with a particular load or set of loads that are drawing electrical power from the power distribution system. The IED may also be capable of receiving data from or controlling its associated load. Depending on the type of IED and the type of load it may be associated with, the IED implements a power management function that is able to respond to a power management command and/or generate power management data. Power management functions include measuring power consumption, controlling power distribution such as a relay function, monitoring power quality, measuring power parameters such as phasor components, voltage or current, controlling power generation facilities, computing revenue, controlling electrical power flow and load shedding, or combinations thereof.

SUMMARY

An intelligent electronic device (IED) is provided.

In one aspect, an intelligent electronic device is configured as a socket type meter also known as a S-base type meter or type S meter. The meter includes a main housing surrounded by a cover. The cover is preferably made of a clear material to expose a display disposed on a bezel of the housing. In this configuration, the IED or meter may be referred to as a meter or IED under glass. An interface to access the display and a communication port is also provided and accessible through the cover. The meter further includes a plurality of current terminals and voltage terminals disposed on the backside of the meter extending through a base. The terminals are designed to mate with matching jaws of a detachable meter-mounting device, such as a revenue meter socket. The socket is hard wired to the electrical circuit and is not meant to be removed. To install an S-base meter, the utility need only plug in the meter into the socket. Once installed, a socket-sealing ring is used as a seal between the meter housing and/or cover and the meter socket to prevent removal of the meter and to indicate tampering with the meter.

In certain embodiments, the IED of the present disclosure includes a wireless communication device and associated antenna disposed under the cover, i.e., wireless under glass, cellular under glass, WiFi™ under glass, etc.

In accordance with one aspect of the present disclosure, an intelligent electronic device for monitoring power usage of an electrical circuit is provided including a housing; at least one sensor coupled to the electric circuit, the at least one sensor measures at least one parameter of the electrical circuit and generates at least one analog signal indicative of the at least one parameter; at least one analog to digital converter coupled to the at least one sensor, the at least one analog to digital converter receives the at least one analog signal and converts the at least one analog signal to at least one digital signal; at least one processor that receives the at least one digital signal and calculates at least one power parameter of the electrical circuit; and a communication device that receives the calculated at least one power parameter and wirelessly transmits the calculated at least one power parameter to a remote computing device, the communication device including at least one antenna disposed external to the housing.

In one aspect, the at least one antenna includes a main antenna and a diversity antenna.

In another aspect, the main antenna is disposed at a first position on the housing and the diversity antenna is disposed at a second position on the housing, the second position opposite the first position.

In a further aspect, each of the main antenna and diversity antenna is disposed in a channel on an outer surface of the housing.

In yet another aspect, an antenna holder is provided and configured to be coupled to an outer surface of the housing, the antenna holder retains the at least one antenna to the housing.

In one aspect, the antenna holder further comprises a mounting plate and a cover to retain the at least one antenna there between.

In another aspect, the at least one antenna is disposed on a flexible substrate.

In a further aspect, the housing includes at least one louver that dissipates heat from inside the housing, and the IED further includes an antenna holder that retains the at least one antenna, the antenna holder configured to be coupled to the at least one louver.

In another aspect, the housing is selected from the group consisting of a panel meter type housing, a switchboard type meter housing and a A-base type meter housing.

In accordance with a further aspect of the present disclosure, a socket based revenue meter includes a generally cylindrical housing; a base coupled to the housing including at least one terminal mateable with matching jaws of a detachable meter mounting device for connecting the meter to a power line of a power distribution system; a generally cylindrical cover having an open end and a closed end, the cover being disposed over the housing and the open end being mateable with the base; at least one sensor disposed in the housing and coupled to at least one terminal, the at least one sensor measures at least one parameter of the power line and generates at least one analog signal indicative of the at least one parameter; at least one analog to digital converter disposed in the housing and coupled to the at least one sensor, the at least one analog to digital converted receives the at least one analog signal and converts the at least one analog signal to at least one digital signal; at least one processor disposed in the housing, the at least one processor receives the at least one digital signal and calculates at least one power parameter in the electrical circuit; and a communication device disposed in the housing that receives the calculated at least one power parameter and wirelessly transmits the calculated at least one power parameter to a remote computing device, the communication device including at least one antenna disposed between the housing and the cover.

In another aspect, a main antenna is disposed at a first position on the housing and a diversity antenna is disposed at a second position on the housing, the second position opposite the first position.

In one aspect, the at least one antenna is disposed on an inner surface of the cover.

In a further aspect, the at least one antenna is transparent conductive ink.

According to a further aspect of the present disclosure, a socket based revenue meter is provided including a generally cylindrical housing; a base coupled to the housing including at least one terminal mateable with matching jaws of a detachable meter mounting device for connecting the meter to a power line of a power distribution system; a generally cylindrical cover having an open end and a closed end, the cover being disposed over the housing and the open end being mateable with the base; at least one sensor disposed in the housing and coupled to at least one terminal, the at least one sensor measures at least one parameter of the power line and generates at least one analog signal indicative of the at least one parameter; at least one analog to digital converter disposed in the housing and coupled to the at least one sensor, the at least one analog to digital converted receives the at least one analog signal and converts the at least one analog signal to at least one digital signal; at least one processor disposed in the housing, the at least one processor receives the at least one digital signal and calculates at least one power parameter in the electrical circuit; and a communication device disposed in the housing that receives the calculated at least one power parameter and wirelessly transmits the calculated at least one power parameter to a remote computing device, the communication device including at least one main antenna and diversity antenna.

In a further aspect, the communication device includes at least one processor, the at least one processor determines which of the main antenna and the diversity antenna is receiving the strongest signal and selects the antenna with the strongest received signal for a communication link.

In another aspect, the communication device includes at least one processor, the at least one processor combines received signals of the main antenna and the diversity antenna to produce a single signal.

In yet another aspect, the socket based revenue meter further includes at least one memory that stores a IP stack with TCP and/or UDP protocols.

In a further aspect, the at least one antenna has a working frequency in a range from about 698 MHz to about 3000 MHz.

BRIEF DESCRIPTION OF THE DRAWINGS

These and other objects, features and advantages of the present disclosure will be apparent from a consideration of the following Detailed Description considered in conjunction with the drawing Figures, in which:

FIG. 18 is a partial cross section of the input base module sub-assembly in accordance with an embodiment of the present disclosure.

FIG. 23B illustrates a patch cable in accordance with an embodiment of the present disclosure.

FIG. 23C is a front view of a connector of the patch cable shown in FIG. 23B.

FIG. 23D is a side view of the connector shown in FIG. 23C.

FIG. 31A is a perspective view of the antenna holder shown in FIG. 30.

FIG. 31B is a rear view of the antenna holder shown in FIG. 30.

FIG. 31C is a top view of the antenna holder shown in FIG. 30.

FIG. 31D is a side view of the antenna holder shown in FIG. 30.

FIGS. 35A, 35B and 35C (where FIG. 35C consists of FIGS. 35C-1 and 35C-2) illustrate a wiring schematic of the communication card shown in FIG. 34.

DETAILED DESCRIPTION

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links.

As used herein, intelligent electronic devices ("IEDs") can be any device that senses electrical parameters and computes data including, but not limited to, Programmable Logic Controllers ("PLC's"), Remote Terminal Units ("RTU's"), electric power meters, panel meters, protective relays, fault recorders, phase measurement units, serial switches, smart input/output devices and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power that they are metering.

Figure 1:
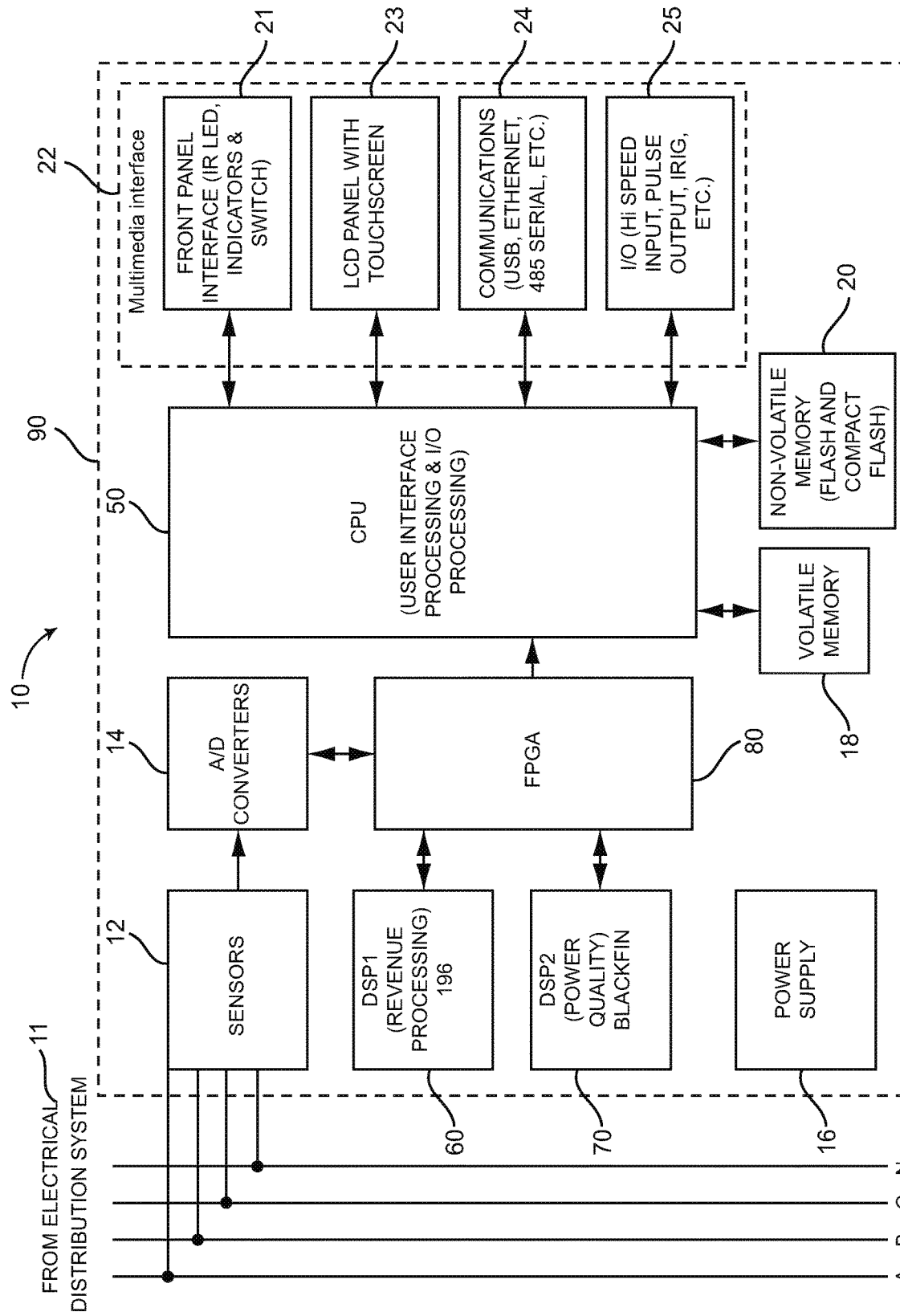
FIG. 1 is a block diagram of an intelligent electronic device (IED), according to an embodiment of the present disclosure.

FIG. 1 is a block diagram of an intelligent electronic device (IED) 10 for monitoring and determining power usage and power quality for any metered point within a power distribution system and for providing a data transfer system for faster and more accurate processing of revenue and waveform analysis.

The IED 10 of FIG. 1 includes a plurality of sensors 12 coupled to various phases A, B, C and neutral N of an electrical distribution system 11, a plurality of analog-to-digital (A/D) converters 14, including inputs coupled to the sensor 12 outputs, a power supply 16, a volatile memory 18, a non-volatile memory 20, a multimedia user interface 22, and a processing system that includes at least one of a central processing unit (CPU) 50 (or host processor) and one or more digital signal processors, two of which are shown, i.e., DSP1 60 and DSP2 70. The IED 10 also includes a Field Programmable Gate Array 80 which performs a number of functions, including, but not limited to, acting as a communications gateway for routing data between the various processors 50, 60, 70, receiving data from the A/D converters 14, performing transient detection and capture and performing memory decoding for CPU 50 and the DSP processor 60. In one embodiment, the FPGA 80 is internally comprised of two dual port memories to facilitate the various functions. It is to be appreciated that the various components shown in FIG. 1 are contained within housing 90. Exemplary housings will be described below in relation to FIGS. 2 and 2A-2H.

The plurality of sensors 12 sense electrical parameters, e.g., voltage and current, on incoming lines, (i.e., phase A, phase B, phase C, neutral N), from an electrical power distribution system 11 e.g., an electrical circuit. In one embodiment, the sensors 12 may include current transformers and potential/voltage transformers, wherein one current transformer and one voltage transformer may be coupled to each phase of the incoming power lines. A primary winding of each transformer may be coupled to the incoming power lines and a secondary winding of each transformer may output a voltage representative of the sensed voltage and current. The output of each transformer may be coupled to the A/D converters 14 configured to convert the analog output voltage from the transformer to a digital signal that can be processed by the CPU 50, DSP1 60, DSP2 70, FPGA 80 or any combination thereof.

A/D converters 14 are respectively configured to convert an analog voltage output to a digital signal that is transmitted to a gate array, such as Field Programmable Gate Array (FPGA) 80. The digital signal is then transmitted from the FPGA 80 to the CPU 50 and/or one or more DSP processors 60, 70 to be processed in a manner to be described below.

The CPU 50 or DSP Processors 60, 70 are configured to operatively receive digital signals from the A/D converters 14 (see FIG. 1) to perform calculations necessary to determine power usage and to control the overall operations of the IED 10. In some embodiments, CPU 50, DSP1 60, DSP2 70 and FPGA 80 may be combined into a single processor, serving the functions of each component. In some embodiments, it is contemplated to use an Erasable Programmable Logic Device (EPLD) or a Complex Programmable Logic Device (CPLD) or any other programmable logic device in place of the FPGA 80. In some embodiments, the digital samples, which are output from the A/D converters 14, are sent directly to the CPU 50 or DSP processors 60, 70, effectively bypassing the FPGA 80 as a communications gateway, thus eliminating the need for FPGA 80 in certain embodiments.

The power supply 16 provides power to each component of the IED 10. In one embodiment, the power supply 16 is a transformer with its primary windings coupled to the incoming power distribution lines 11 and having windings to provide a nominal voltage, e.g., 5 VDC, +12 VDC and −12 VDC, at its secondary windings. In other embodiments, power may be supplied from an independent power source to the power supply 16. For example, power may be supplied from a different electrical circuit or an uninterruptible power supply (UPS).

In one embodiment, the power supply 16 may be a switch mode power supply in which the primary AC signal will be converted to a form of DC signal and then switched at high frequency, such as, for example, 100 Khz, and then brought through a transformer to step the primary voltage down to, for example, 5 Volts AC. A rectifier and a regulating circuit may then be used to regulate the voltage and provide a stable DC low voltage output. Other embodiments, such as, but not limited to, linear power supplies or capacitor dividing power supplies are also contemplated to be within the scope of the present disclosure.

The multimedia user interface 22 is shown coupled to the CPU 50 in FIG. 1 for interacting with a user and for communicating events, such as alarms and instructions to the user. The multimedia user interface 22 may include a display 23 for providing visual indications to the user and a front panel interface 21 including indictors, switches and various inputs. The display 23 may be embodied as a touch screen, a liquid crystal display (LCD), a plurality of LED number segments, individual light bulbs or any combination. The display may provide information to the user in the form of alpha-numeric lines, computer-generated graphics, videos, animations, etc. The multimedia user interface 22 further includes a speaker or audible output means for audibly producing instructions, alarms, data, etc. The speaker is coupled to the CPU 50 via a digital-to-analog converter (D/A) for converting digital audio files stored in a memory 18 or non-volatile memory 20 to analog signals playable by the speaker. An exemplary interface is disclosed and described in commonly owned U.S. Pat. No. 8,442,660, entitled "INTELLIGENT ELECTRONIC DEVICE HAVING AUDIBLE AND VISUAL INTERFACE", which claims priority to expired U.S. Provisional Patent Appl. No. 60/731,006, filed Oct. 28, 2005, the contents of which are hereby incorporated by reference in their entireties.

It is to be appreciated that the display and/or user interface 22 of the present disclosure is programmable and may be configured to meet the needs of a specific user and/or utility. An exemplary programmable display and/or user interface 22 is disclosed and described in commonly owned pending U.S. Patent Application Publication No. 2012/0010831, the contents of which are hereby incorporated by reference in its entirety. U.S. Patent Application Publication No. 2012/0010831 provides for defining screens of a display on a revenue based energy meter, an intelligent electronic device, etc. In one embodiment, a method utilizes Modbus registers and defines a programming technique wherein a user can custom make any desired screen for every application based on what a user needs. The programming utilizes Modbus registers maps to allow for the customizable screens. Moreover, the display interface allows for customized labeling to provide notice and information to users as to measured parameters other than electricity that the meter might be accumulating such as steam, water, gas or other type of commodity.

The IED 10 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

An input/output (I/O) interface 25 may be provided for receiving inputs generated externally from the IED 10 and for outputting data, e.g., serial data, a contact closure, etc., to other devices. In one embodiment, the I/O interface 25 may include a connector for receiving various cards and/or modules that increase and/or change the functionality of the IED 10. Such cards and/or module will be further described below.

The IED 10 further comprises a volatile memory 18 and a non-volatile memory 20. In addition to storing audio and/or video files, volatile memory 18 may store the sensed and generated data for further processing and for retrieval when called upon to be displayed at the IED 10 or from a remote location. The volatile memory 18 includes internal storage memory, e.g., random access memory (RAM), and the non-volatile memory 20 includes non-removable and removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed. Such memory may be used for storing historical trends, waveform captures, event logs including timestamps and stored digital samples for later downloading to a client application, web-server or PC application.

In a further embodiment, the IED 10 may include a communication device 24, also known as a network interface, for enabling communications between the IED or meter, and a remote terminal unit, programmable logic controller and other computing devices, microprocessors, a desktop computer, laptop computer, other meter modules, etc. The communication device 24 may be a modem, network interface card (NIC), wireless transceiver, etc. The communication device 24 may perform its functionality by hardwired and/or wireless connectivity. The hardwire connection may include but is not limited to hard wire cabling e.g., parallel or serial cables, RS232, RS485, USB cable, Firewire™ (1394 connectivity) cables, Ethernet, and the appropriate communication port configuration. The wireless connection may operate under any of the various wireless protocols including but not limited to Bluetooth™ interconnectivity, infrared connectivity, radio transmission connectivity including computer digital signal broadcasting and reception commonly referred to as Wi-Fi™ or 802.11.X (where x denotes the type of transmission), satellite transmission or any other type of communication protocols, communication architecture or systems currently existing or to be developed for wirelessly transmitting data including spread spectrum 900 MHz, or other frequencies, Zigbee™ WiFi™, or any mesh enabled wireless communication.

The IED 10 may communicate to a server or other computing device such as a client via the communication device 24. The client may comprise any computing device, such as a server, mainframe, workstation, personal computer, hand held computer, laptop, telephony device, network appliance, other IED, Programmable Logic Controller, Power Meter, Protective Relay etc. The IED 10 may be connected to a communications network, e.g., the Internet, by any means, for example, a hardwired or wireless connection, such as dial-up, hardwired, cable, DSL, satellite, cellular, PCS, wireless transmission (e.g., 802.11a/b/g), etc. It is to be appreciated that the network may be a public or private intranet, an extranet, a local area network (LAN), wide area network (WAN), the Internet or any network that couples a plurality of computers to enable various modes of communication via network messages. Furthermore, the server may communicate using various protocols such as Transmission Control Protocol/Internet Protocol (TCP/IP), File Transfer Protocol (FTP), Hypertext Transfer Protocol (HTTP), etc. and secure protocols such as Hypertext Transfer Protocol Secure (HTTPS), Internet Protocol Security Protocol (IPSec), Point-to-Point Tunneling Protocol (PPTP), Secure Sockets Layer (SSL) Protocol, etc. Communications may also include IP tunneling protocols such as those that allow virtual private networks coupling multiple intranets or extranets together via the Internet. The server may further include a storage medium for storing a database of instructional videos, operating manuals, etc.

In an additional embodiment, the IED 10 may also have the capability of not only digitizing waveforms, but storing the waveform and transferring that data upstream to a central computer, e.g., a remote server, when an event occurs such as a voltage surge or sag or a current short circuit. This data may be triggered and captured on an event, stored to memory, e.g., non-volatile RAM, and additionally transferred to a host computer within the existing communication infrastructure either immediately in response to a request from a remote device or computer to receive said data in response to a polled request. The digitized waveform may also allow the CPU 50 to compute other electrical parameters such as harmonics, magnitudes, symmetrical components and phasor analysis. Using the harmonics, the IED 10 may also calculate dangerous heating conditions and can provide harmonic transformer derating based on harmonics found in the current waveform.

In a further embodiment, the IED 10 may execute an e-mail client and may send e-mails to the utility or to the customer direct on an occasion that a power quality event occurs. This allows utility companies to dispatch crews to repair the condition. The data generated by the meters are used to diagnose the cause of the condition. The data may be transferred through the infrastructure created by the electrical power distribution system. The email client may utilize a POP3 or other standard mail protocol. A user may program the outgoing mail server and email address into the meter. An exemplary embodiment of said metering is available in U.S. Pat. No. 6,751,563, which all contents thereof are incorporated by reference herein. In the U.S. Pat. No. 6,751,563, at least one processor of the IED or meter is configured to collect the at least one parameter and generate data from the sampled at least one parameter, wherein the at least one processor is configured to act as a server for the IED or meter and is further configured for presenting the collected and generated data in the form of web pages.

In a further embodiment, the IED 10 of the present disclosure may communicate data from an internal network to a server, client, computing device, etc. on an external network through a firewall, as disclosed and described in commonly owned U.S. Patent Application Publication No. 2013/0031201, the contents of which are hereby incorporated by reference in its entirety.

The techniques of the present disclosure can be used to automatically maintain program data and provide field wide updates upon which IED firmware and/or software can be upgraded. An event command can be issued by a user, on a schedule or by digital communication that may trigger the IED 10 to access a remote server and obtain the new program code. This will ensure that program data will also be maintained allowing the user to be assured that all information is displayed identically on all units.

It is to be understood that the present disclosure may be implemented in various forms of hardware, software, firmware, special purpose processors, or a combination thereof. The IED 10 also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, or firmware, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Furthermore, it is to be appreciated that the components and devices of the IED 10 of FIG. 1 may be disposed in various housings depending on the application or environment.

Figure 2:
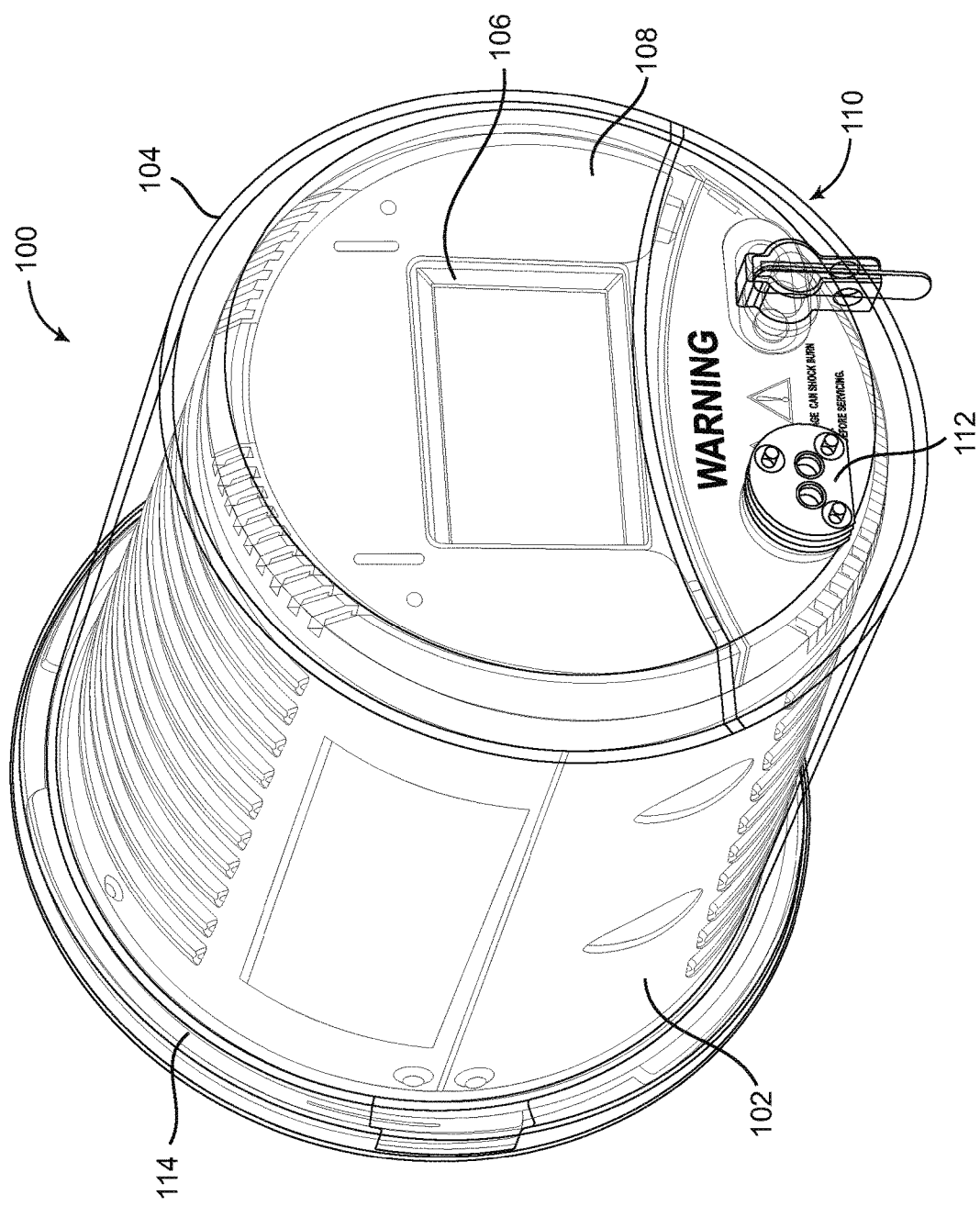
FIG. 2 is a perspective view of an intelligent electronic device (IED) in accordance with an embodiment of the present disclosure.
Figure 3:
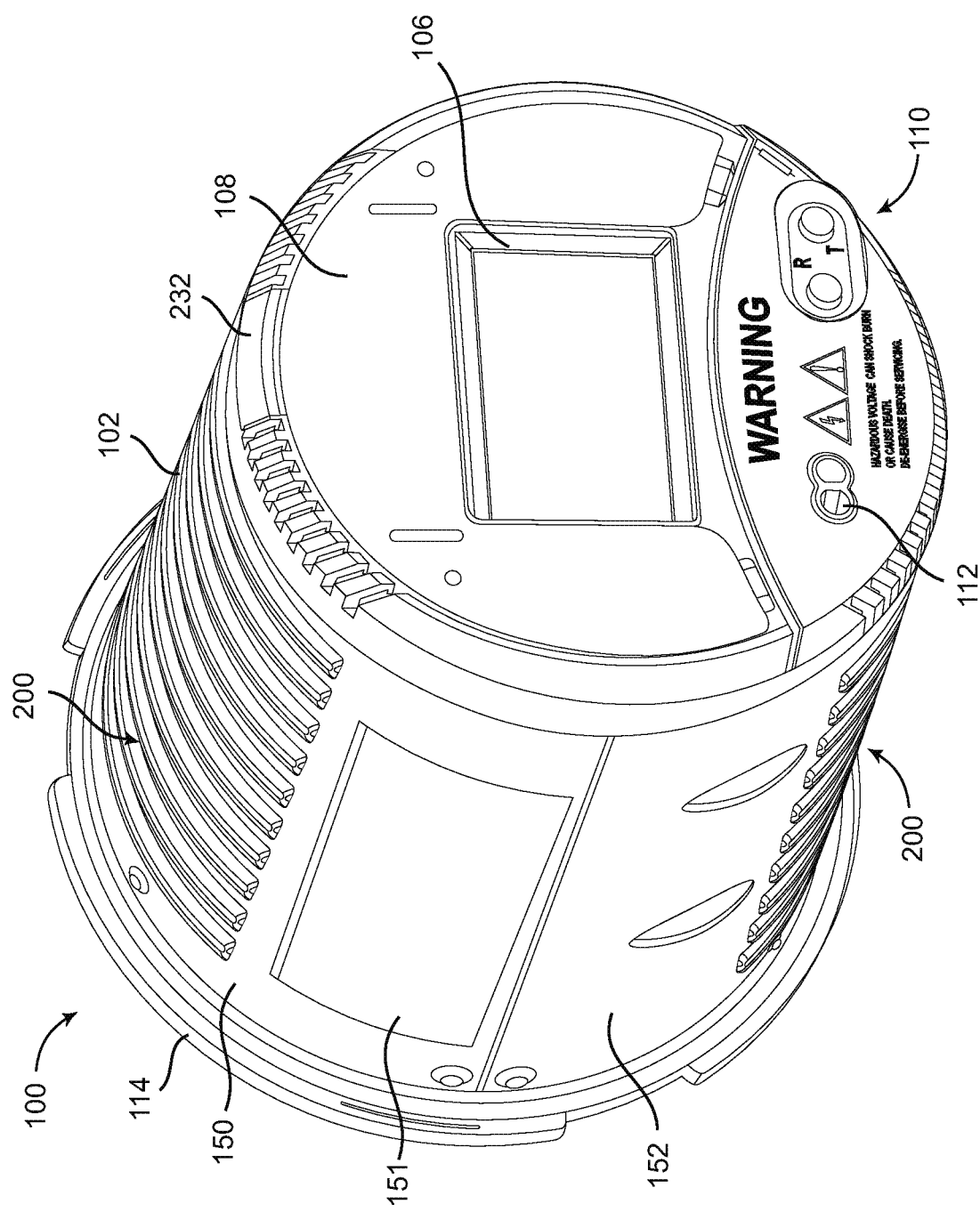
FIG. 3 is a perspective view of the IED shown in FIG. 2 with a cover removed in accordance with an embodiment of the present disclosure.

Referring to FIGS. 2 and 3, the IED of the present disclosure may be configured as a socket meter 100, also known as a S-base type meter or type S meter. The meter 100 includes a main housing 102 surrounded by a cover 104. The cover 104 is preferably made of a clear material to expose a display 106 disposed on a bezel 108 of the housing 102. An interface 110 to access the display and a communication port 112 is also provided and accessible through the cover 104. The interface 110 may include a switch, for example, to reset values, and/or buttons for entering or confirming input values. The meter 100 further includes a plurality of current terminals and voltage terminals (not shown) disposed on the backside of the meter extending through a base 114, the details of which will be described below. The terminals are designed to mate with matching jaws of a detachable meter-mounting device, such as a revenue meter socket. The socket is hard wired to the electrical circuit and is not meant to be removed. To install an S-base meter, the utility need only plug in the meter into the socket. Once installed, a socket-sealing ring (not shown) is used as a seal between the meter housing 102 and/or cover 104 and the meter socket to prevent removal of the meter and to indicate tampering with the meter.

Figure 2A:
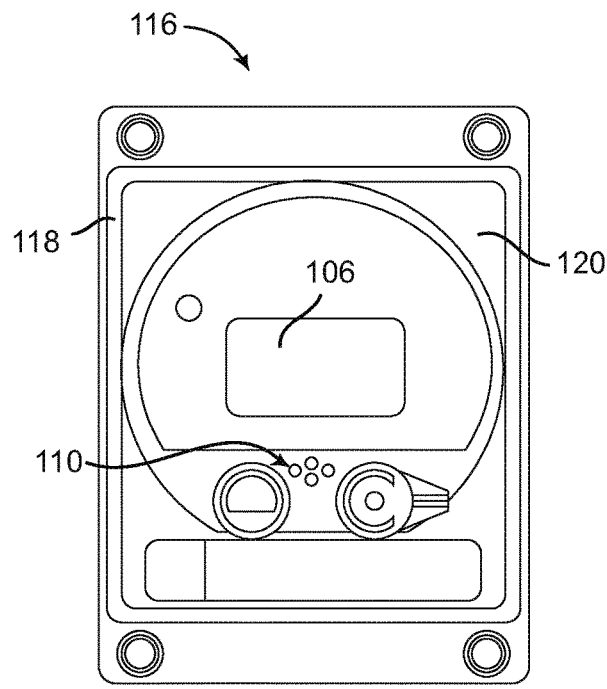
FIGS. 2A-2D illustrate exemplary form factors for an intelligent electronic device (IED) in accordance with embodiments of the present disclosure.
Figure 2B:
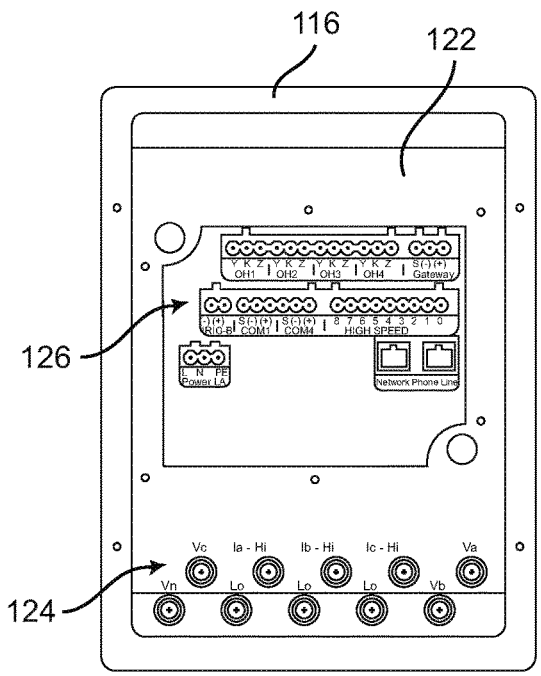

In a further embodiment, the IED 100 of FIG. 2 may be disposed in a switchboard or draw-out type housing 116 as shown in FIGS. 2A and 2B, where FIG. 2A is a front view and FIG. 2B is a rear view. The switchboard enclosure 116 usually features a cover 118 with a transparent face 120 to allow the meter display 106 to be read and the user interface 110 to be interacted with by the user. The cover 118 also has a sealing mechanism (not shown) to prevent unauthorized access to the meter. A rear surface 122 of the switchboard enclosure 116 provides connections for voltage and current inputs 124 and for various communication interfaces 126. Although not shown, the meter disposed in the switchboard enclosure 116 may be mounted on a draw-out chassis which is removable from the switchboard enclosure 116. The draw-out chassis interconnects the meter electronics with the electrical circuit. The draw-out chassis contains electrical connections which mate with matching connectors 124, 126 disposed on the rear surface 122 of the enclosure 116 when the chassis is slid into place. Exemplary housings, enclosures and/or cases are shown and described in commonly owned U.S. Design Pat. Nos. D706,659, D706,660, D708,082 and D708,533.

Figure 2C:
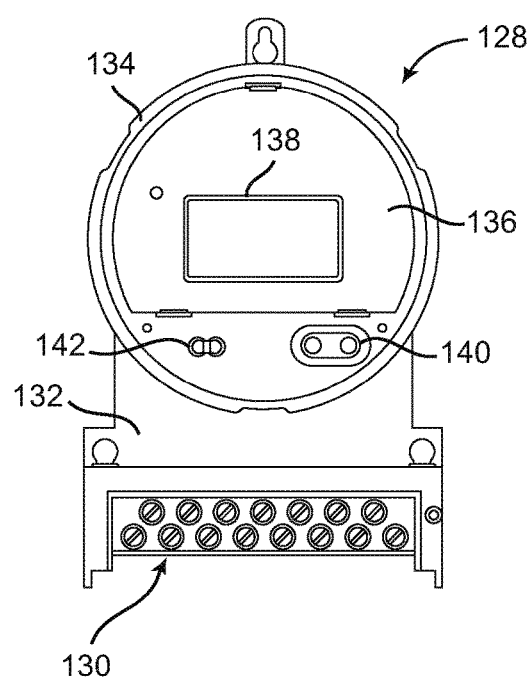
Figure 2D:
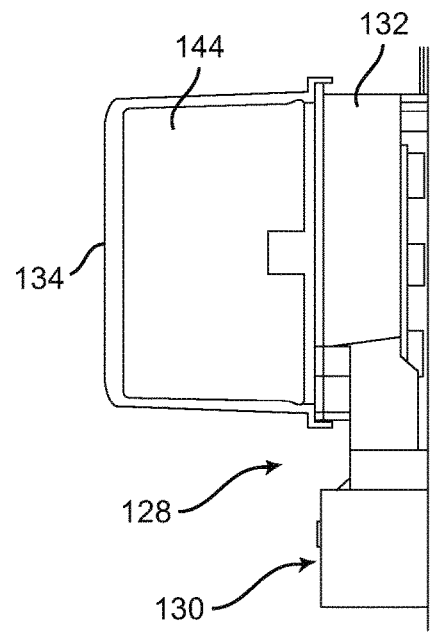

In yet another embodiment, the IED 100 of FIG. 2 may be disposed in a A-base or type A housing as shown in FIGS. 2C and 2D. A-base meters 128 feature bottom connected terminals 130 on the bottom side of the meter housing 132. These terminals 130 are typically screw terminals for receiving the conductors of the electric circuit (not shown). A-base meters 128 further include a meter cover 134, meter body 136, a display 138 and input/output means 140. Further, the meter cover 134 includes an input/output interface 142. The cover 134 encloses the meter electronics 144 and the display 138. The cover 134 has a sealing mechanism (not shown) which prevents unauthorized tampering with the meter electronics.

It is to be appreciated that other housings and mounting schemes, e.g., panel mounted, circuit breaker mounted, etc., are contemplated to be within the scope of the present disclosure.

Figure 4:
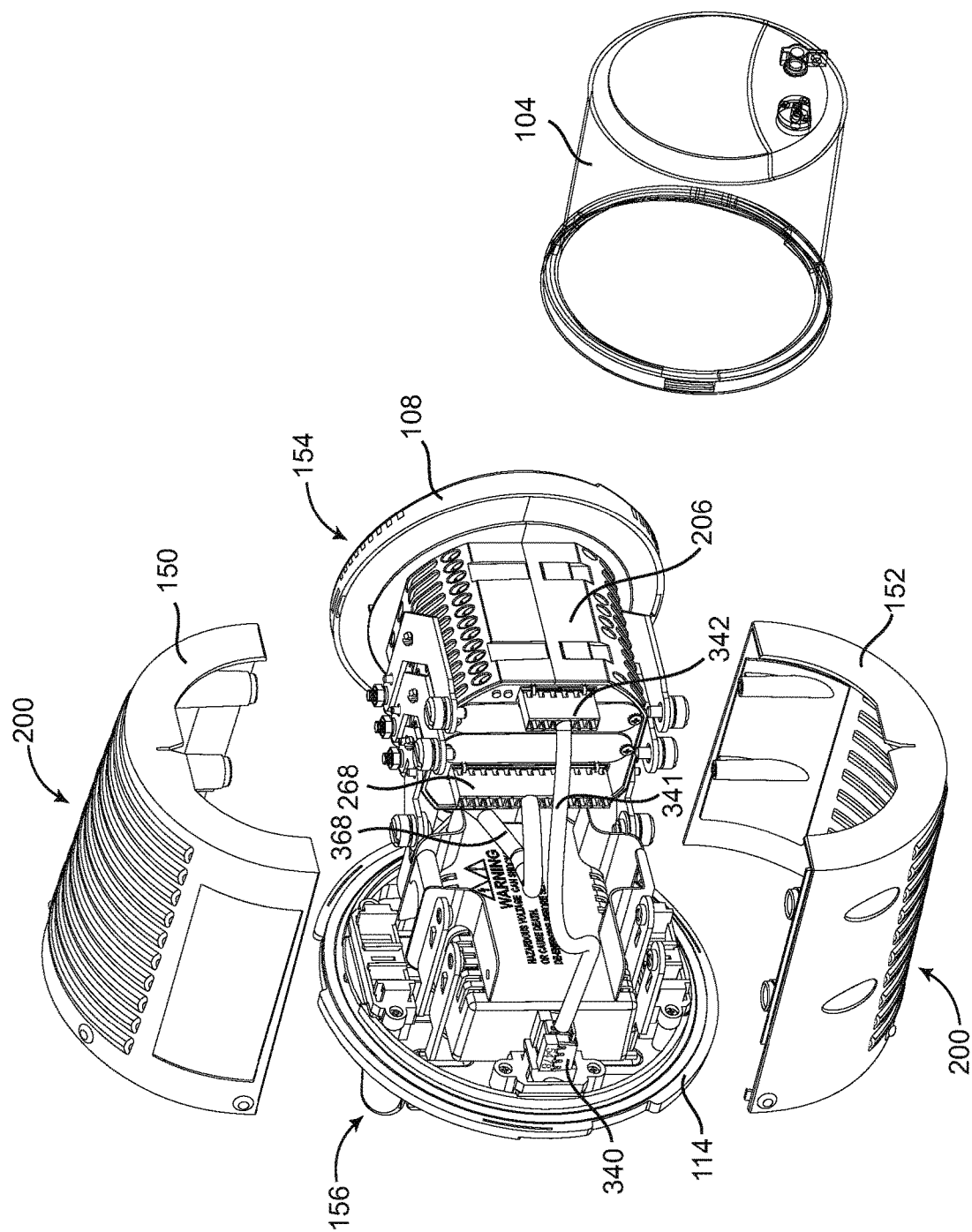
FIG. 4 is an exploded view of the IED shown in FIG. 2 in accordance with an embodiment of the present disclosure.
Figure 10:
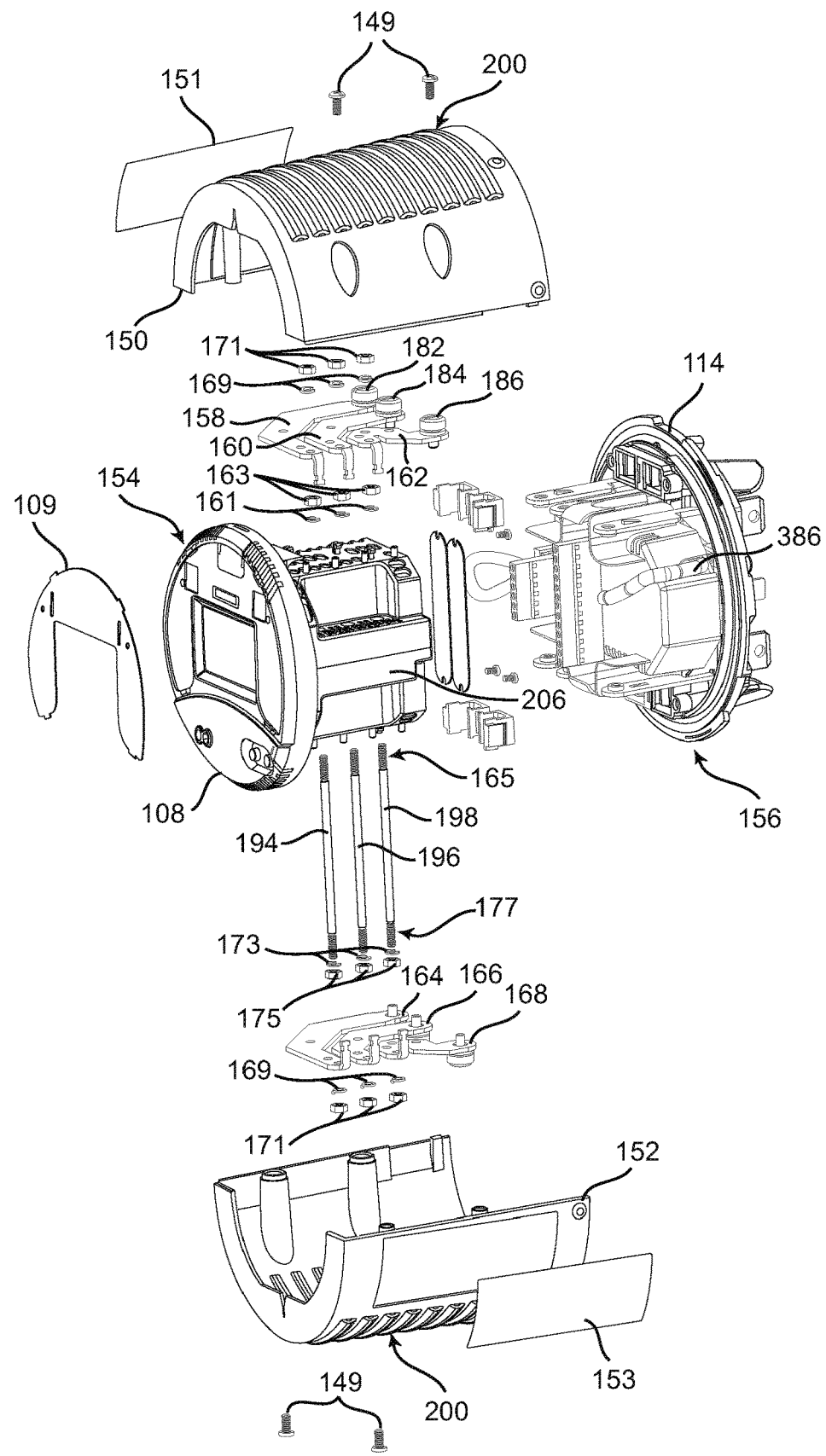
FIG. 10 is another exploded view of the IED shown in FIG. 2 in accordance with an embodiment of the present disclosure.

Referring to FIGS. 3, 4 and 10, housing 102 includes an upper clam shell half 150 and a lower clam shell half 152. The upper clam shell half 150 and lower clam shell half 152 are secured to each other via a plurality of screws 149. Each of the upper clam shell half 150 and the lower clam shell half 152 include a plurality of louvers 200 to allow heat to escape. In one embodiment, the upper clam shell half 150 and lower clam shell half 152 each include a shiny or reflective finish, e.g., a chrome finish, on an outer surface to reflect sunlight in outdoor applications to avoid heating up the internal components of the IED 100. In one embodiment, the reflective finish is applied to the upper clam shell half 150 and lower clam shell half 152 as a first sticker 151 and a second sticker 153, as shown in FIGS. 3 and 10. Internal to the housing 102, the IED 100 includes a metering sub-assembly 154 and an input base module sub-assembly 156, the details of which will be described below. As shown in FIG. 4, the metering sub-assembly 154 is hinged to the input base module sub-assembly 156. When in an open position, various cables, connectors, and input/output cards/modules are exposed, as will be described below.

Referring to FIGS. 5-9, various views of the IED 100 are illustrated with the housing 102 removed. The metering sub-assembly 154 is hinged to the input base module sub-assembly 156 via current plates 158, 160, 162, 164, 166, 168 and current input blades 170, 172, 174, 176, 178, 180 respectively. Each current plate is coupled to a respective current input blade via spring loaded screw. For example, current plate 158 is coupled to current input 170 via screw 182, current plate 160 is coupled to current input 172 via screw 184, current plate 162 is coupled to current input 174 via screw 186, current plate 164 is coupled to current input 176 via screw 188, current plate 166 is coupled to current input 178 via screw 190 and current plate 168 is coupled to current input 180 via screw 192. The current input path for each combination of current plates and current inputs is completed by a current bar 194, 196, 198. For example, when the IED is coupled to a three phase system, the current input path for phase A flows through current input 170 to current plate 158 through current bar 194 through current plate 164 and through current input 176. The current input path for phase B flows through current input 172 to current plate 160 through current bar 196 through current plate 166 and through current input 178. The current input path for phase C flows through current input 174 to current plate 162 through current bar 198 through current plate 168 and through current input 180. It is to be appreciated that the current bars 194, 196, 198 pass through current sensing circuits disposed within metering sub-assembly 154, the details of which will be described below. Additionally, the current inputs, current plates and current bars may be made of highly electrically conductive material such as copper, however, other materials may be used.

Figure 5:
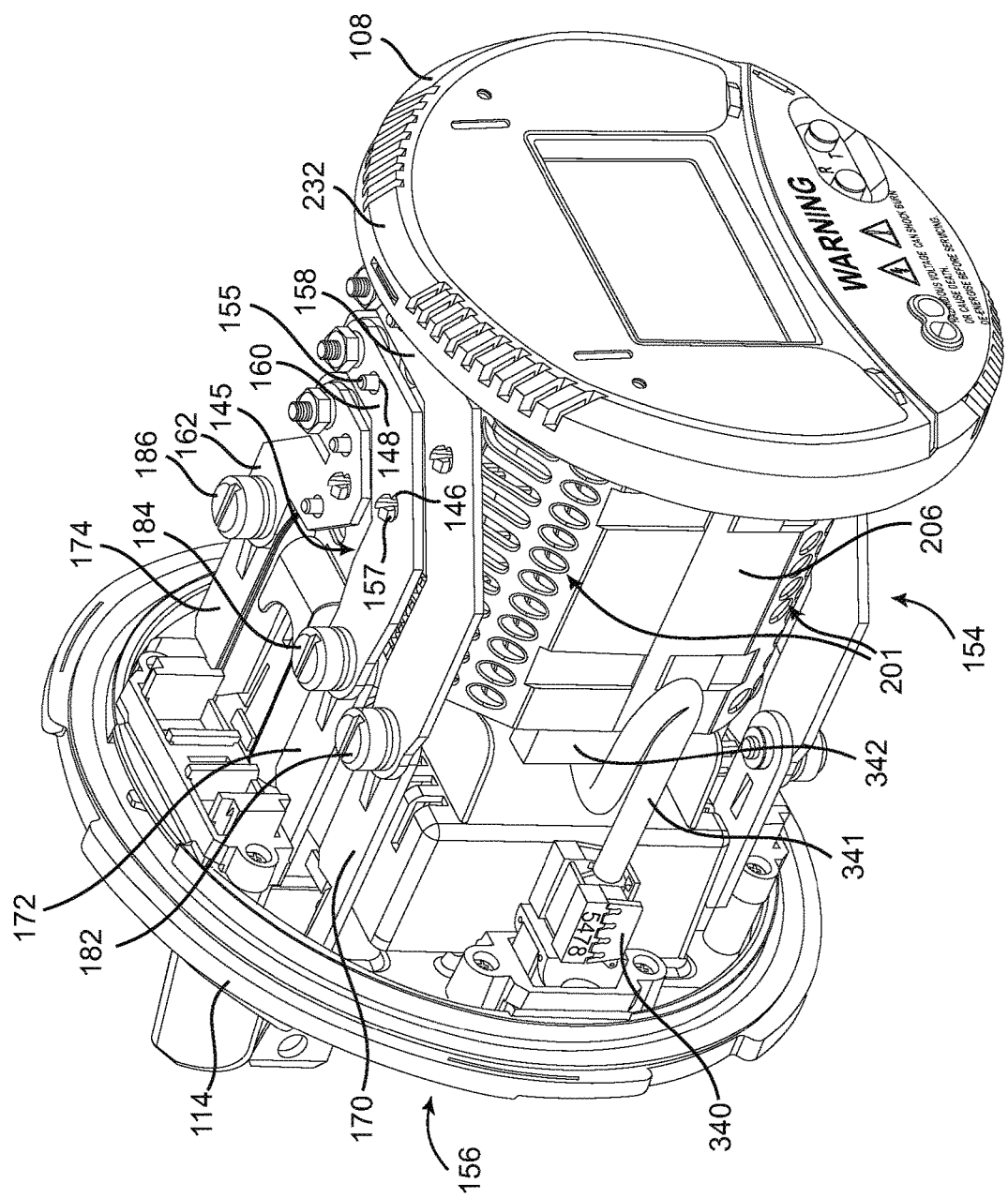
FIG. 5 is a perspective view of the IED shown in FIG. 2 with an outer housing removed in accordance with an embodiment of the present disclosure.
Figure 6:
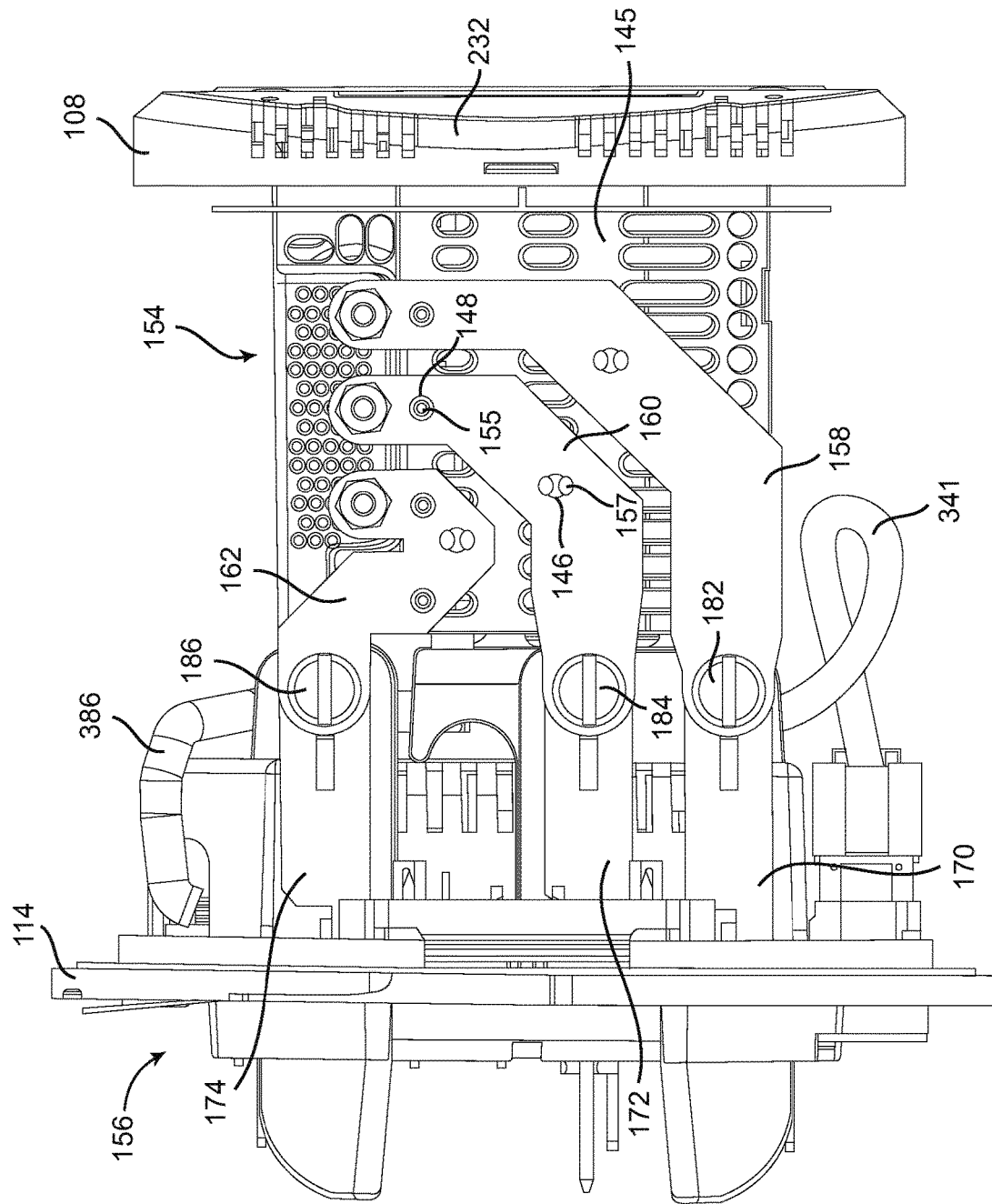
FIG. 6 is a top side view of the IED shown in FIG. 5 in accordance with an embodiment of the present disclosure.
Figure 7:
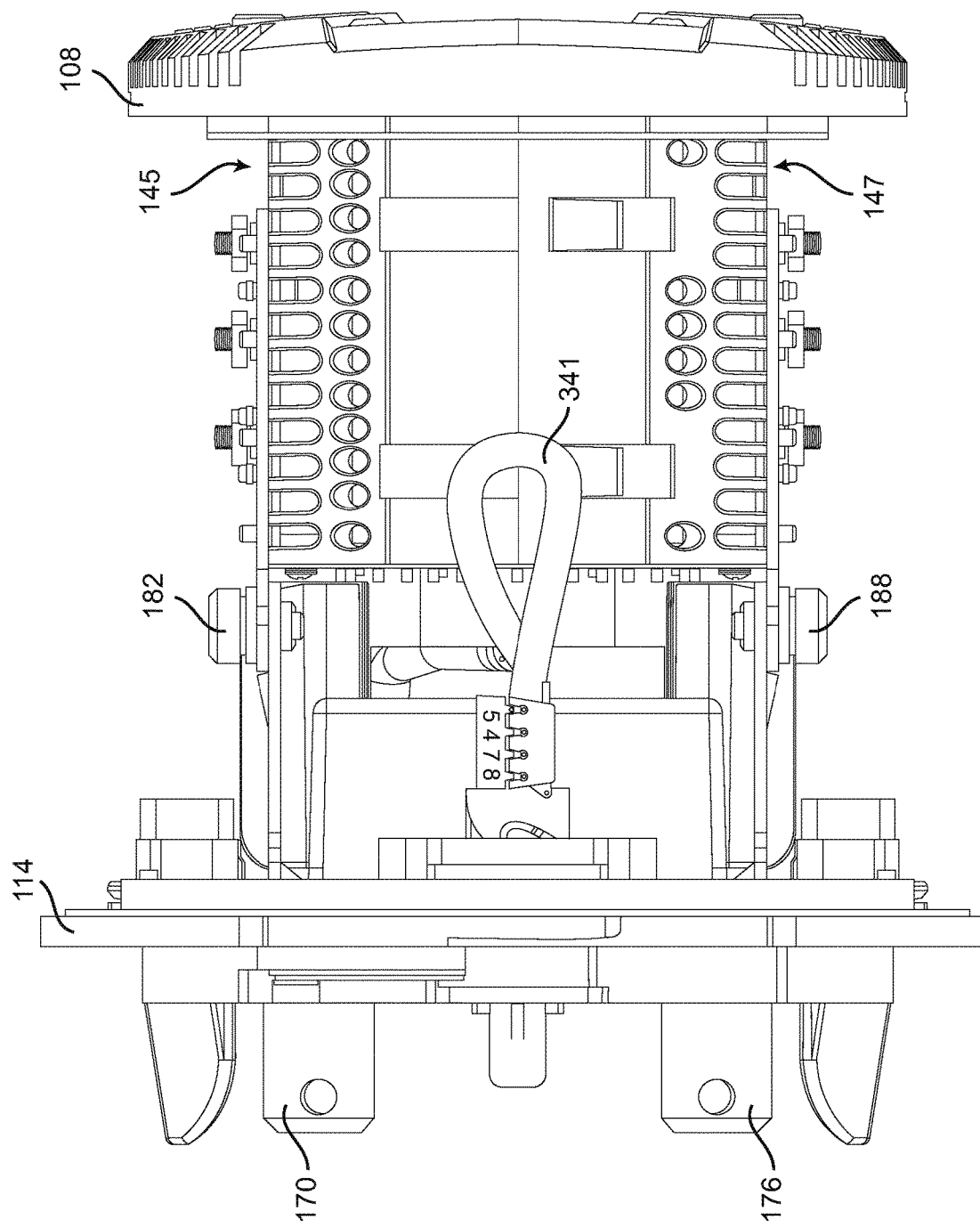
FIG. 7 is a left side view of the IED shown in FIG. 5 in accordance with an embodiment of the present disclosure.
Figure 8:
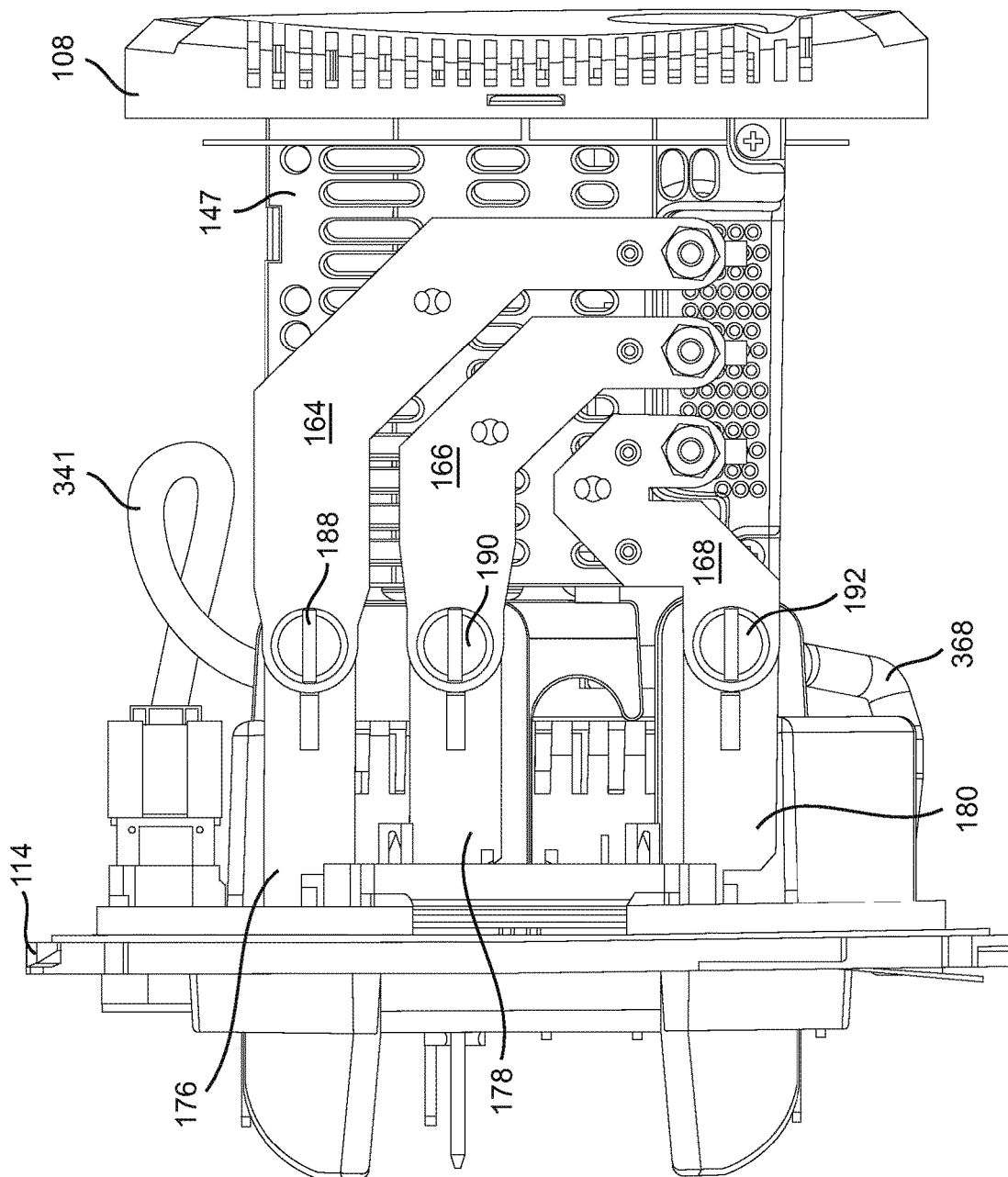
FIG. 8 is a bottom side view of the IED shown in FIG. 5 in accordance with an embodiment of the present disclosure.
Figure 9:
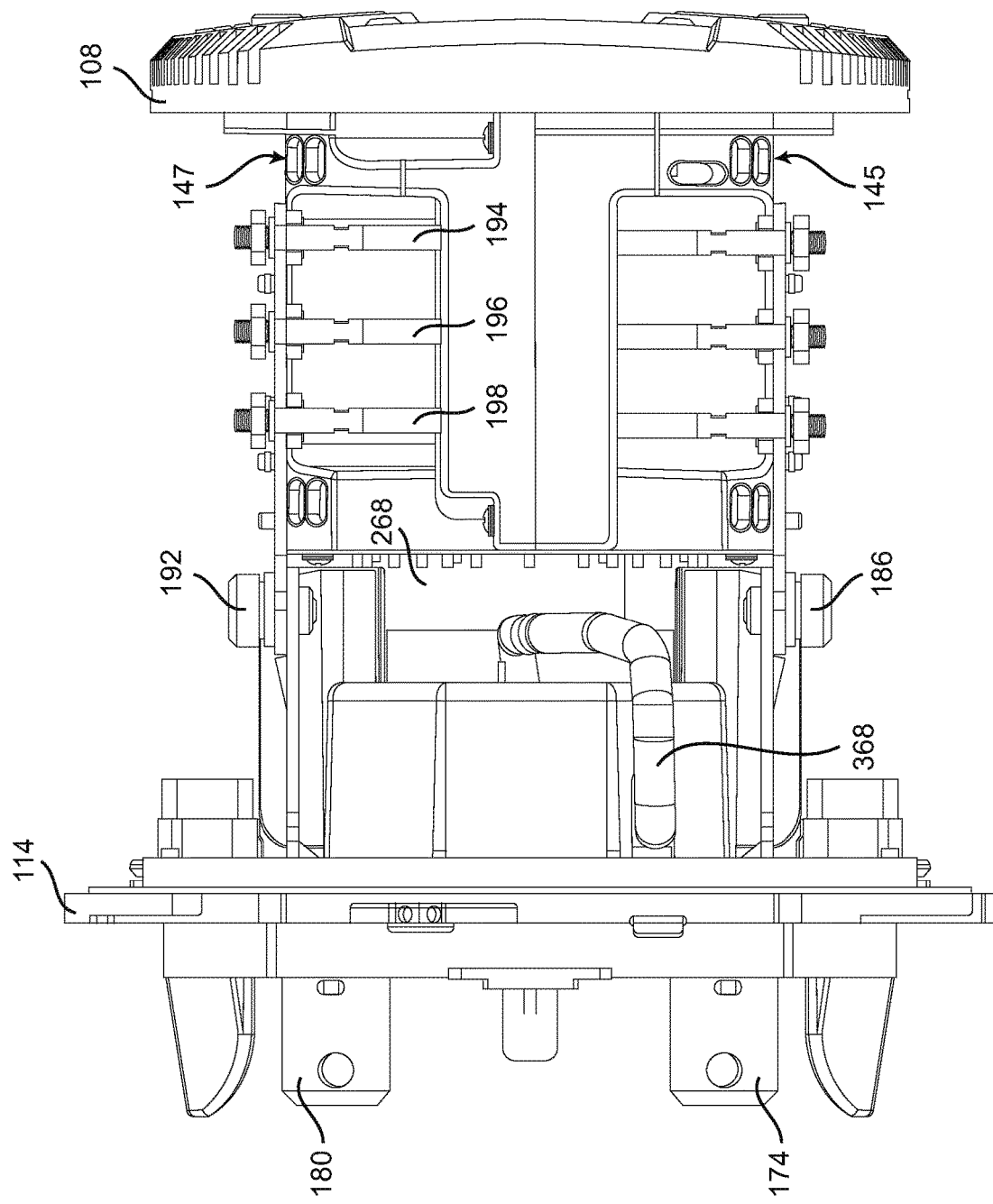
FIG. 9 is a right side view of the IED shown in FIG. 5 in accordance with an embodiment of the present disclosure.

It is further to be appreciated that the current plates 158, 160, 162, 164, 166, 168 are relatively wide to have increased surface area. The increased surface area allows high current to pass through. Additionally, the large surface area of the current plates 158, 160, 162, 164, 166, 168 act as a heat sink drawing heat generated internal to the metering sub-assembly 154 and dissipating such heat through ventilation slots or louvers 200 disposed on the housing 102. In certain embodiments, the delta T, i.e., temperature change, of the heat drawn away and dissipated by the current plates is approximately 10 degrees F. As best shown in FIGS. 4 and 10, the louvers 200 are positioned on a respective calm shell half 150, 152 to approximately align over respective current plates to allow heat to dissipate through the louvers 200. To facilitate drawing heat away from the internal electronic components of the metering sub-assembly 154, current plates 158, 160, 162, 164, 166, 168 are disposed on at least one surface of an inner housing 206 of the metering sub-assembly 154. For example, referring to FIG. 5, current plate 160 includes at least a first aperture 146 and at least a second aperture 148, where the first and second apertures 146, 148 align and secure the current plate 160 via alignment post 155 and locking tab 157. Although not specifically pointed out, each current plate includes at least one first aperture for receiving an alignment post and at least one second aperture for receiving a securing or locking tab, e.g., a mushroom tab. As can be seen in FIGS. 5, 6 and 8, the combined widths of current plates 158, 160, 162 substantially cover a first surface 145, or top surface, of the inner housing, while current plates 164, 166, 168 substantially cover a second surface 147, or bottom surface. Also, it is to be appreciated that, in one embodiment, housing 206 of metering sub-assembly 154 also includes louvers 201 to further aid in the dissipation of heat generated by the IED. Generally, the current plates are aligned over the louvers 201 to draw heat from the inside of the housing 206.

FIG. 10 is another exploded view of the IED shown in FIG. 2 in accordance with an embodiment of the present disclosure. The upper clam shell half 150 and lower clam shell half 152 of the housing 102 are illustrated. The metering sub-assembly 154 and an input base module sub-assembly 156 are shown spaced apart from each other.

Figure 11:
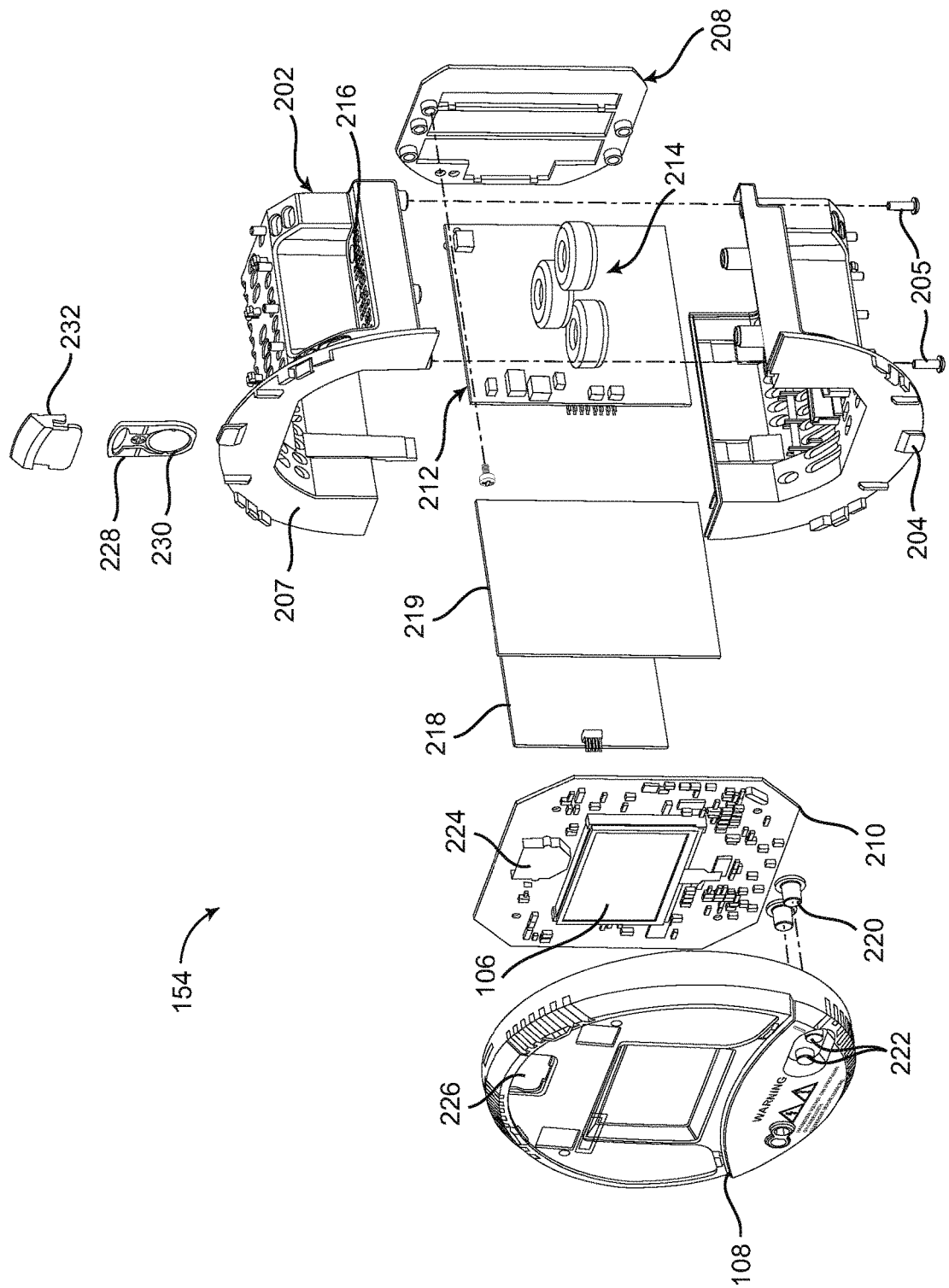
FIG. 11 is an exploded view of a metering sub-assembly shown in FIG. 10 in accordance with an embodiment of the present disclosure.

Referring to FIG. 11, an exploded view of the metering sub-assembly 154 is illustrated. The metering sub-assembly 154 includes an upper inner case 202 and lower inner case 204 to collectively form an inner housing 206. The upper inner case 202 and lower inner case 204 are coupled together, for example, by screws 205. A back plate 208 is disposed on a rear portion of the inner housing 206. A DSP board assembly 210 is disposed on a front portion 207 of the inner housing 206. The DSP board assembly 210 includes the display 106 and at least one processor on a rear surface thereof. In one embodiment, the display 106 may be a touch sensitive display or user interface as disclosed and described in commonly owned U.S. Patent Application Publication No. 2014/0180613, the contents of which are hereby incorporated by reference in its entirety. In one embodiment, a user may interact with the display 106 by directly touching a surface of the display 106. In another embodiment, a user may interact with the display 106 while the cover 104 is disposed over the IED 100 by touching a portion of the cover 104 that is approximately aligned over the display 106.

A VIP board assembly 212 is disposed in the inner housing 206 perpendicular to the DSP board assembly 210 and electrically coupled thereto. The VIP board assembly 212 includes a plurality of current sensors 214 disposed thereon. The current sensors 214 are positioned on the VIP board assembly 212 to accept the current bars 194, 196, 198 through a respective center of the current sensors 214 when the current bars 194, 196, 198 are disposed in apertures 216 of the upper inner case 202. A similar current sensing technique is described in commonly owned U.S. Pat. No. 7,271,996, the contents of which are hereby incorporated by reference in its entirety.

Figure 12:
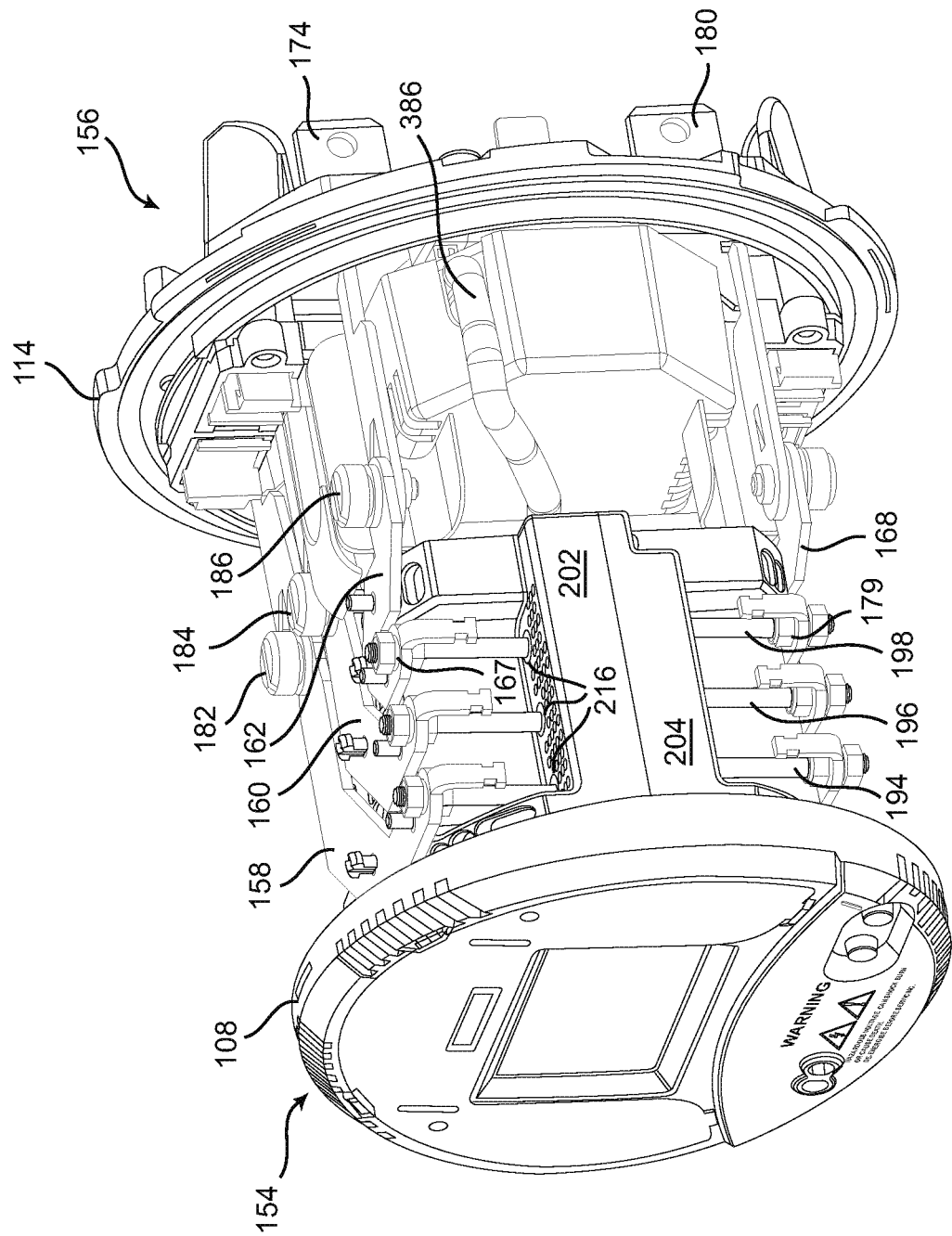
FIG. 12 is a perspective view of the IED illustrating current bars installed in accordance with an embodiment of the present disclosure.

Referring to FIG. 12, the current bars 194, 196, 198 are shown disposed in apertures 216 of the upper inner case 202. As described above, the current input path for each combination of current plates and current inputs is completed by a current bar 194, 196, 198. For example, when the IED is coupled to a three phase system, the current input path for phase C flows through current input 174 to current plate 162 through current bar 198 through current plate 168 and through current input 180. Each current rod is coupled to a respective current plate via a plurality of fasteners, such as washers/clips and nuts. Referring to FIGS. 10 and 12, current bar 198 is threaded on each end. A first washer or clip 161 and first nut 163 is coupled to first end 165 of current bar 198. An aperture 167 of current plate 186 is disposed over the first end 165 of current bar 198 and secured by second washer or clip 169 and second nut 171. Similarly, a third washer or clip 173 and third nut 175 is coupled to second end 177 of current bar 198. An aperture 179 of current plate 168 is disposed over the second end 177 of current bar 198 and secured by fourth washer or clip 169 and fourth nut 171. Current bars 194, 196 are assembled in a similar manner. It is to be appreciated that the current bars 194, 196, 198 limit movement of the metering sub-assembly 154 in the XYZ coordinate directions and provide structural strength.

Figure 13A:
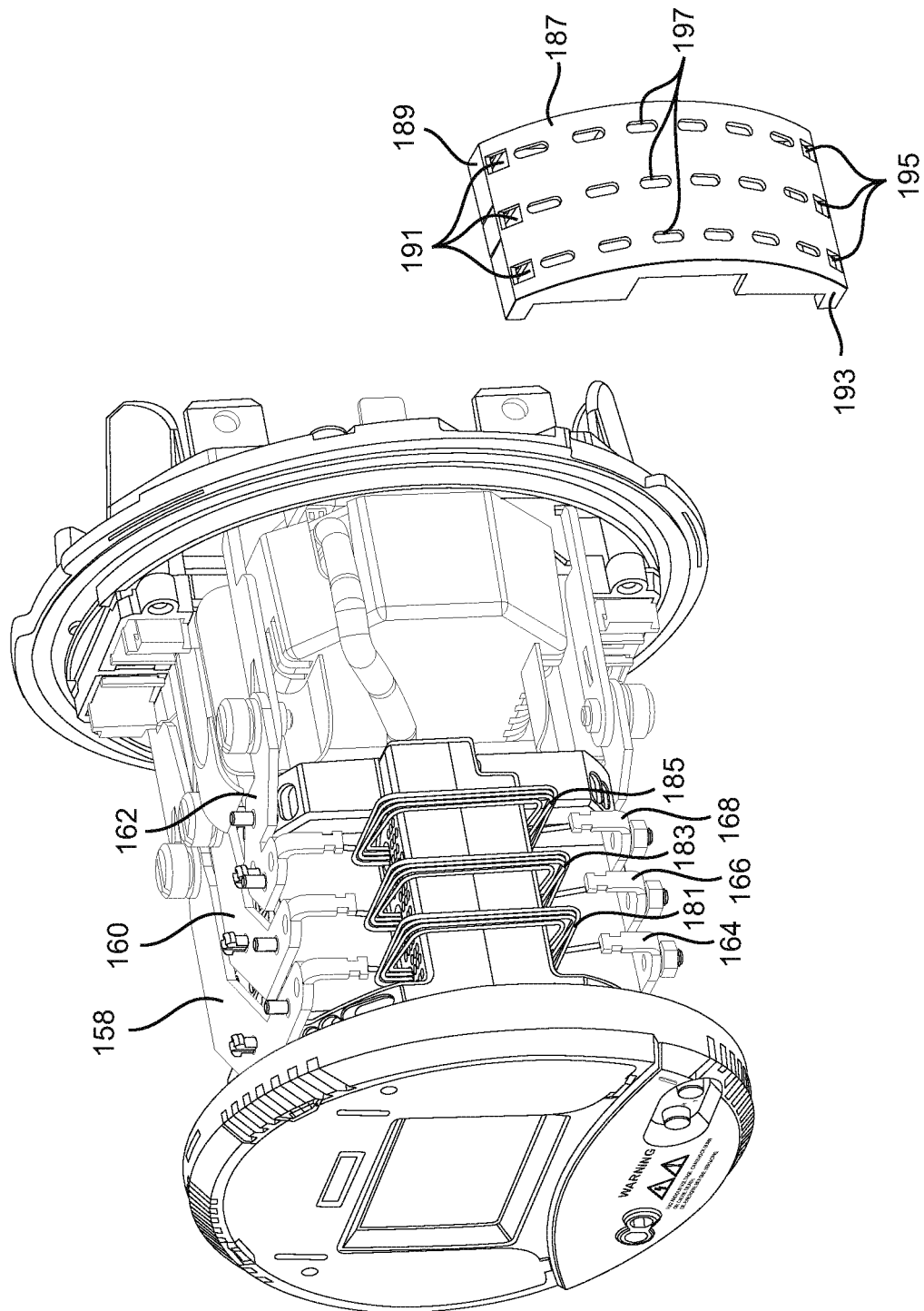
FIG. 13A is a perspective view of an IED illustrating a current wrap configuration in accordance with an embodiment of the present disclosure.

To achieve more accurate current sensing at lower current ranges, a wire may be used in lieu of the current bars. A wire 181, 183, 185 is disposed through a respective aperture 216 and wound about the current sensor 214 internal to the metering sub-metering 154 by repeatedly inserting the respective wire through the aperture 216 as shown in FIG. 13A. The wire 181, 183, 185 is wrapped a predetermined number of times, e.g., about ten turns. After the wire is wrapped the predetermined number of turns, each end of the respective wire is coupled to a respective current plate. For example, wire 181 is coupled to current plate 158 on one end and to current plate 164 on the other end; wire 183 is coupled to current plate 160 on one end and to current plate 166 on the other end; and wire 185 is coupled to current plate 162 on one end and to current plate 168 on the other end.

Figure 13B:
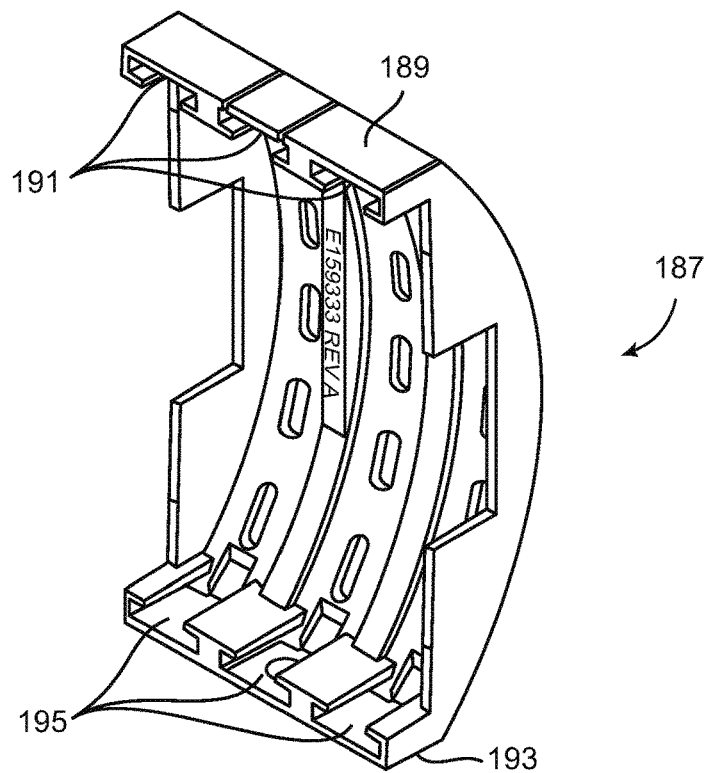
FIG. 13B is a perspective front of a current plate holder in accordance with an embodiment of the present disclosure.
Figure 13C:
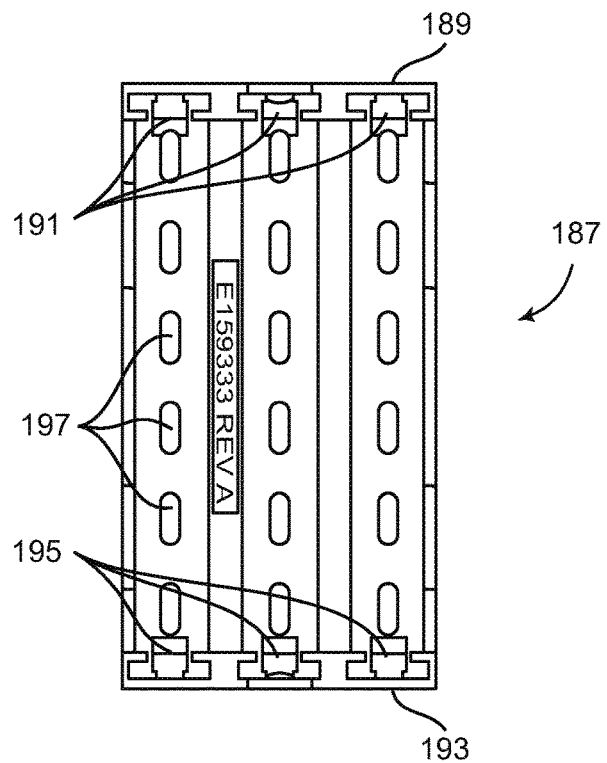
FIG. 13C is a front view of the current plate holder shown in FIG. 13B.
Figure 14:
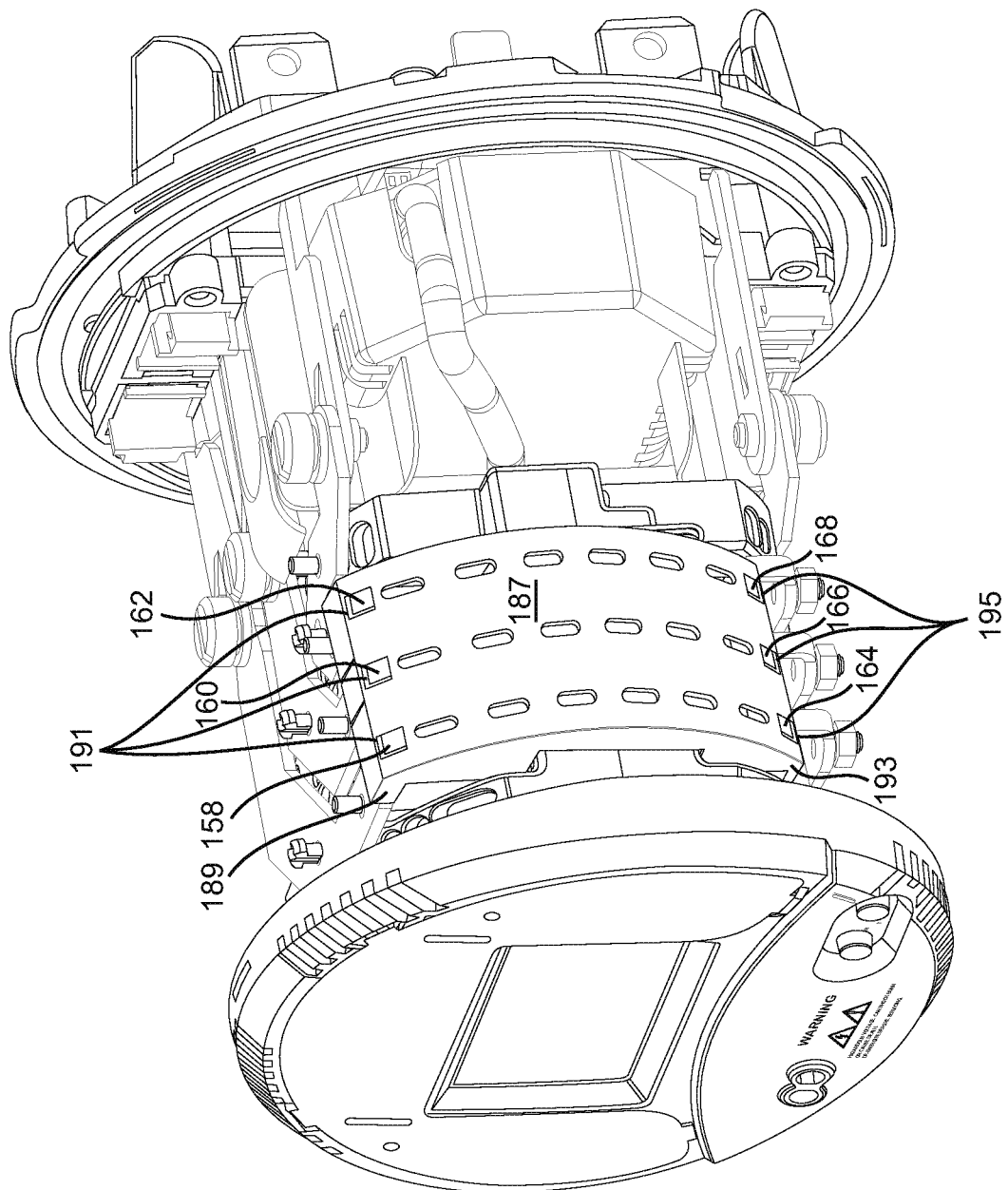
FIG. 14 is a perspective view of the IED shown in FIG. 13A with a current holder plate installed in accordance with an embodiment of the present disclosure.

In this embodiment, a current plate holder 187 provides structural strength similar to the strength provided by the current bars. A perspective view of the current plate holder 187 is shown in FIG. 13B and a front view of the current plate holder is shown in FIG. 13B. A first end 189 of the current plate holder 187 includes apertures or slots 191 that interact with current plates 158, 160, 162 and a second end 193 of the current plate holder 187 includes apertures or slots 195 that interact with current plates 164, 166, 168. As shown in FIG. 14, the current plate holder 187 is disposed over the portion of the metering sub-assembly 154 including wires 181, 183, 185. The first end 189 of the current plate holder 187 including apertures 191 interact with current plates 158, 160, 162 and the second end 193 of the current plate holder 187 including apertures 195 interact with current plates 164, 166, 168. In one embodiment, the current plate holder 187 snaps onto the current plates, i.e., a portion of the current plate snaps into the apertures or slots 191, 195, however, other configurations are contemplated to be within the scope of the present disclosure. The current plate holder 187 may include apertures 197 to dissipate heat generated by the wires 181, 183, 185.

Referring back to FIG. 11, a RS485/KYZ board assembly 218 is also disposed in the inner housing 206 perpendicular to the DSP board assembly 210 and electrically coupled thereto. It is to be appreciated that the DSP board assembly 210 is configured to accept and be coupled to other boards, for example, input/output boards that are disposed in the inner housing 206 via back plate 208. Such mounting/coupling techniques are disclosed and described in commonly owned U.S. Pat. No. 8,587,949, the contents of which are hereby incorporated by reference in its entirety. Additionally, a plastic divider sheet 219 is disposed in the inner housing 206 separating the VIP board assembly 214 from other components, for example, the RS485/KYZ board assembly 218 and/or function modules or cards.

Figure 15:
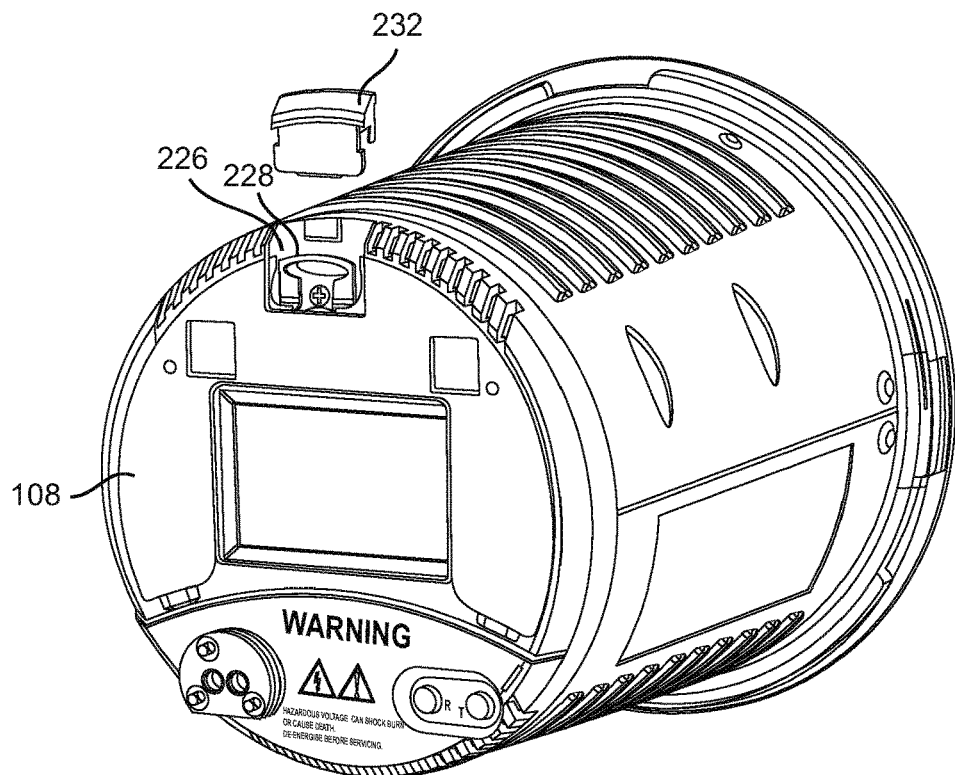
FIG. 15 is a partial perspective view of the IED shown in FIG. 3 with a battery door removed in accordance with an embodiment of the present disclosure.
Figure 16:
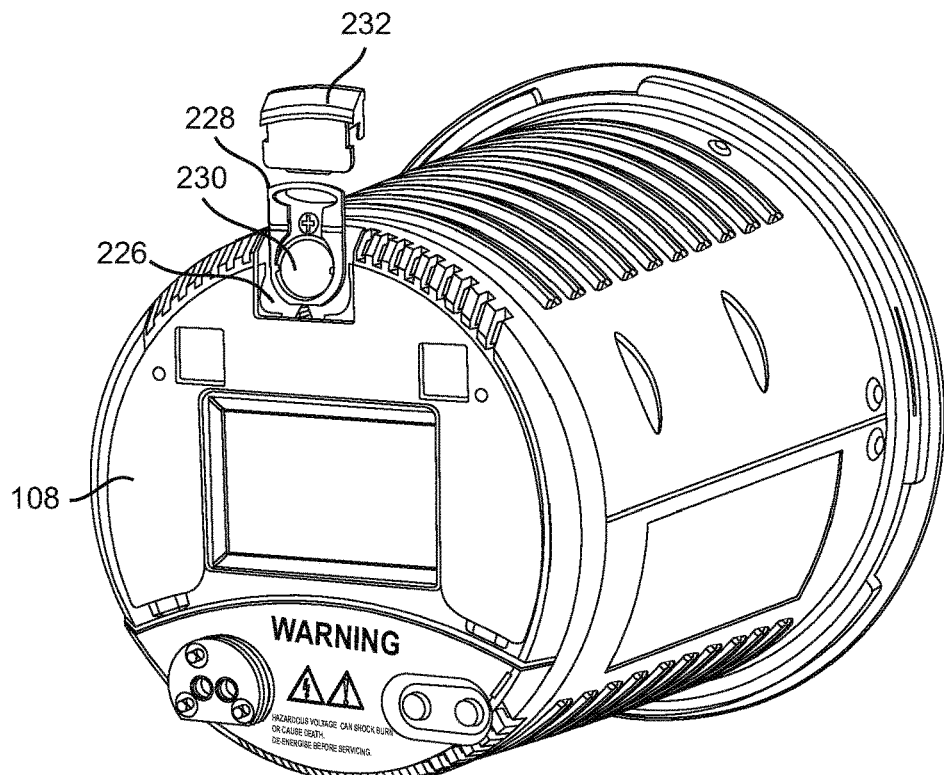
FIG. 16 is a partial perspective view of the IED shown in FIG. 3 with a battery drawer removed in accordance with an embodiment of the present disclosure.

The DSP board assembly 210 is protected by bezel 108. In certain embodiments, a sticker 109 having identifying information, instructions, etc., is disposed over the bezel 108. Buttons 220 extends through apertures 222 in the bezel 108 and contact an input mechanism on a front surface of the DSP board assembly 210. The DSP board assembly 210 includes a battery receptacle 224 which when a battery is disposed therein provides battery backup to at least one storage device for retaining data upon a power loss and/or battery backup power for a real time clock (RTC) upon a power loss. To access the battery receptacle 224, the bezel 108 includes a battery aperture or window 226, as also shown in FIGS. 11, 15 and 16. The battery aperture 226 is configured to accept a battery drawer 228 that is configured to retain a battery 230 therein. When the battery drawer 228 is disposed in the battery window 226, a battery door 232 is disposed in the battery window 226 to secure the battery drawer 228. In one embodiment, the battery drawer 228 and the battery door 232 may be a single, unitary piece, wherein the battery 230 may be removed by removing the battery door 232. It is to be appreciated that the battery 230 is replaceable or "hot swappable", that is, battery 230 may be changed without powering down the IED 100 so the IED 100 may remain in service. Additionally, the IED 100 includes a battery detection circuit for determining if the battery is holding a charge and for providing an indication, via the user interface, that the battery needs to be replaced, as will be described in greater detail below.

Figure 17A:
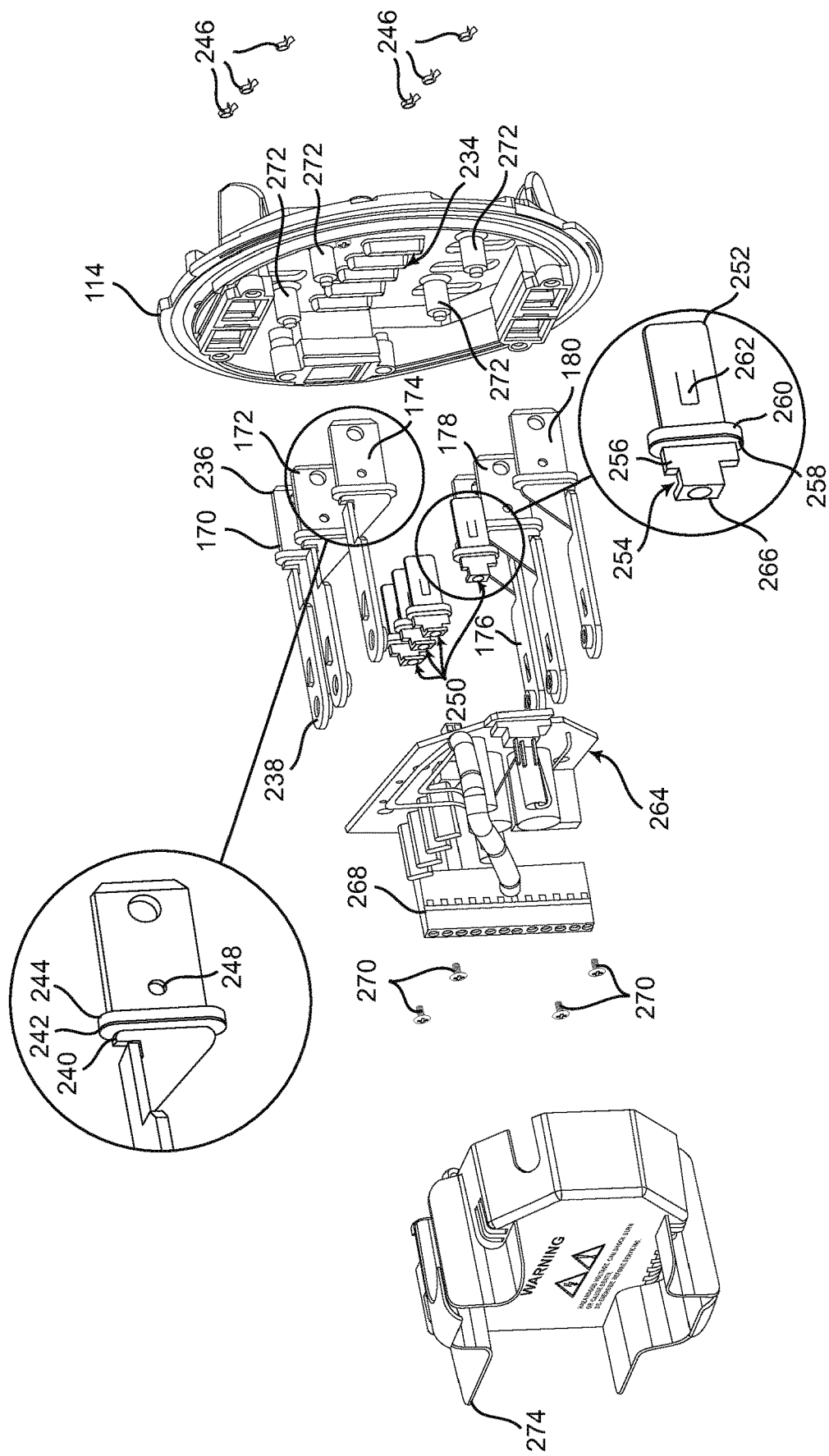
FIG. 17A is an exploded view of an input base module sub-assembly shown in FIG. 10 in accordance with an embodiment of the present disclosure.
Figure 17B:
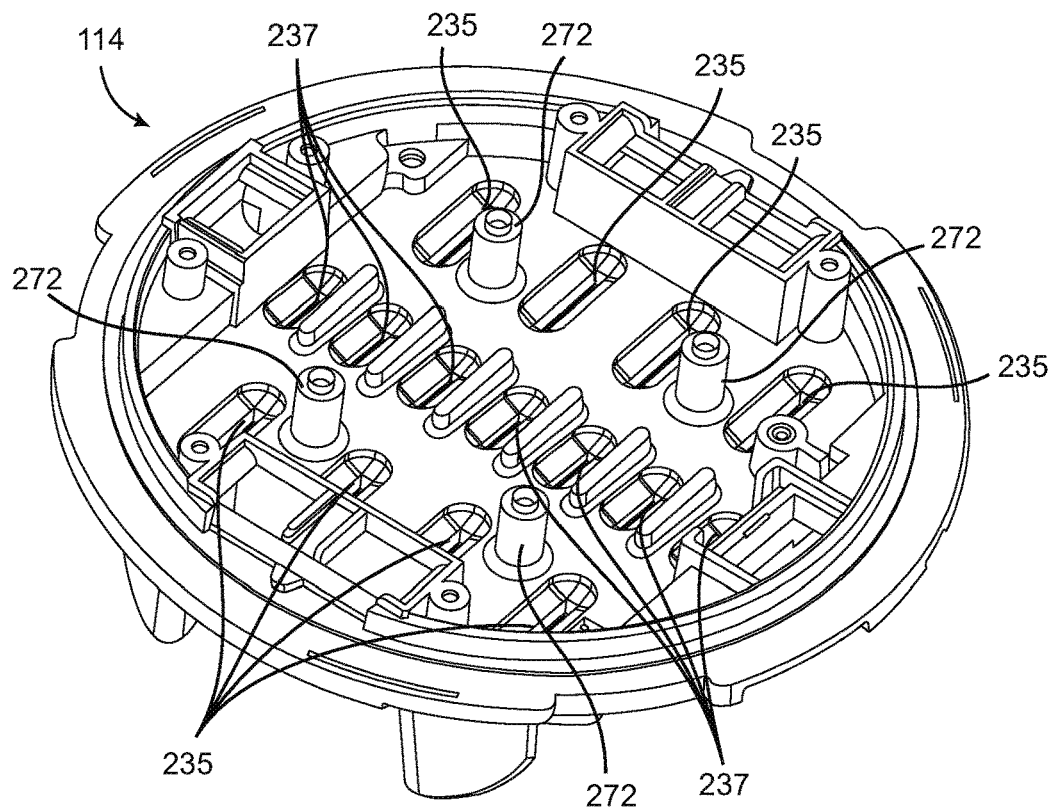
FIG. 17B is a front perspective view of a base in accordance with an embodiment of the present disclosure.
Figure 17C:
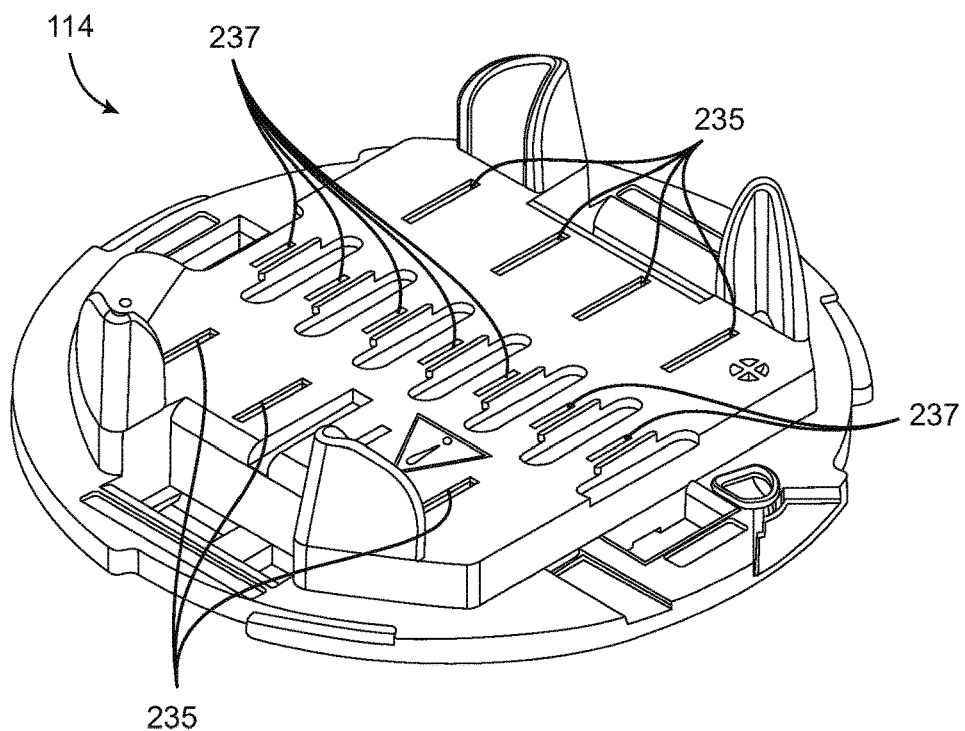
FIG. 17C is a rear perspective view of a base in accordance with an embodiment of the present disclosure.
Figure 20A:
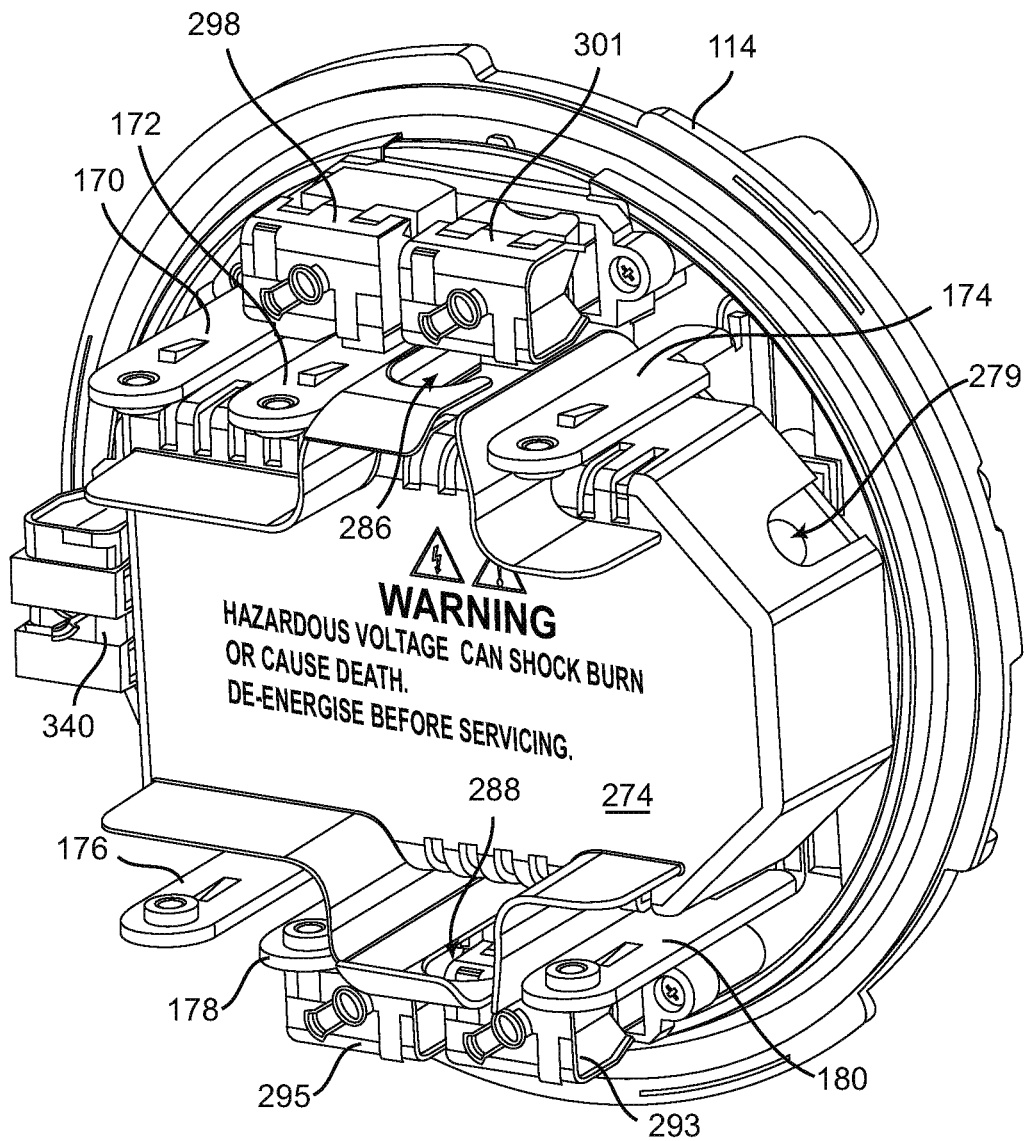
FIG. 20A is a perspective view of the input base module sub-assembly in accordance with an embodiment of the present disclosure.
Figure 21:
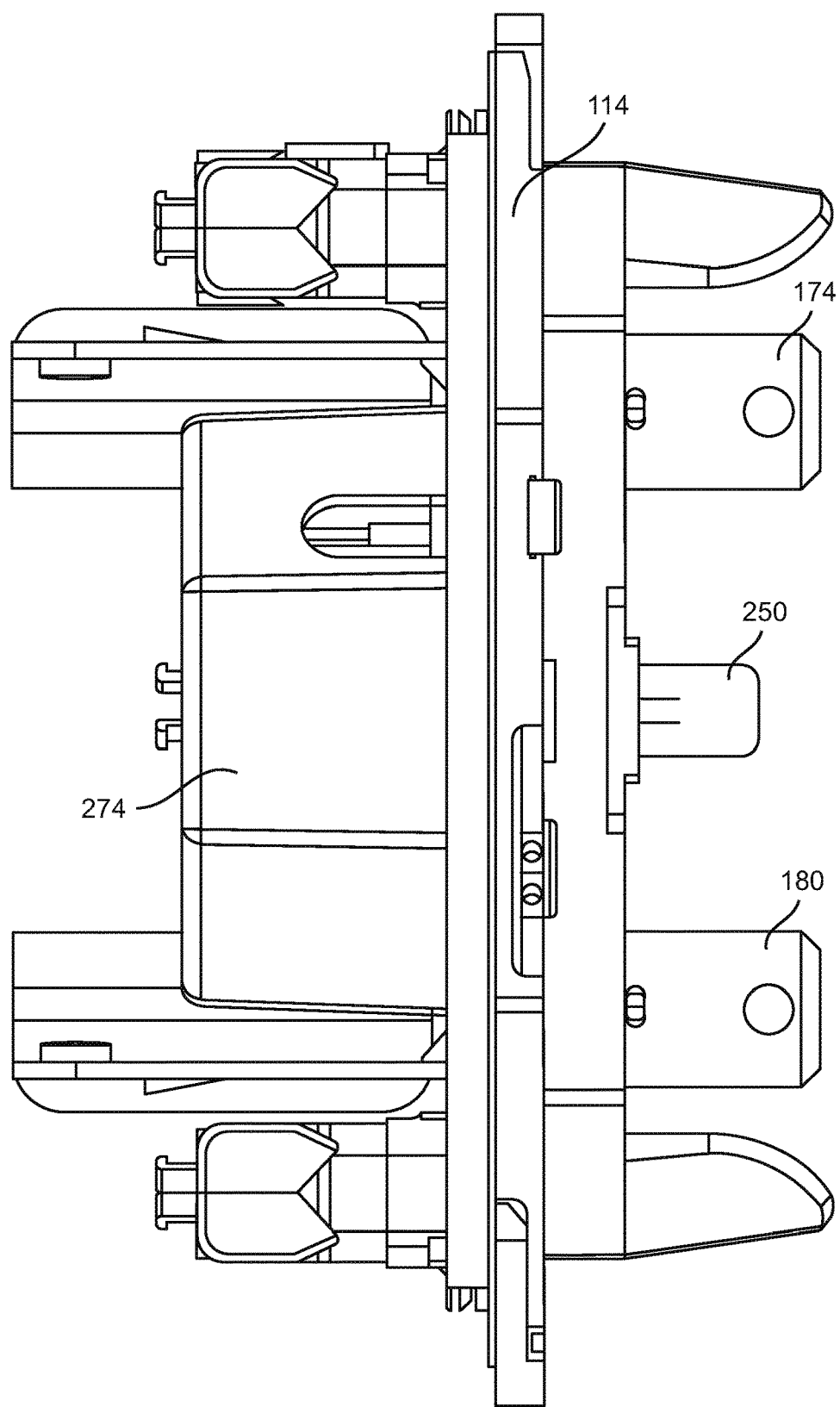
FIG. 21 is a side perspective view of the input base module sub-assembly in accordance with an embodiment of the present disclosure.

Referring to FIGS. 17, 20A and 21, the input base module sub-assembly 156 is illustrated, where FIG. 17A is an exploded view of the input base module sub-assembly 156, FIG. 20A is a perspective view of the input base module sub-assembly 156 and FIG. 21 is a side view of the input base module sub-assembly 156.

Figure 22:
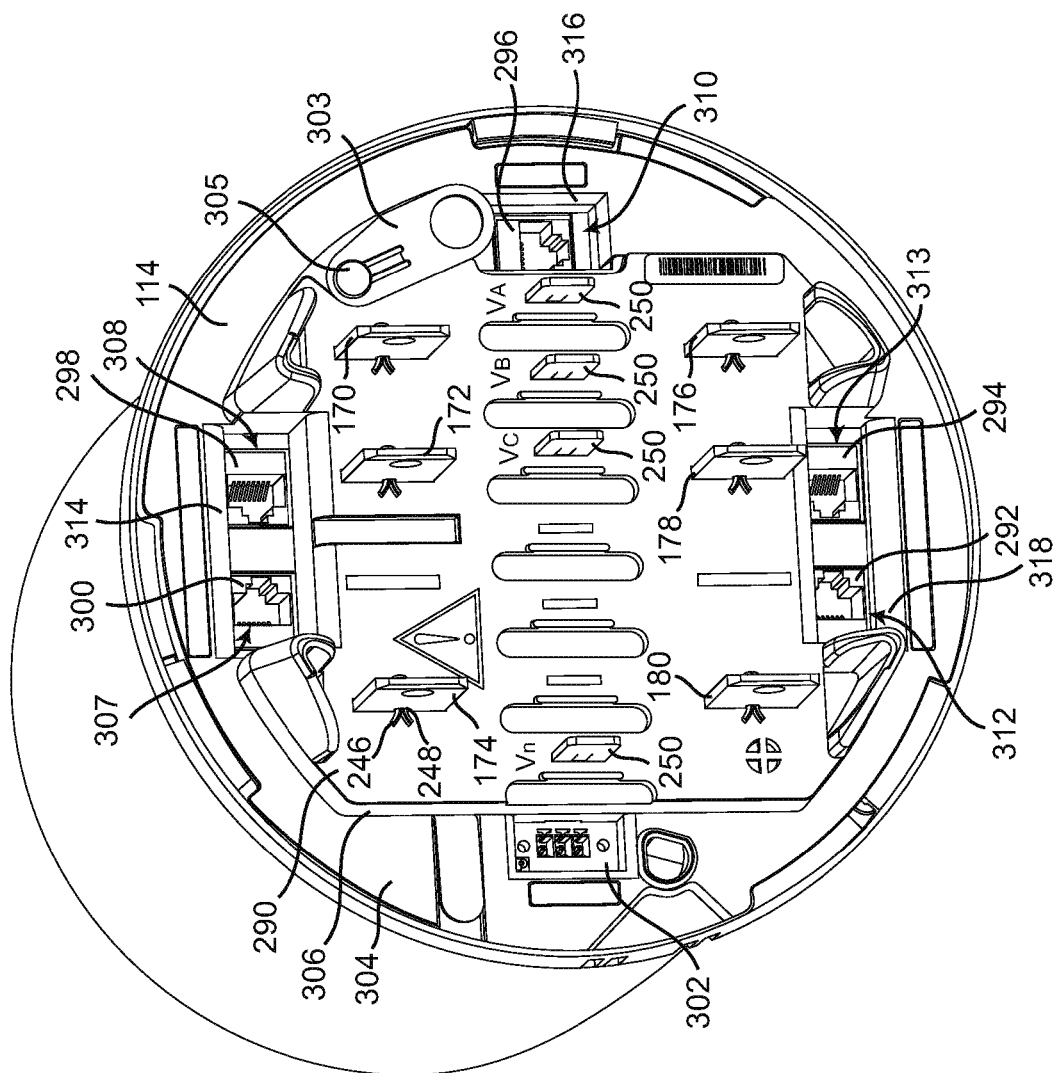
FIG. 22 is a rear left perspective view of the IED shown in FIG. 2 in accordance with an embodiment of the present disclosure.

The input base module sub-assembly 156 includes generally circular base 114 having a plurality of aperture or slots 234 for receiving current and voltage input blades. The base 114 is shown in further detail in FIGS. 17B and 17C. A plurality of current input blades 170, 172, 174, 176, 178, 180 are provided. Each current input blade 170, 172, 174, 176, 178, 180 includes a first end 236 and a second end 238 which are configured in perpendicular planes relative to each other. The first end 236 includes a shoulder tab 240 for providing a stop when at least one gasket is placed over the first end 236. In one embodiment, a metal gasket 242 is placed over the first end 236 and positioned against the shoulder tab 240. Additionally, a rubber gasket 244 may be placed over the first end 236 and positioned against the metal gasket 242. The first end 236 is disposed in an appropriate slot 234 in the base 114, e.g. a current blade aperture or slot 235. The current blade is secured to the base by disposing a fixing member 246, e.g., a cotter pin, in aperture 248 of the first end 236 of the current blade. An exemplary fixing member 246 disposed in aperture 248 is shown in FIG. 22.

A plurality of voltage input blades 250 are provided for sensing voltage. Each voltage input blade 250 includes a first end 252 and a second end 254. The second end 254 includes a shoulder tab 256 for providing a stop when at least one gasket is placed over the first end 252. In one embodiment, a metal gasket 258 is placed over the first end 252 and positioned against the shoulder tab 256. Additionally, a rubber gasket 260 may be placed over the first end 252 and positioned against the metal gasket 258. The first end 252 is disposed in an appropriate slot 234 in the base 114, e.g., voltage blade aperture or slot 237. The voltage blade 250 is secured to the base by displacing tab 262 from the plane of the blade 250 as to make contact with the base 114.

Figure 19:
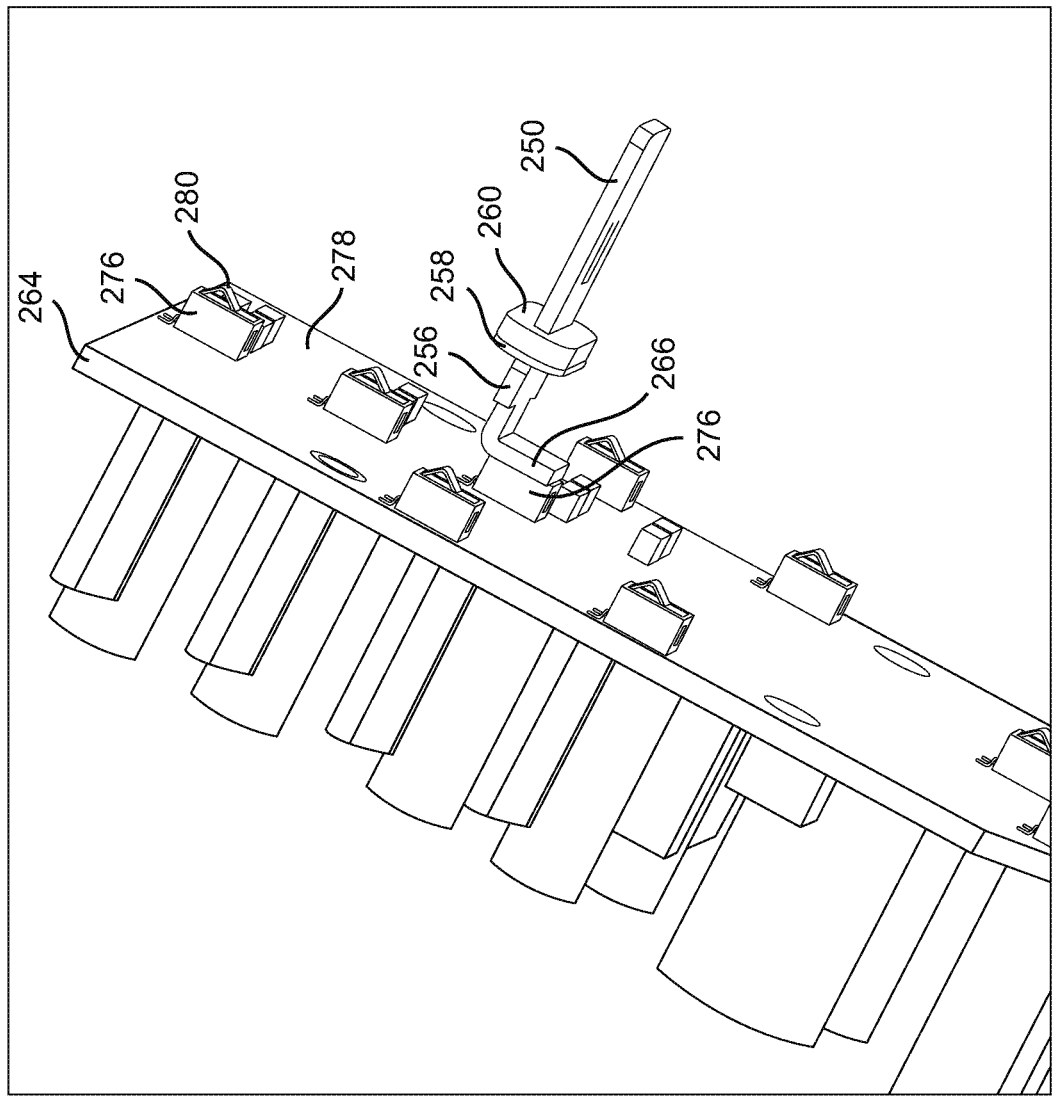
FIG. 19 illustrates a voltage terminal contacting an input filter board in accordance with an embodiment of the present disclosure.

A filter board 264 is disposed over the voltage input blades 250 and between the second ends 238 of the current input blades. Each voltage input blade 250 includes a contact 266 which is configured to have perpendicular surface with respect to the blade. Once the filter board is positioned on the base 114, each contact 266 makes contact with an input 276 on a rear surface 278 of the filter board 264, as shown in FIGS. 18 and 19. Referring to FIG. 19, each voltage input 276 of the filter board 264 includes a spring contact 280. By providing a spring contact 280 on the voltage input 276, no soldering is required between the voltage input 276 and the voltage blade 250 facilitating assembly. Additionally, since solder is not used to rigidly fix the voltage blade, the filter board and/or voltage blade is less susceptible to being broken during the forces used when installing the IED, for example, into or out of a standard ANSI meter socket. Voltage sensed by each voltage input blade 250 is provided to the filter board 264 which subsequently provides power to other portions of the IED and at least one signal indicative of the voltage sensed via connector 268, the details of which are described below. It is to be appreciated that connector 268 is coupled to filter board 264 via cable 386.

Figure 20B:
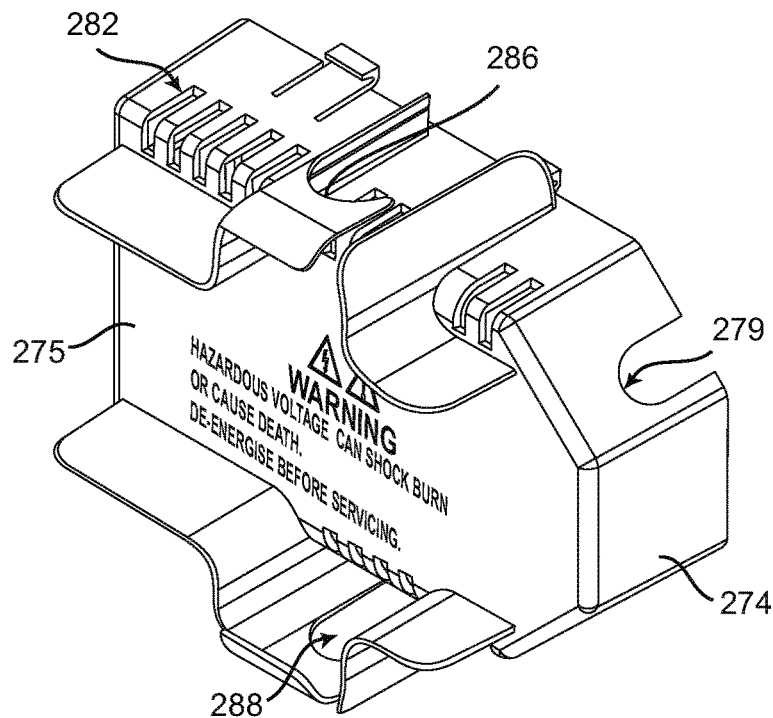
FIGS. 20B and 20C illustrate a front perspective view and a rear perspective view of a filter box cover in accordance with an embodiment of the present disclosure.
Figure 20C:
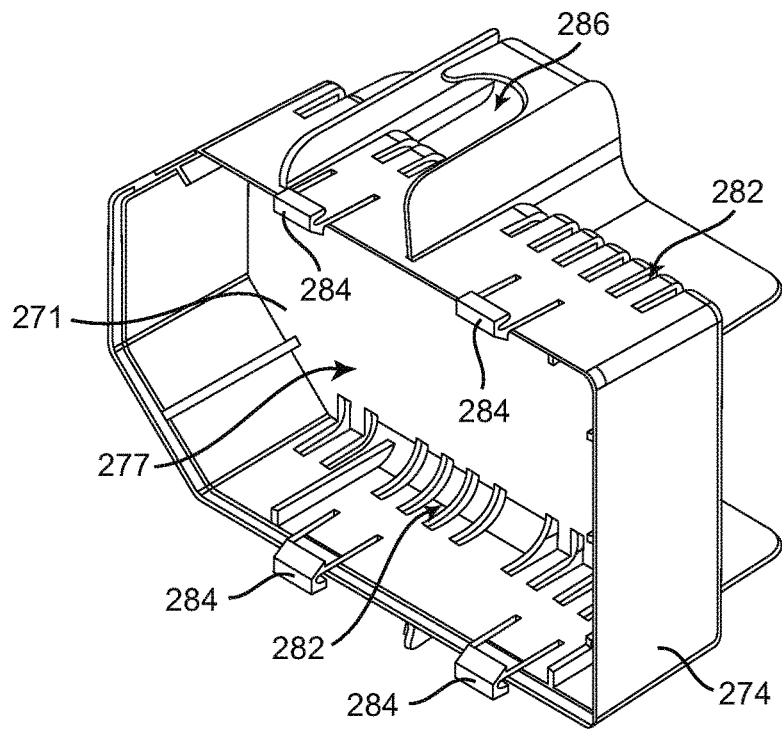

The filter board 264 is secured to the base 114 via screws or other means 270 coupled to standoffs 272, e.g., at least four standoffs are shown in FIG. 17A. A filter box cover 274 is disposed over the filter board 264, as shown in FIGS. 20A and 21, to protect the filter board 264 and to route wires and cables from the base 114 to other portions of the IED as will be described below. It is to be appreciated that FIGS. 20B and 20C show additional views of filter box cover 274 and will be described in greater detail below.

Referring to FIG. 22, a rear left perspective view of the IED shown in FIG. 2 in accordance with an embodiment of the present disclosure is provided. As discussed previously, the base 114 includes a plurality of apertures 234 for receiving the current and voltage input blades internally so the current and voltage input blades extend from the rear surface 290 of the base 114. The base 114 further employs universal quick connectors for coupling wires to the base 114. For example, as seen in FIG. 22, base 114 includes apertures 307, 308, 310, 312, and 313, where connector 300 is disposed in aperture 307, connector 298 is disposed in aperture 308, connector 296 is disposed in aperture 310, connector 294 is disposed in aperture 313, and connector 292 is disposed in aperture 312. In one embodiment, connectors 292, 294, 296, 298, 300 include RJ-45 receptacles and apertures 307, 308, 310, 312, and 313 are configured to provide access to each receptacle. At least one of the connectors, for example, connector 296, is employed for RS-485 communications and for an KYZ pulse and is coupled to RS485/KYZ board assembly 218 (via cable 341 and connector 342 as can be seen in FIG. 4 and will be described in greater detail below). The other connectors 292, 294, 296, 300 can be internally coupled to various communication modules and/or input/output modules disposed in the inner housing 206. Connector 302 is provided to be coupled to an external, auxiliary power source when the internal components of the IED are not powered via the sensed voltage provided to a respective load being monitored by the IED. Additionally, meter hanger 303 is rotatably coupled to the base 114 via pin 305.

Figure 26:
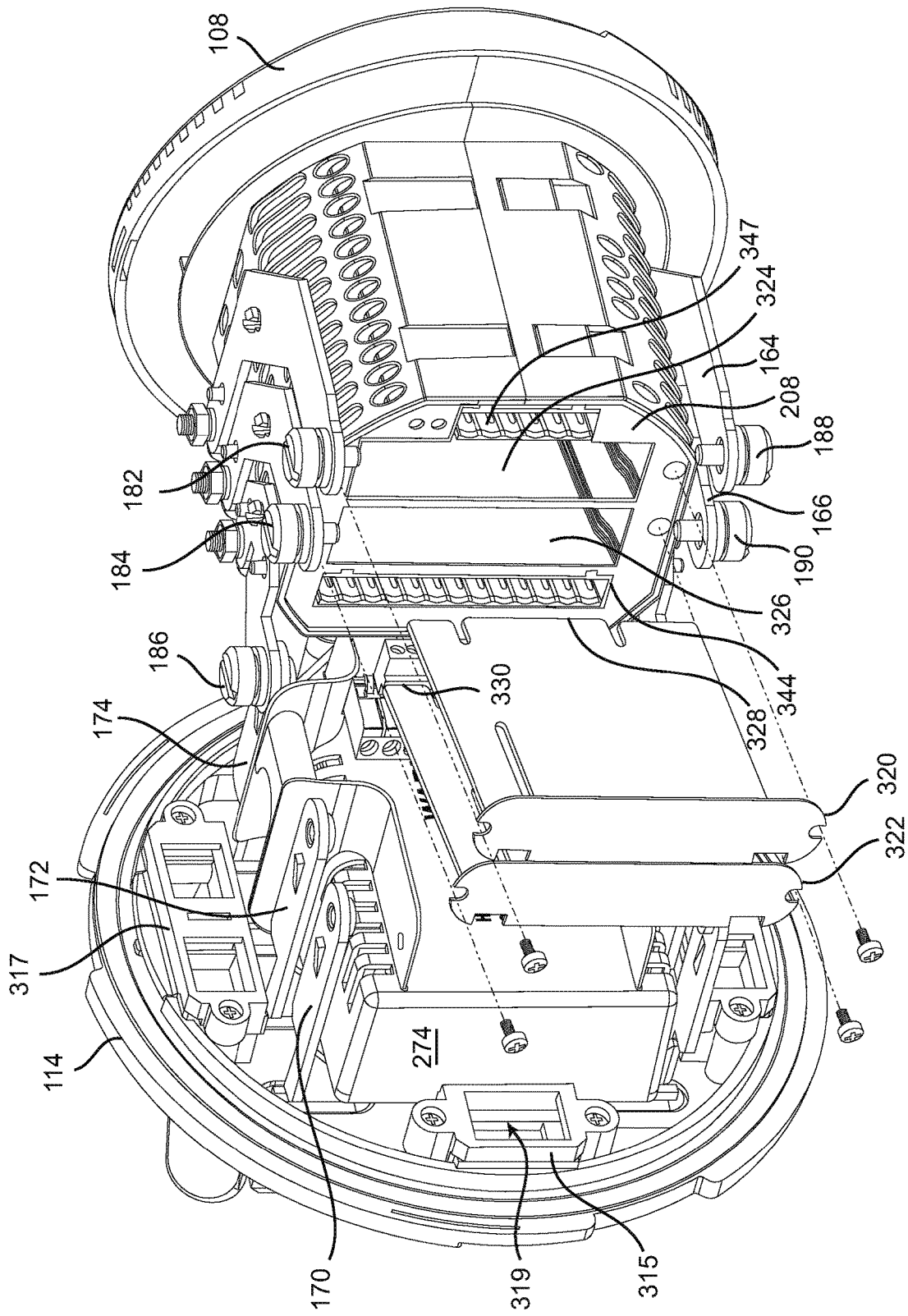
FIG. 26 illustrates the IED shown in FIG. 23 with various input/output cards removed in accordance with an embodiment of the present disclosure.

It is to be appreciated that one side of each connector includes a receptacle that can be accessed via a respective aperture of base 114 and the other side of each connector is configured to be coupled to various modules disposed in the inner housing 206 via a cable. For example, referring again to FIG. 20A, the rear sides or portions of connectors 292, 294, 296, 298, and 300 are shown disposed through apertures 312, 313, 310, 308, and 307 respectively. Connector 292 includes rear portion 293, connector 294 includes rear portion 295, connector 296 includes rear portion 340, connector 298 includes rear portion 299, and connector 300 includes rear portion 301. Connectors 292, 294, 296, 300 are coupled to base 114 via an I/O connector frame. Referring to FIG. 26, a single I/O connector frame 315 and a double I/O connector frame 317 are shown. In one embodiment, the connectors 292, 294, 296, 300 snap-in to an appropriate aperture of the I/O connector frame, e.g., aperture 319 of the single I/O connector frame 315.

Referring again to FIG. 22, it is to be appreciated that base 114 includes rear surface 290 which is offset from surface 304 by edge 306. Edge 306 allows for routing of cables that are coupled to the various connectors 292, 294, 296, 298, 300, when the IED is disposed in a socket. Furthermore, connector apertures 307, 308, 310, 312, and 313 include curved surfaces 314, 316, 318, where curved surface 314 corresponds to apertures 307 and 308, curved surface 316 corresponds to aperture 310, and curved service 318 corresponds to apertures 312 and 313 to allow for a 90 degree radius of a bend for any wire or cable coupled to a respective connector. By providing curved surfaces 314, 316, 318, cables coupled to the various connectors 292, 294, 296, 298, 300 are less susceptible to damage as opposed to having a sharp or squared edge at the apertures, i.e., the cables may conform to the curved surfaces without having to make abrupt bends.

Figure 23A:
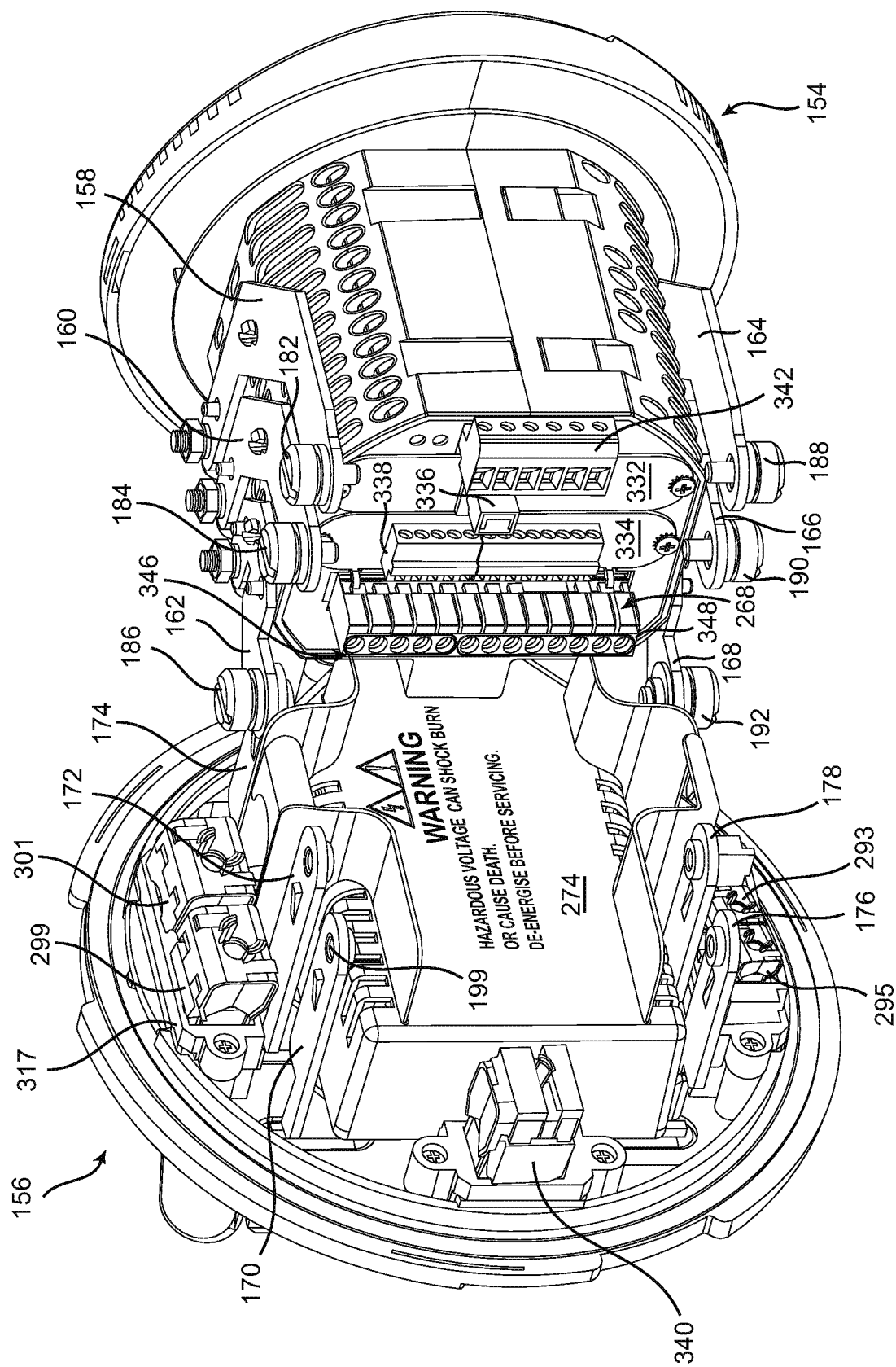
FIG. 23A is a perspective view of the IED shown in FIG. 5 hinged open in accordance with an embodiment of the present disclosure.
Figure 23E:
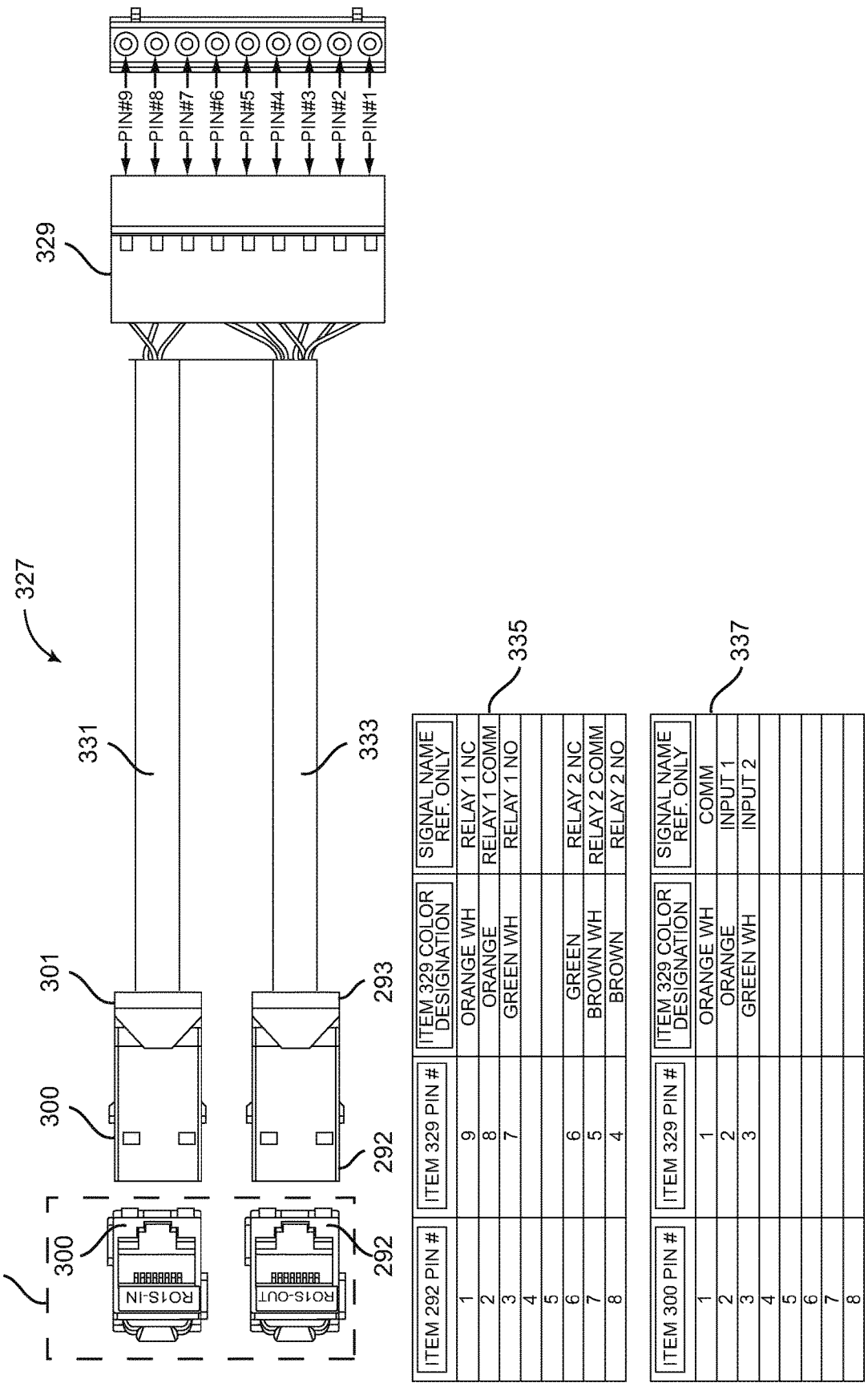
FIG. 23E illustrates a patch cable in accordance with another embodiment of the present disclosure.
Figure 24:
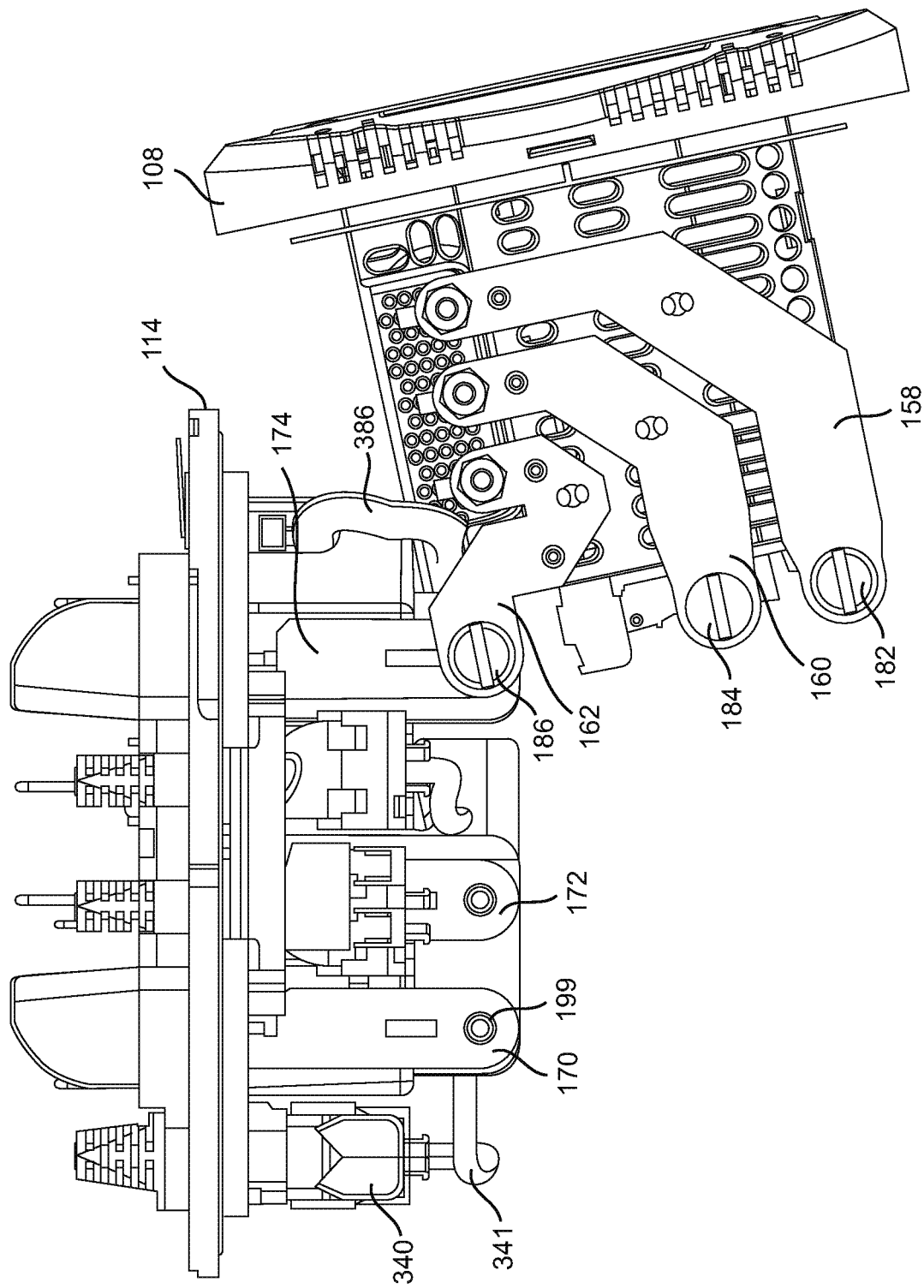
FIG. 24 is a top side view of the IED shown in FIG. 23 in accordance with an embodiment of the present disclosure.
Figure 25:
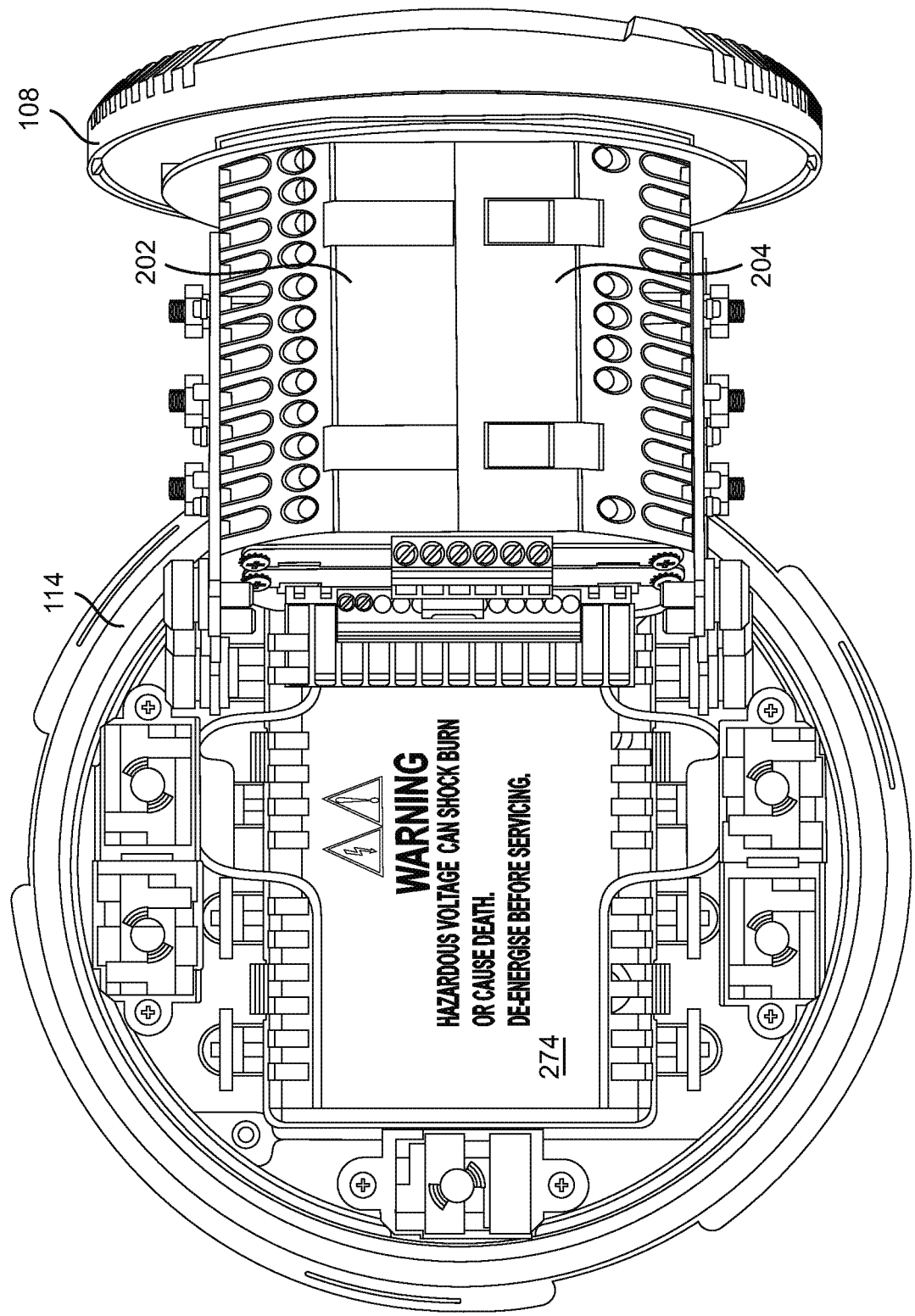
FIG. 25 is a side elevational view of the IED shown in FIG. 23 in accordance with an embodiment of the present disclosure.

Referring to FIGS. 23A, 24 and 25, a perspective view of the IED 100 hinged open in accordance with an embodiment of the present disclosure is illustrated in FIG. 23A, with a top view shown in FIG. 24 and a side elevational view shown in FIG. 25. As described above, the metering sub-assembly 154 is hinged to the input base module sub-assembly 156 via current plates 158, 160, 162, 164, 166, 168 and current input blades 170, 172, 174, 176, 178, 180 respectively. Each current plate is coupled to a respective current input blade via a spring loaded, captive screw. By uncoupling at least two corresponding sets of the spring loaded screws, the IED is hingedly opened to expose a front portion of the input base module sub-assembly 156 and a rear portion of the metering sub-assembly 154. For example, by uncoupling screw 182 and correspond screw 188 and screw 184 and corresponding screw 190, the metering sub-assembly 154 and the input base module sub-assembly 156 will be hingedly coupled via screw 186 and corresponding screw 192, i.e., to move the IED 100 to an open position as shown in FIGS. 23-25 and a closed position as shown in FIGS. 5-9. By employing spring loaded, captive screws 182, 184, 186, 188, 190, 192, the screws enable a respective current blade to be disengaged from a respective current input blade, while the screw remains coupled to the respective current plate to prevent loss of the screw. It is to be appreciated that other types of fasteners, in lieu of spring loaded captive screws, may be employed to couple a current plate to a respective current input blade. It is further to be appreciated that each current input blade includes an aperture for receiving or mating with the screws 182, 184, 196, 188, 190, 192. For example, current input blade 170 includes aperture 199 for mating with screw 182. Although not specifically pointed out, each current input blade includes a similar aperture.

In the open position, wiring between the metering sub-assembly 154 and the input base module sub-assembly 156 is facilitated. For example, a rear side 340 of connector 296 is exposed on the input base module sub-assembly 156. In one embodiment, the metering sub-assembly 154 includes a RS-485/KYZ connector 342, where RS-485/KYZ connector 342 is coupled to a receptacle 347 (shown in FIG. 26) which is coupled to RS-485/KYZ board 218. RS-485/KYZ connector 342 can then be coupled to the rear side 340 of connector 296, for example, via a patch cable. It is to be appreciated that patch cable 341 can be seen coupled to connector 342 and rear portion 340 of connector 296 in FIGS. 4 and 5. Additionally, the metering sub-assembly 154 includes connector 268 which includes a power input portion 346 and a voltage sensing input portion 348. Power and voltage sensed is provided by the filter board 264 to connector 268 via cable 386. It is to be appreciated that cable 386 can be seen coupled to connector 268 in FIG. 4. The connector 268 is received by receptacle 344 (most clearly shown in FIG. 26), where receptacle 344 is coupled to the VIP board 212.

The functionality of the IED 100 can be expanded by the addition of function modules or cards disposed in the metering sub-assembly 154 and coupled to the DSP board assembly 210. Referring to FIG. 26, function modules or cards 320, 322 are disposed in the metering sub-assembly 154 via apertures or slots 324, 326 in the back plate 208. When the function modules or cards 320, 322 are fully seated in the metering sub-assembly 154, an edge 328, 330 of the function modules or cards 320, 322 respectively are received by an appropriate connector of the DSP board assembly 210 and is thus coupled thereto.

It is to be appreciated that the function modules or cards 320, 322 may add functionality to the IED by including additional processing devices, additional memories or a combination thereof that work in cooperation, or independently, with the processing devices of the DSP board assembly 210. In other embodiments, the function modules or cards 320, 322 may expand the input/output (I/O) and/or the communication capabilities of the IED. For example, exemplary I/O modules or cards may include a four channel bi-directional 0-1 mA output card, a four channel 4-20 mA output card, a two relay output/two status input card, a four pulse output/four status input card, etc. or any combination thereof.

Exemplary communication cards or modules may include a 100Base T Ethernet card, an IEC 61850 protocol Ethernet card, a fiber optic communication card, among others. It is to be appreciated that the Ethernet card or module may add at least one of the following capabilities and/or protocols to the IED including, but not limited to, Modbus TCP, DNP 3.0, File Transfer Protocol (FTP), Simple Mail Transfer Protocol (SMTP), SNMP, encryption, IEEE 1588 time sync, etc. It is further to be appreciated that two communication cards or modules may be employed to provide dual Ethernet ports. In one embodiment, the dual Ethernet ports may be configured such that each port is independent and communicatively isolated from the other port. Such a configuration is described in commonly owned U.S. Pat. No. 7,747,733, the contents of which are hereby incorporated by reference in its entirety. In this embodiment, each port has a unique identifier, e.g., an IP address, and may be connected to a different network than the other port. In another embodiment, each port connects to the same network. In this embodiment, each port may have the same identifier, e.g., IP address, wherein one of the two ports acts as an Ethernet switch to facilitate network wiring.

It is to be appreciated that the above-mentioned list of cards and/or modules, whether intelligent or passive, is not exhaustive and other types of inputs, outputs and communication protocols are contemplated to be within the scope of the present disclosure. Further exemplary cards and/or modules and techniques for coupling such cards and/or modules to add functionality, capabilities, etc. are disclosed and described in commonly owned U.S. Pat. Nos. 7,184,904 and 7,994,934, the contents of which are hereby incorporated by reference in their entireties.

Referring back to FIG. 23A, a 100Base T Ethernet card 332 is shown inserted into slot 324 and a two relay output/two status input card 334 is shown inserted into slot 326. Card 332 includes a connector 336, e.g., an RJ-45 receptacle, which may then be coupled via a patch cable to a connector on the base 114, for example, rear portion 299 of connector 298. Similarly, card 334 includes a connector 338, e.g., a crimp connector. It is to be appreciated that the patch cables may be configured with preformed ends to facilitate installation. Referring to FIGS. 23B-23D, an exemplary patch cable 321 is provided. The patch cable 321 may be configured to include connector 298 on one end of a multiconductor cable 325 and a RJ45 plug 323 on the other end of the cable 325. In this manner, the RJ45 plug 323 of the patch cable 321 merely needs to be plugged into the connector 336 on card 332 and the connector 298 needs to be mated to the I/O connector frame 317, e.g., plugged or snapped into. It is further to be appreciated that the RJ45 connector and connector 289 are merely exemplary and other types of plugs, receptacles, connectors, etc. are contemplated to be within the scope of the present disclosure.

It is to be appreciated that certain types of cards may be coupled to separate connectors on base 114 for separate input/output communication. For example, in one embodiment, the two relay output/two status input card 334 is configured to be coupled to two different connectors coupled to base 114. In one embodiment, the top portion of connector 338 may be coupled via a patch cable to a connector on the base 114, for example, rear portion 301 of connector 300 for input communication and the bottom portion of connector 338 may be coupled via a patch cable to another connector on the base 114, for example, rear portion 293 of connector 292. In another embodiment, the patch cable may be configured to include a single connector on one end for interacting with connector 338 of card 334, while the other end of the patch cable include two separate connectors, e.g., connector 292 and connector 300. Such an exemplary patch cable is shown in FIG. 23E as cable 327. Patch cable 327 includes a single connector 329 for coupling to connector 338 of card 334. The connector 329 is coupled to a first multiconductor cable 331 terminating with connector 300 and connector 329 is coupled to a second multiconductor cable 333 terminating with connector 292. Legend 335 indicates an exemplary wiring configuration between connector 329 and connector 292 and legend 337 indicates an exemplary wiring configuration between connector 329 and connector 300.

It is to be appreciated that when no additional function modules or cards are used, a blank plate (not shown) is disposed over slots 332, 334. Furthermore, it is to be appreciated that when no additional function module or cards are used, one or more of connectors 292, 294, 296, 298, and/or 300 may be removed and blank plates or covers (not shown) may be disposed over apertures 307, 308, 310, 312, and/or 313. In one embodiment, the blank plates or covers disposed over apertures 307, 308, 310, 312, and/or 313 may interact with an aperture of the I/O connector frame to secure the covers to the base 114.

In one embodiment, when one or more of connectors 292, 294, 296, 298, 300 is coupled to base 114, the receptacle of each respective connector that is coupled to base 114 is color coded, where the color of the receptacle (as seen from the rear side of the base 114 as shown in FIG. 22) corresponds to the type of card or module the respective connector is coupled to internally in the IED. In this way, when the IED is in a closed position (i.e., the current plates of metering sub-assembly 154 are each coupled to the current input blades of input base module sub-assembly 156) the type of modules and/or cards included in the IED and connected to a respective connector on base 114 is readily discernable by a user without the need to open the IED. A legend including the colors associated with each connector may be included on a surface of the IED. For example, in one embodiment, a legend may be included on sticker 151 disposed on upper clam shell half 150 or on sticker 153 disposed on lower clam shell half 152 (as seen in FIG. 10). The legend may include various colors assigned to the different cards/modules that can be included in the IED. For example, in one embodiment, the legend may have the color white associated with an 100Base T Ethernet card, the color green associated with an IEC 61850 protocol Ethernet card, the color yellow associated with the four channel bi-directional 0-1 mA output card, the color black associated with the four channel 4-20 mA output card, and the color grey associated with RS-485/KYZ card. It is to be appreciated that the legend may also include colors associated to one of two ports of a card (i.e., input or output) for cards that are connected to two different connectors on base 114. For example, in one embodiment the legend may have the color pink associated with the input of the four pulse output/four status input card, the color blue with the output of the four pulse output/four status input card, the color brown associated with the input of the two relay output/two status input card (e.g., card 334 in FIG. 26), and the color purple associated with the output of the two relay output/two status input card. It is to be appreciated that the above described color associations are merely exemplary and that any color association can be used to indicate which connector coupled to base 114 is associated to a specific card/module of the IED Referring to FIGS. 20B and 20C, perspective views of front side 275 and rear side 271 of filter box cover 274 are shown in accordance with the present disclosure. As stated above, filter box cover 274 is configured to protect filter board 264 and to facilitate the routing of wires from connectors coupled to base 114 to other portions of the IED. Filter box cover 274 includes a plurality of clips 284 that enable the filter box cover 274 to be snapped onto the filter board 264. When filter box cover 274 is coupled to the filter board 264, filter board 264 is disposed in the interior 277 of filter box cover 274 and is protected. Filter box cover 274 also includes a plurality of louver 282 to facilitate the dissipation of heat generated by filter board 264 and other components of the IED.

Additionally, in one embodiment, filter box cover 274 includes apertures 279, 286, and 288, where apertures 286 and 288 can also be seen in FIGS. 20A and 23. Aperture 279 is configured to provide an opening or path for cable 386 (as seen in FIGS. 6, 12, 13, 14, and 24) which couples filter board 264 to receptacle 344 when filter board 264 is disposed in the interior of filter box cover 274 and filter box cover 274 is coupled to base 114. Aperture 286 is configured to receive and pass through a cable coupled to one of rear portion 299 of connector 298 or rear portion 301 of connector 300 and a connector (such as connector 336 or connector 338) coupled to a card (such as card 320 or card 322) disposed in one of slots 324 and 326. Aperture 288 is configured to receive and pass through a cable coupled to one of rear portion 295 of connector 296 and rear portion 293 of connector 294 and a connector (such as connector 336 or connector 338) coupled to a card (such as card 320 or card 322) disposed in one of slots 324 and 326.

Figure 27A:
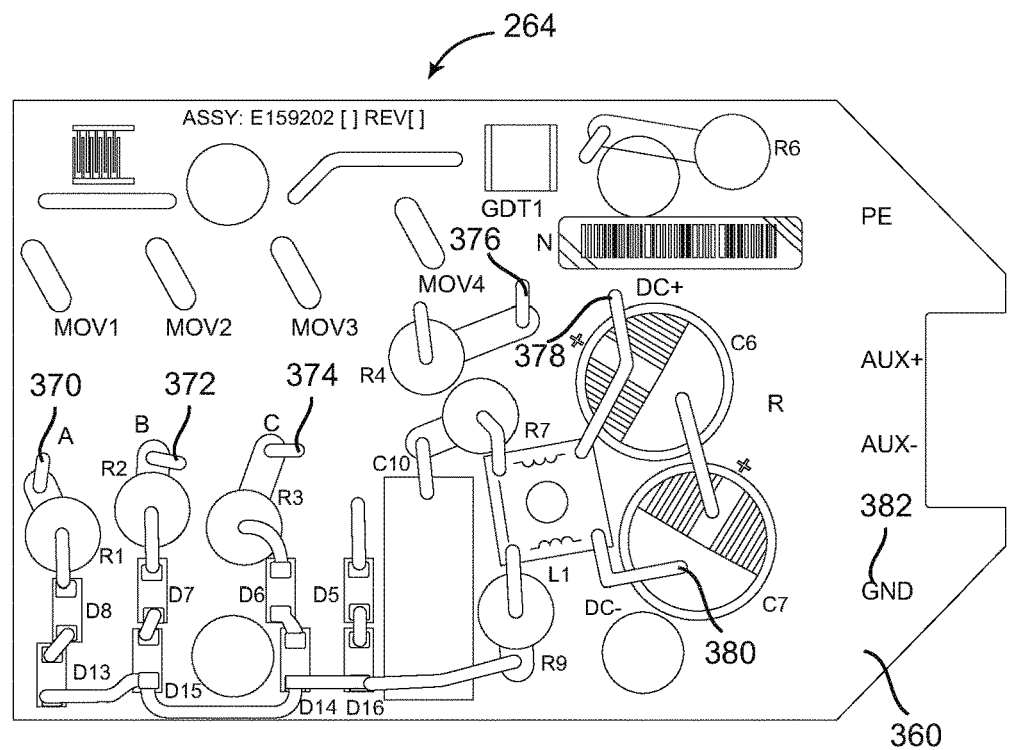
FIG. 27A illustrates a top surface of a filter board in accordance with an embodiment of the present disclosure.
Figure 27B:
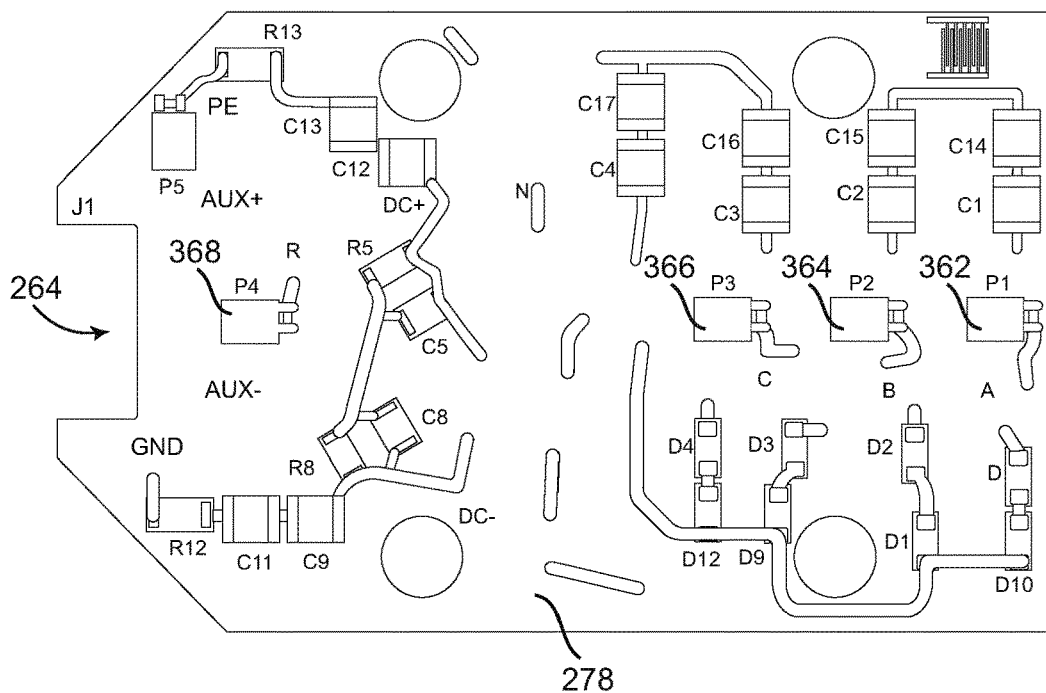
FIG. 27B illustrates a bottom surface of a filter board in accordance with an embodiment of the present disclosure.

As described above, voltage sensed by each voltage input blade 250 is provided to the filter board 264 which subsequently provides power to other portions of the IED and at least one signal indicative of the voltage sensed from the electrical distribution system via cable 286 and connector 268. Referring to FIG. 27A, a top surface 360 of the filter board 264 is illustrated, while FIG. 27B illustrates the bottom surface 278 of the filter board 264. The bottom surface 278 of the filter board 264 includes at least one contact pad 362, 364, 366, 368 that is coupled to a corresponding voltage input 276, as shown in FIGS. 18 and 19. The sensed voltage is then passed through the various components of the IED to provide a sensed voltage for example, for each phase of an electrical distribution system, and provide power as will be described in relation to FIG. 29.

The sensed voltage for each phase is provided by a contact point on the top surface 360 of the filter board 264. Referring to FIG. 27A, contact point 370 provides sensed voltage for phase A, contact point 372 provides sensed voltage for phase B, contact point 374 provides sensed voltage for phase C, and contact point 376 provides sensed voltage for neutral.

Figure 28:
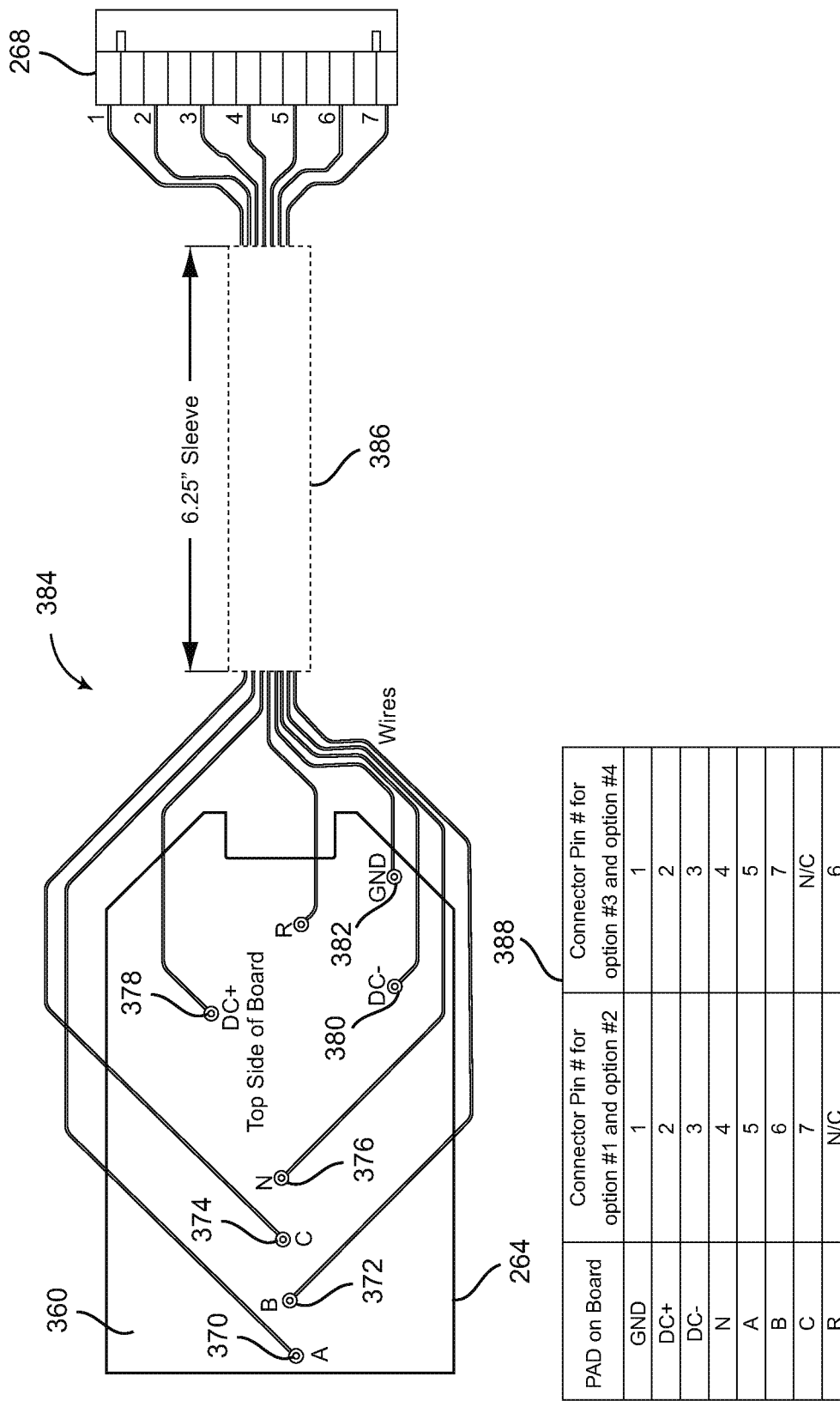
FIG. 28 illustrates a filter board assembly in accordance with an embodiment of the present disclosure.

Additionally, power is provided through contact point 378 for DC+, contact point 380 for DC− and contact point 382 for ground. Referring to FIG. 28, a filter board assembly 384 includes the filter board 264, a wiring harness or cable 386 and connector 268. FIG. 28 illustrates the wiring between the filter board 264 and connector 268 as indicated by legend 388. The sensed voltage for each phase and power for various components of the IED are transmitted from the filter board 264 via cable 386 to the VIP board 212. In certain embodiments, the sensed voltage for each phase may be further transmitted to the DSP board 210 for further processing. It is to be appreciated that the wiring harness or cable 386 may include a twisted pair connection to reduce noise and prevent other interfering signals from being wrongfully coupled to the wiring harness or cable 268. In other embodiment, the wiring harness or cable 268 may be enclosed by a ferrite bead noise reduction filter to limit an amount of conducted and radiated noise being emitted from the IED.

Figure 29:
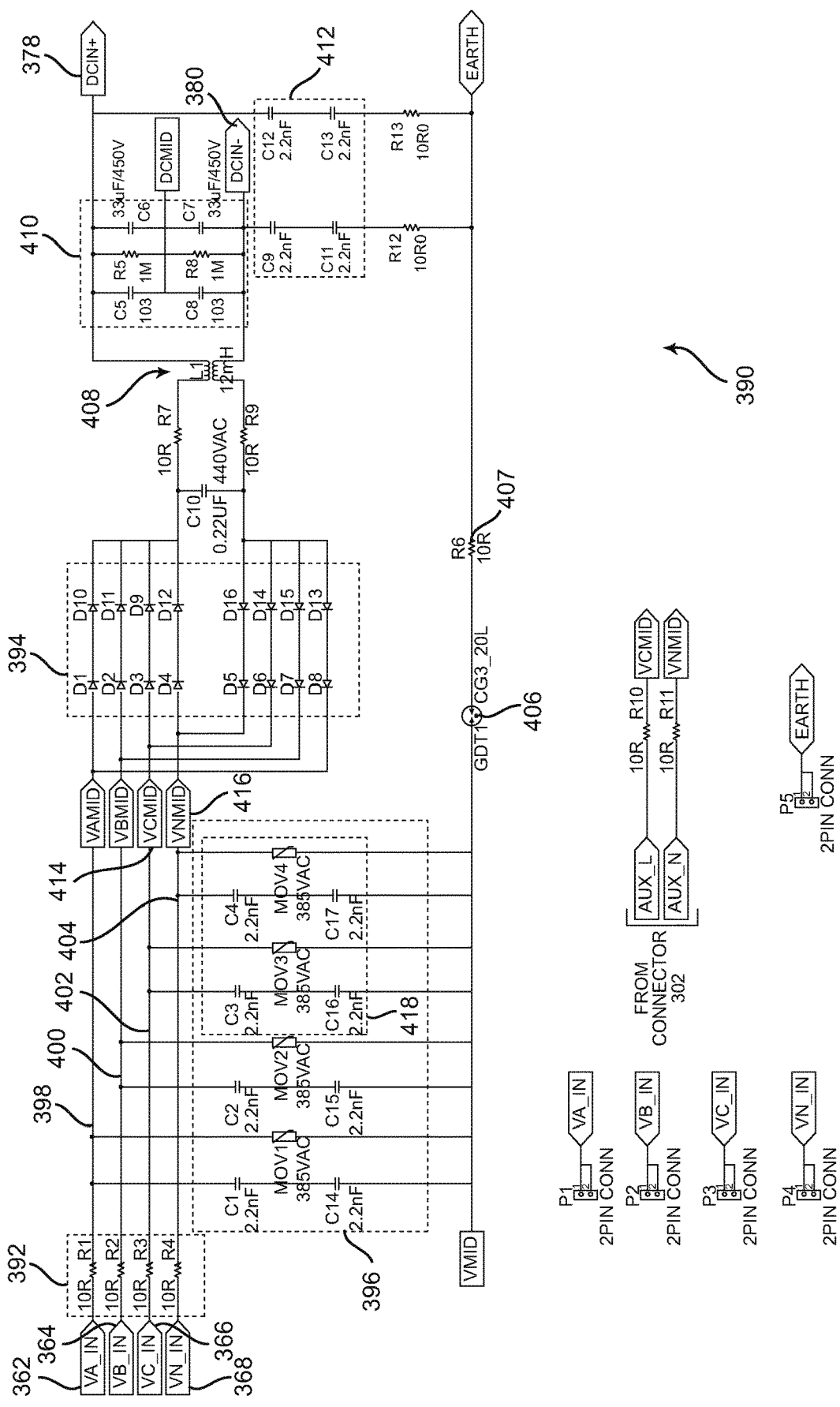
FIG. 29 is an electrical schematic diagram of a filter/suppression circuit in accordance with an embodiment of the present disclosure.

Referring to FIG. 29, an electrical schematic diagram of the filter board circuit in accordance with an embodiment of the present disclosure is provided. It is to be appreciated that similar reference numbers and/or labels (e.g., D1 for diode, R1 for resistor) shown in FIG. 29 correspond to reference numbers and/or labels on the filter board 264 shown in FIGS. 27A and 27B. Voltage is sensed, via input voltage blades 250, and input to the circuit 390 at contact pads 362, 364, 366, 368. The input voltage initially passes through a current limiting section 392 where a current limiting resistor R1, R2, R3, R4, is coupled in series with each voltage input. The output of the current limiting resistors R1, R2, R3, R4 is transmitted to a rectifier section 394. A suppressor section 396 is coupled in parallel to the transmission paths between the current limiting section 392 and rectifier section 394. The suppressor section 396 includes at least one at capacitor and at least one metal oxide varistor (MOV) coupled in parallel with each voltage input path. For example, the voltage input path for phase A 398 includes a series combination of capacitors C1, C14 in parallel with path 398 and one metal oxide varistor MOV1 coupled in parallel with the path 398; the voltage input path for phase B 400 includes a series combination of capacitors C2, C15 in parallel with path 400 and one metal oxide varistor MOV2 coupled in parallel with the path 400; the voltage input path for phase C 402 includes a series combination of capacitors C3, C16 in parallel with path 402 and one metal oxide varistor MOV3 coupled in parallel with the path 402; and the voltage input path for neutral 404 includes a series combination of capacitors C4, C17 in parallel with path 404 and one metal oxide varistor MOV4 coupled in parallel with the path 404. Capacitors C1-C4, C14-C17 are provided for suppressing noise. The metal oxide varistors MOV1, MOV2, MOV3, MOV4 clamp the input voltage to prevent an over-voltage surge condition between each phase which may result in damage to the rectifier section 394 or other components thereafter. The values of the metal oxide varistors MOV1, MOV2, MOV3, MOV4 shown in FIG. 29 are exemplary values and are chosen based on the ratings of the components of the rectifier section 394 and components thereafter. Additionally, a common mode clamping device 406, e.g., a gas tube, is provided for clamping the voltage between any sensed phase and earth potential. Resistor (R6) 407 is provided in series with clamping device 406 to reduce current flow through clamping device 406 thereby extending the useful life of clamping device 406 and other components in the circuit. By employing earth potential as the reference for each phase provides for a safer environment as compared to conventional IEDs or meters that employ neutral as the reference.

It is to be appreciated that the current limiting resistors R1, R2, R3, R4 and resistor R6 407 limit the amount of current passing through the metal oxide varistors MOV1, MOV2, MOV3, MOV4 and clamping device 406 to prevent damage to the metal oxide varistors MOV1, MOV2, MOV3, MOV4 and clamping device 406 and lengthen their lifetime.

The rectifier section 394 receives AC voltage as sensed by the voltage input blades and converts the AC voltage to a DC voltage. The DC voltage is then passed to the common mode choke or filter 408, e.g., an inductor, to prevent electromagnetic interference (EMI) and radio frequency interference (RFI) on the power supply lines. The DC voltage is then passed to buffer 410 for storing energy to be supplied via DC+ 378 and DC− 380. The buffer 410 includes capacitors C5, C6, C7, C8 and resistors R5, R8. An additional noise suppression section 412 is optionally provided at the output including capacitors C9, C11, C12, C13.

In another embodiment, voltage used for supplying power to the various components of the IED may be supplied via an auxiliary power source, e.g., coupled to auxiliary connector 302 as shown in FIG. 22. In this embodiment, sensed voltage via pads 362, 364, 366, 368 is provided to the VIP board 212 for determining the respective voltages of the electrical distribution system and components R1, R2, R3, R4 are removed so the sensed voltage does not pass to the rectifier section 394. Auxiliary power provided via connector 302 is coupled to contact point 414 (VCMID) and contact point 416 (VNMID) which is then passed to rectifier section 394. In this embodiment, only portion 418 of suppression section 396 is employed and components C1, C14, MOV1, C2, C15 and MOV2 may be removed. The remaining circuit operates as described above.

It is to be appreciated that the filter board 264 provides full surge suppression at transient voltage conditions, i.e., the filter board 264 snubs transient voltage events that traditionally damage conventional meters and thus improves reliability of meters/IEDs utilizing the filter board 264 of the present disclosure. That is, the metal oxide varistors MOV1, MOV2, MOV3, MOV4 suppress phase-to-phase voltage transients, while the clamping device 406 suppresses phase-to-earth voltage transients. It is further to be appreciated that line surge suppression is not found in revenue meters or revenue IEDs, and therefore, it is envisioned that other forms of line surge suppression may be designed and that such line surge suppression techniques are contemplated to be within the scope of the present disclosure.

Figure 30:
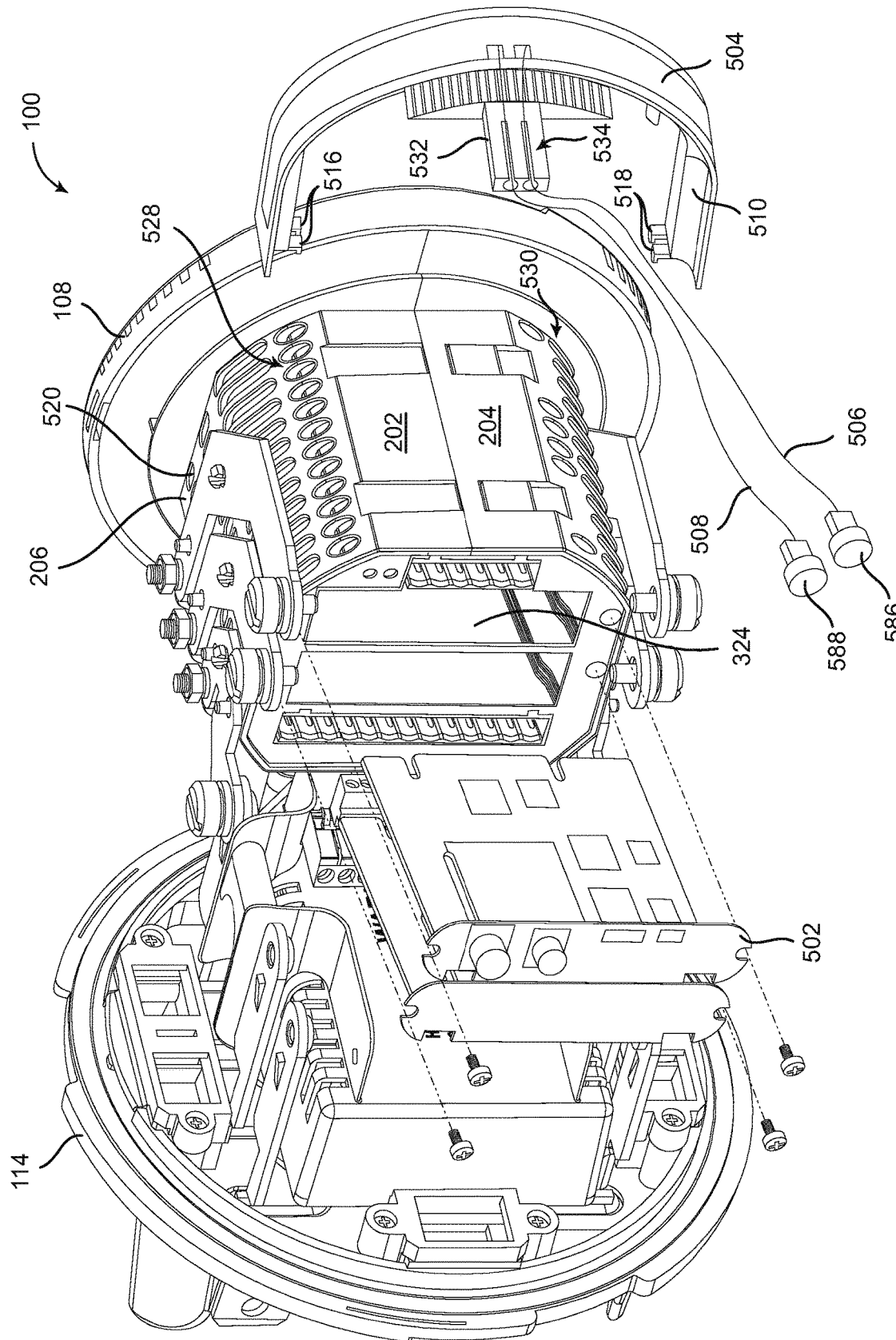
FIG. 30 is an exploded view of the IED illustrating a wireless communication card and an antenna holder in accordance with an embodiment of the present disclosure.

Referring to FIG. 30, a perspective view of the IED 100 hinged open in accordance with an embodiment of the present disclosure is illustrated. In this embodiment, a communication device and associated antenna provide wireless communication for the IED 100. In one embodiment, a communication device 502 is configured as a communication card which is disposed in aperture 324. It is to be appreciated that the details of the communication device 502 will be described in greater detail below. An antenna 504 is coupled to the communication device 502 by first and second cables 506, 508, e.g., coaxial cables. In one embodiment, the antenna 504 is a flat, flexible polymer monopole type antenna, e.g., a strip antenna, which is supported by an antenna holder 510. In one embodiment, the antenna 504 may be employed to radiate and receive radio frequency (RF) signals.

Referring to FIGS. 31A-31D, the antenna holder 510 includes a C-shaped member 512, which generally conforms to the shape of the inner housing 206. It is to be appreciated that the member 512 additionally conforms to an inner surface of the housing 102. Member 512 includes a generally flat outer surface 514, which supports antenna 504.

It is to be appreciated that one surface of antenna 504 is in full contact with the outer surface 514 of the antenna holder 510. In certain embodiments, antenna 504 is applied to the surface 514 by double-sided tape, however, other methods for applying the antenna 504 to the holder 510 are contemplated to be within the scope of the present disclosure, e.g., adhesives, screws, clips, loop and hook fasteners, other mechanical attachment means, etc.

Figure 32:
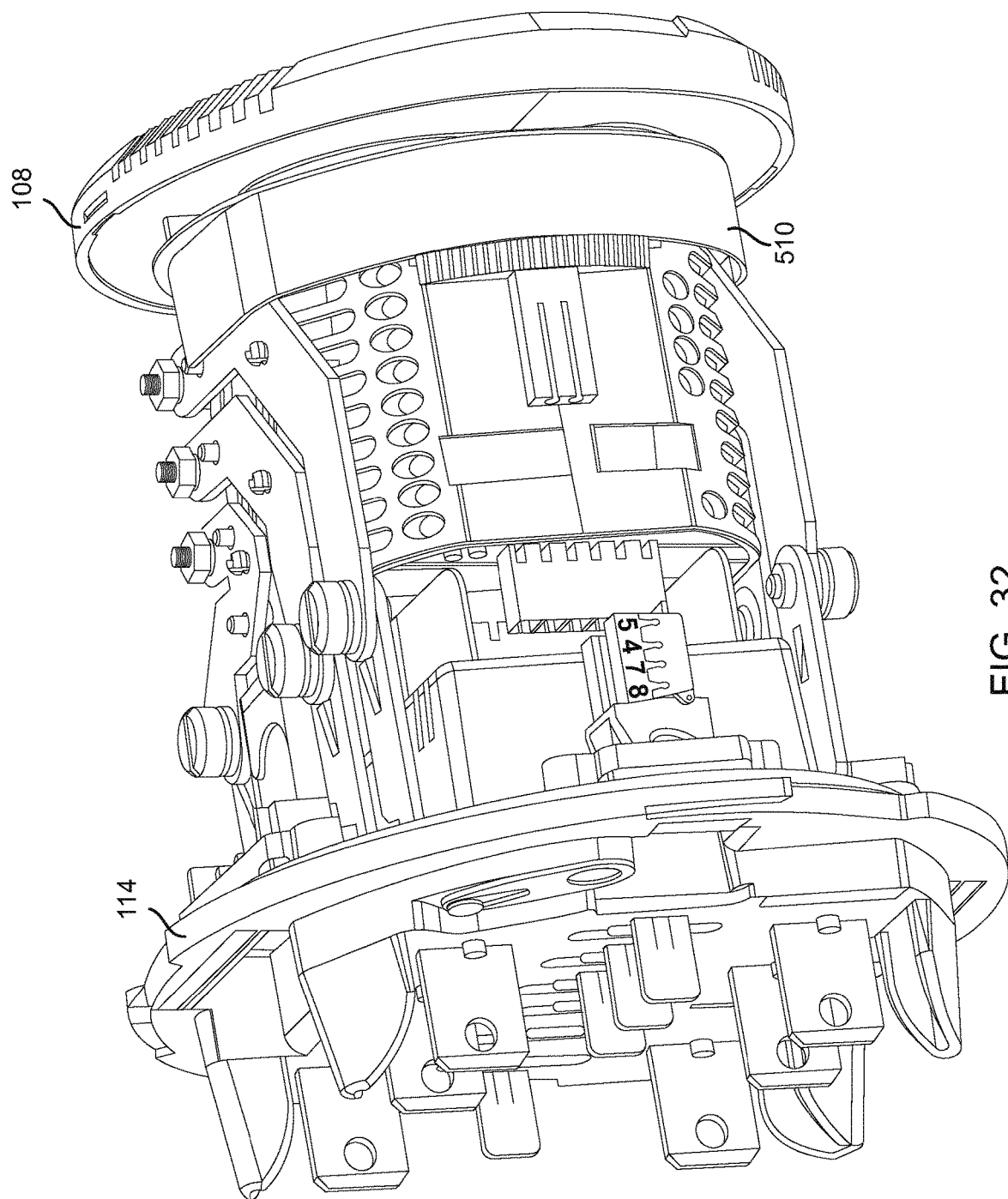
FIG. 32 is a perspective view of the IED shown in FIG. 30 with the antenna holder attached.
Figure 33:
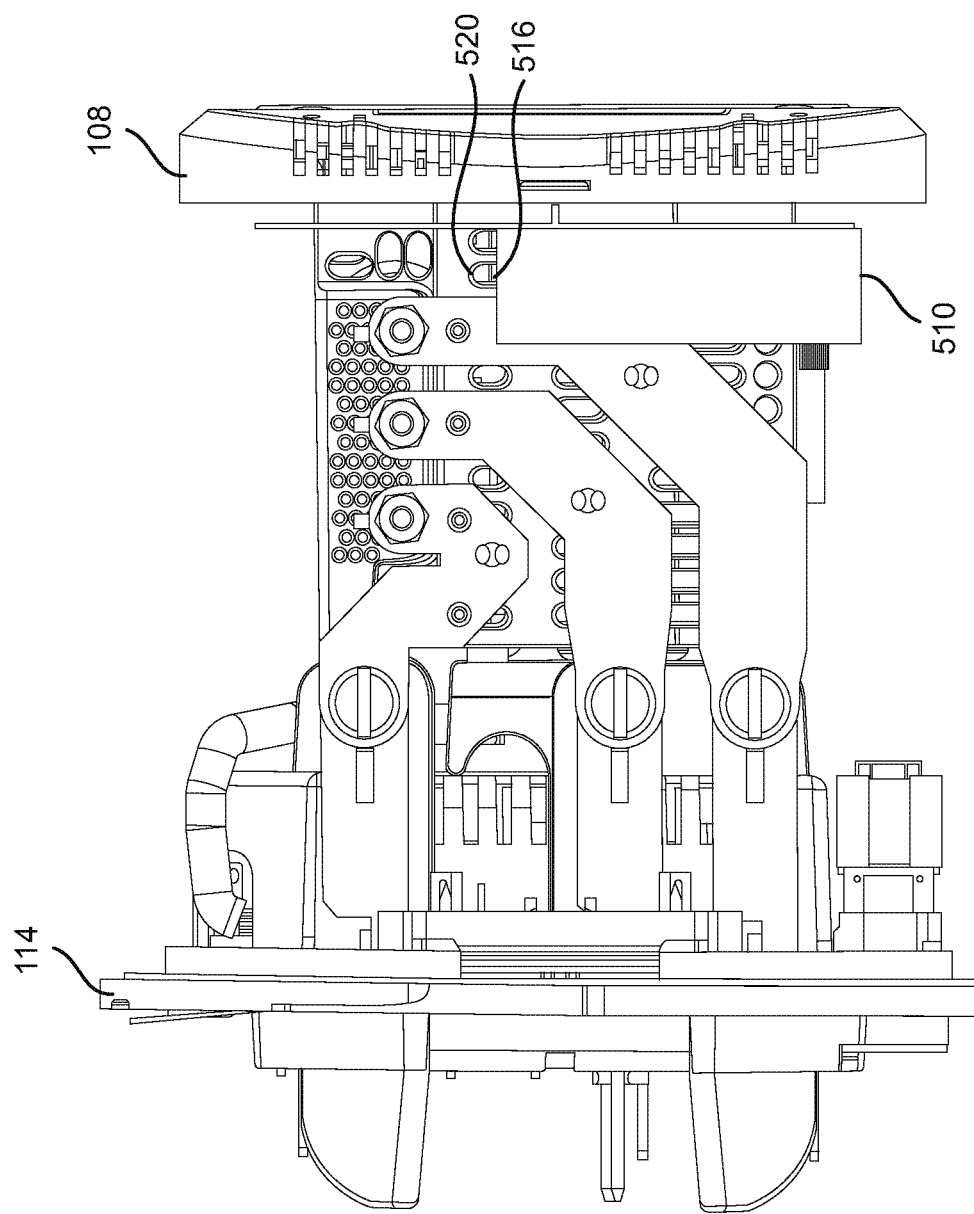
FIG. 33 is a top view of the IED shown in FIG. 30 with the antenna holder attached.

The antenna holder 510 further includes first and second clips 516, 518 for securing the holder 510 onto the inner housing 206. Clips 516 couple to apertures 520 of the inner housing 206, while clips 518 couple to similar apertures (not shown) on the lower inner case 204 of inner housing 206. First and second sets of guide pins 522, 524 are disposed on an inner surface 526 of the holder 510 to guide the holder 510 onto the inner housing 206. The first guide pins 522 enter apertures 528 on the upper inner case 202 and second guide pins 524 enter apertures 530 on the lower inner case 204. FIG. 32 illustrates a perspective view of the IED 100 shown in FIG. 30 with the antenna holder 510 attached, while FIG. 33 is a top view of the IED 100 shown in FIG. 30 with the antenna holder 510 attached.

The antenna holder 510 includes a cable guide 532. The cable guide 532 includes at least two channels 534 for guiding the cables 506, 508 from the holder 510 to the communication device 502.

Figure 34:
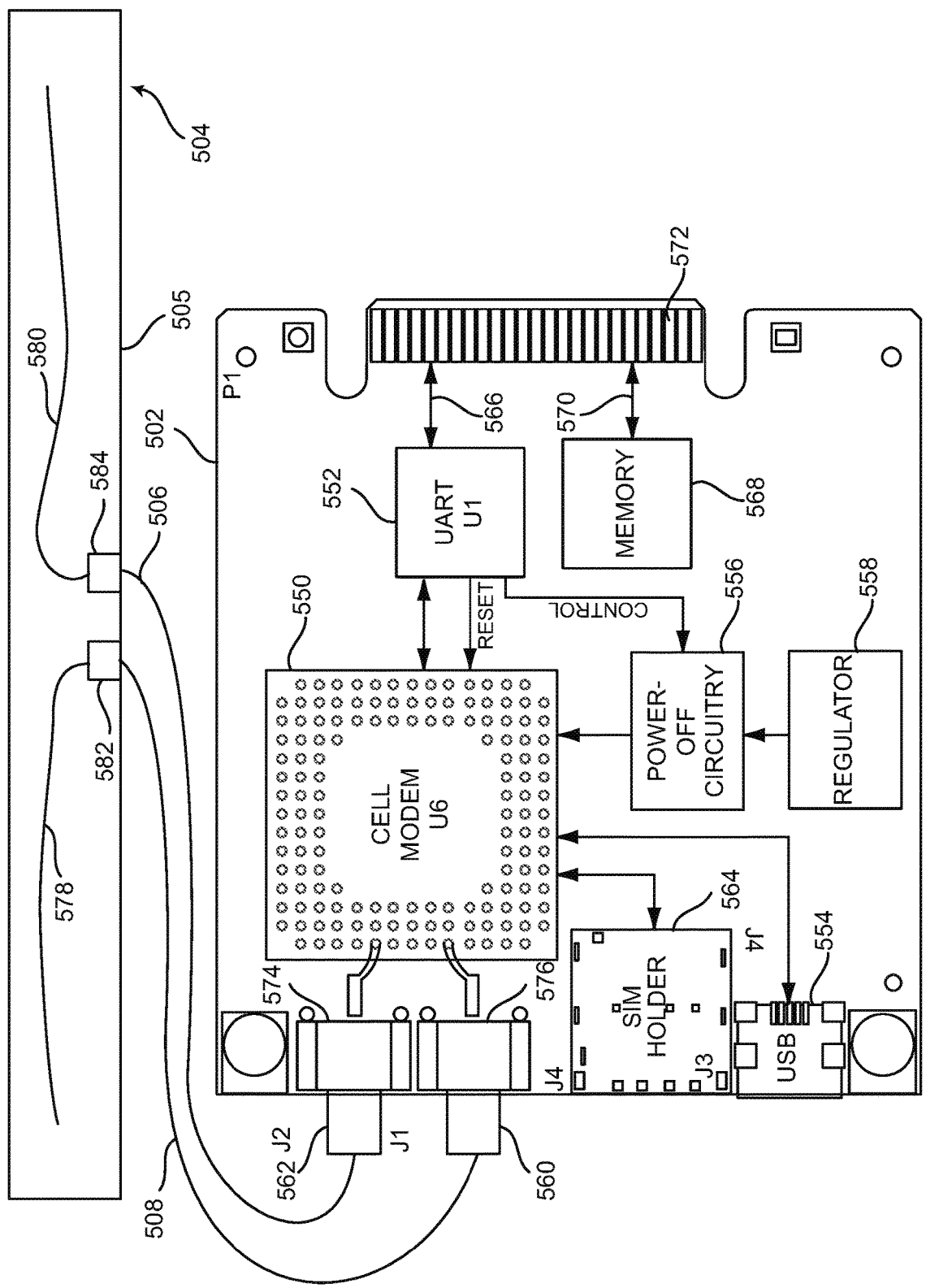
FIG. 34 is a block diagram of the wireless communication card and an antenna in accordance with an embodiment of the present disclosure.

Referring to FIG. 34, the communication device 502 includes a cellular modem 550, a UART 552, USB port 554, power off circuitry 556, voltage regulators 558, voltage translators 559 (shown in FIG. 35C-1), antenna connectors 560, 562, SIM holder 564, I2C Memory 568 and DSP bus interface 566. The memory 568 transmits data to the IED via interface 570 to edge connector 572. It is to be appreciated that corresponding components are also shown in schematic form in FIGS. 35A, 35B, 35C-1 and 35C-2.

In one embodiment, the cell modem 550 is a 4G LTE Cell Modem IC, such as, but not limited to, a Telit™ 4G LTE Cell Modem IC, Skywire™ 4G LTE CAT 3 Embedded Modem, etc. For example, component U6 in FIGS. 35C-1 and 35C-2 is a 4G LTE Cell Modem IC and is configured to communicate wirelessly over various known and to be developed cellular networks, such as, but not limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN), among others. The cell modem 550 includes a UART and USB interface for control and data communications. The UART 552 is the primary communication interface used between the DSP board assembly 210 and the cell modem 550 for control and data transfers. In other embodiments, the cell modem 550 may include a transmit module and a receive module, among others. Additionally, the cell modem 550 may include at least one processor including, but not limited to, an application processor, a communications processor, etc. The at least one processor may operate to initiate a connection to another device using, for example, standard and extended AT command sets, convert protocols, buffer data, etc. The cell modem 550 may further include at least one memory device. The at least one memory device may store information on various protocols to be used by the at least one processor of the cell modem for protocol conversion, for example, the at least one memory device may store a IP stack with TCP and/or UDP protocols.

The UART IC (component U1) 552 is connected to the DSP bus so that the IED 100 can send and receive data and control via the UART 552, which is connected to the UART of the cell modem 550. The cell modem 550 transmits the data it receives over the mobile communications network and receives data which it passes via its UART back to the UART 552 that is controlled via the DSP bus.

The USB connector (component J3) 554 is routed directly to the USB port built into the cell modem 550 and can be used for diagnostic monitoring and control and data transfers. The USB Interface of the cell modem 550 complies with the USB 2.0 specification and supports both USB full-speed (12 Mbits/sec) and USB high-speed (480 Mbits/sec) communications. Additionally, firmware of the cell modem 550 can be updated via the USB connector 554.

The power off circuitry 556 provides a power off analog switch to the cell modem IC 550, which can be controlled over the DSP interface bus 566, i.e., controlled by the DSP on the DSP board assembly 210. The power off circuitry 556 is used to perform full reinitialization of the cell modem 550 if it is not responding as expected. The power off circuitry 556 is primarily used in case a soft reset fails.

Figure 35A:
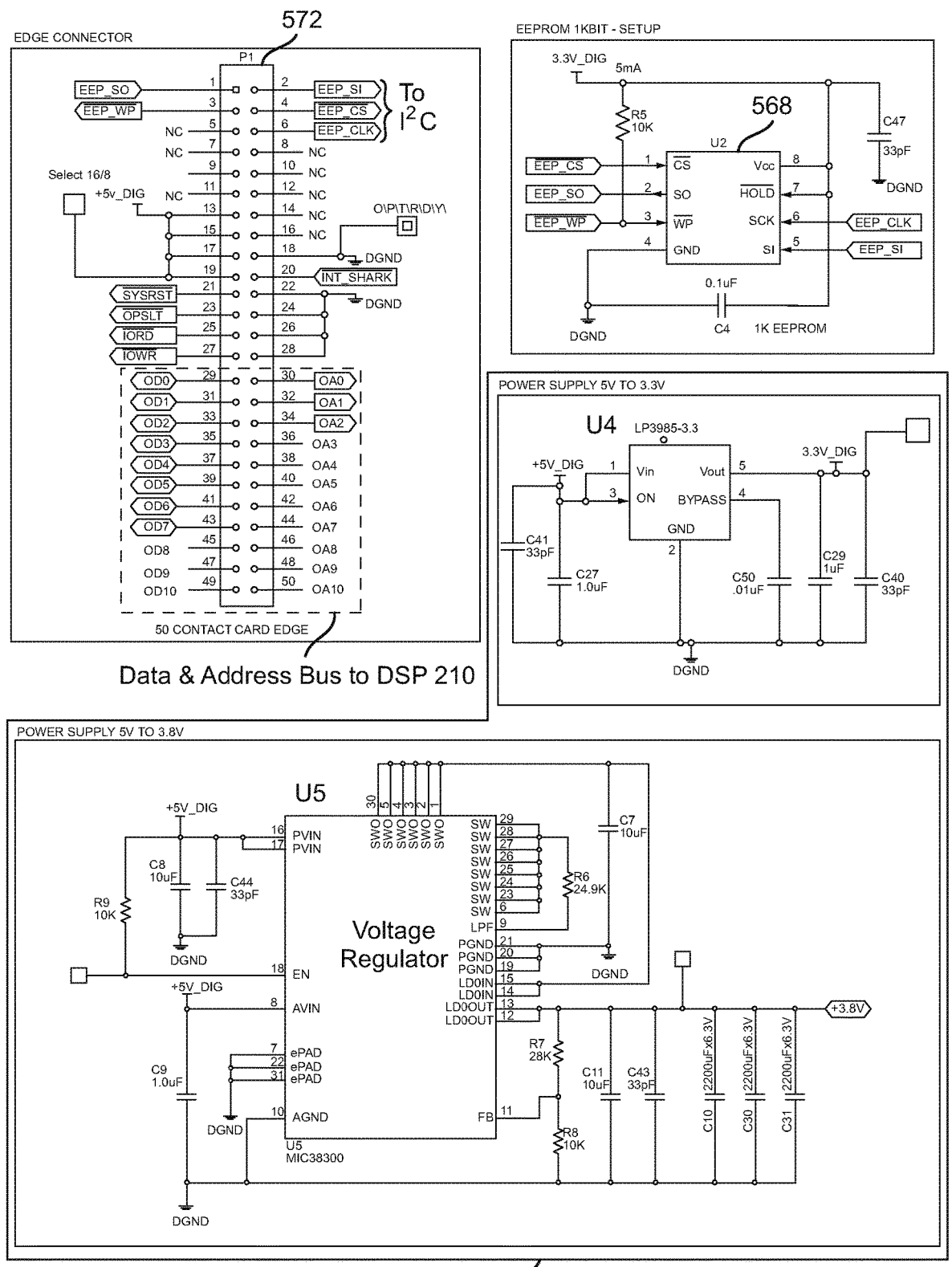
Figures 1, 35C:
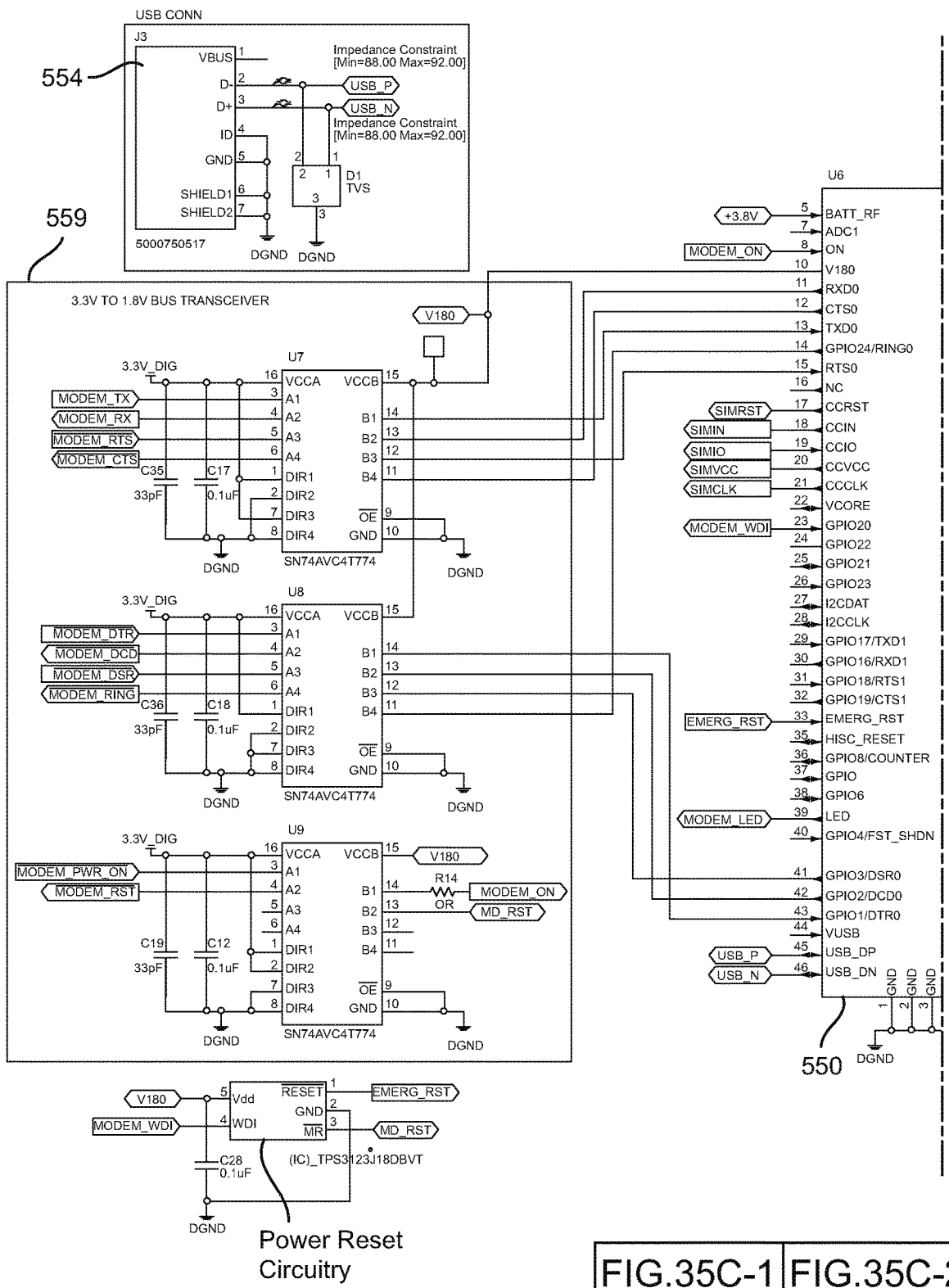
Figures 2, 35C:
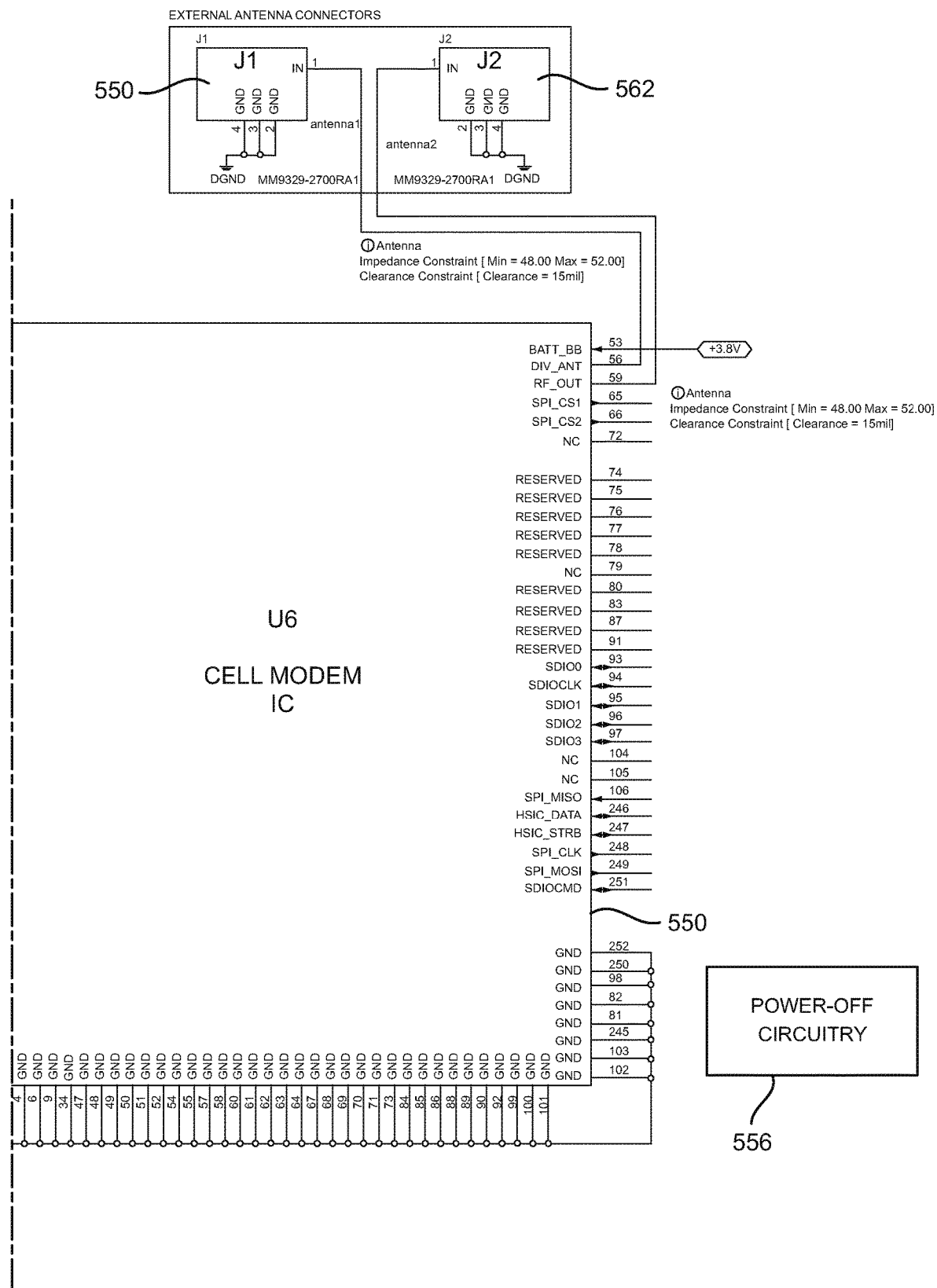

Regulator 558 includes at least two voltage regulators (components U4 and U5, shown in FIG. 35A). One of the voltage regulators supplies 3.8 volts to the cell modem 550 (e.g., component U5) and a 3.3 VDC regulator supplies voltages to all other components (e.g., component U4). Voltage translators 559 (components U7, U8 and U9, shown in FIG. 35C-1) are used to translate 3.3 volt logic signals to 1.8 volts to make the signals compatible with the cell modem inputs.

The antenna connectors (components J1 and J2) 560, 562 are used for the main antenna and a diversity antenna as required by various cellular networks. It is to be appreciated that the use of a main antenna and a diversity antenna that are physically separated from each other (often referred to as antenna diversity, space diversity, or special diversity) is used to improve the quality and reliability of a wireless link. Having more than one antenna improves the chances of capturing a strong signal by providing independent samples of data from signals in the vicinity of the antennas.

The antenna outputs are routed to antenna connectors 560, 562 and to cell modem 550. In one embodiment, the at least one processor of the cell modem 550 is configured to determine which antenna is receiving the best or strongest signal and to use or select the antenna with the best or strongest received signal for a communication or wireless link. In another embodiment, the at least one processor of cell modem 550 is configured to combine the received signals of the main antenna and the diversity antenna to produce a stronger signal, e.g., a single signal.

Exemplary connectors include, but are not limited to, SMA (sub-miniature version A) connectors, I-PEX connectors, surface mount connectors, etc. In certain embodiments, the antennas are mounted internally and do not require isolation so they can be directly routed to the cell modem. In other embodiments, the antenna may be mounted externally and requires isolation. A high voltage capacitor between the antenna outputs and the antenna connectors is used for this isolation. In one embodiment, the high voltage capacitor is disposed in blocks 574, 576 between the connectors 560, 562 and the cell modem 550; however, other locations for the high voltage capacitors are contemplated to be within the scope of the present disclosure.

A SIM holder 564 holds a SIM card for the network the IED will communicate on. A subscriber identity module or subscriber identification module (SIM) is an integrated circuit that is used to securely store the international mobile subscriber identity (IMSI) number and its related key, which are used to identify and authenticate subscribers on mobile telephony devices (such as mobile phones and computers). It is also possible to store contacts on the SIM card. The SIM card contains its unique serial number (ICCID), international mobile subscriber identity (IMSI) number, security authentication and ciphering information, temporary information related to the local network, a list of the services the user has access to, and two passwords: a personal identification number (PIN) for ordinary use, and a personal unblocking code (PUK) for PIN unlocking.

The I2C Memory 568 contains the Biobyte information and setup information for the cell modem board.

It is to be appreciated that certain components of the communication device 502 may include a shield disposed over the component to reduce or prevent noise generated in other components of the IED to affect the communication device's performance.

The antenna 504 is a MIMO (multiple in and multiple out) flexible polymer monopole type antenna, which, on one assembly, contains the main antenna and a diversity antenna with a cable for each type to connect to the connectors 560, 562 of the communication device 502. The antenna 504 covers all working frequencies in the 698-3000 MHz spectrum, covering all Cellular, 2.4 GHz Wi-Fi, ISM and AGPS applications. In one embodiment, the antenna 504 conforms to 4G LTE applications, which also is compliant for 2G and 3G applications, e.g., HSPA, GSM, CDMA, DCS, PCS, WCDMA, UMTS, GPRS, EDGE, GPS, 2.4 GHz Wi-Fi, etc.

Each of the main antenna 578 and diversity antenna 580 are supported by a flexible substrate 505, e.g., a dielectric sheet or plastic. In one embodiment, the main antenna 578 and diversity antenna 580 are printed onto the substrate 505 using conductive traces or conductive ink. In another embodiment, the substrate is a flexible, printed circuit board and the main antenna 578 and diversity antenna 580 are disposed onto the flexible, printed circuit board by a photo-etching technique. The substrate 505 is flexible to conform to the C-shaped member 512 of the antenna holder 510. It is to be appreciated that the one surface of antenna 504, i.e., the substrate 505, is in full contact with the outer surface 514 of the antenna holder 510. In certain embodiments, antenna 504 is applied to the surface 514 by double-sided tape, however, other methods for applying the antenna 504 to the holder 510 is contemplated to be within the scope of the present disclosure, e.g., by adhesives, screws, tie wraps, etc.

Each of the main antenna 578 and diversity antenna 580 are coupled to terminals 582, 584 respectively, which are coupled to cables 506,508, e.g., coaxial cables, although other types of cables are contemplated to be within the scope of the present disclosure. In one embodiment, cables 506, 508 includes connectors 586, 588, e.g., IPEX connectors, SMA connectors, surface mount connectors, etc., for coupling to connectors 560, 562 of the communication device 502. In a further embodiment, cables 506, 508 may have connectors on both ends of the respective cable for coupling to an antenna on a first end and coupling to a communication device on a second end, where the antenna and communication device may have a corresponding or complementary connector. It is to be appreciated that in certain embodiments the connectors on each end of a single cable may be different depending on the corresponding connectors of, for example, the antenna and the communication device. In certain embodiments, the connectors of cables 506, 508 may be secured via tie wrap, kapton tape, etc., to prevent the connection from becoming loose from, for example, vibration.

In certain embodiments, each of the main antenna 578 and diversity antenna 580 may be adapted, or tuned, to resonate at one or more predetermined frequency bands. Additionally, the main antenna 578 and diversity antenna 580 may be positioned on the substrate 505 to optimize isolation and correlation patterns therebetween.

Figure 36A:
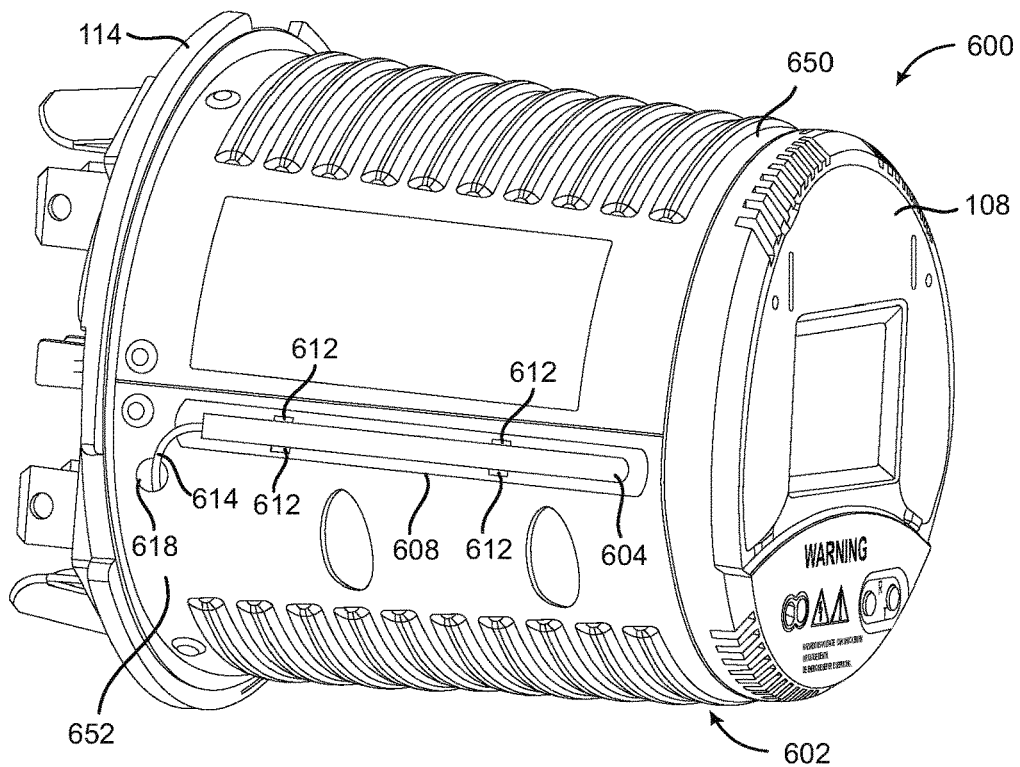
FIG. 36A is a left perspective view of an IED with at least one antenna in accordance with an embodiment of the present disclosure.
Figure 36B:
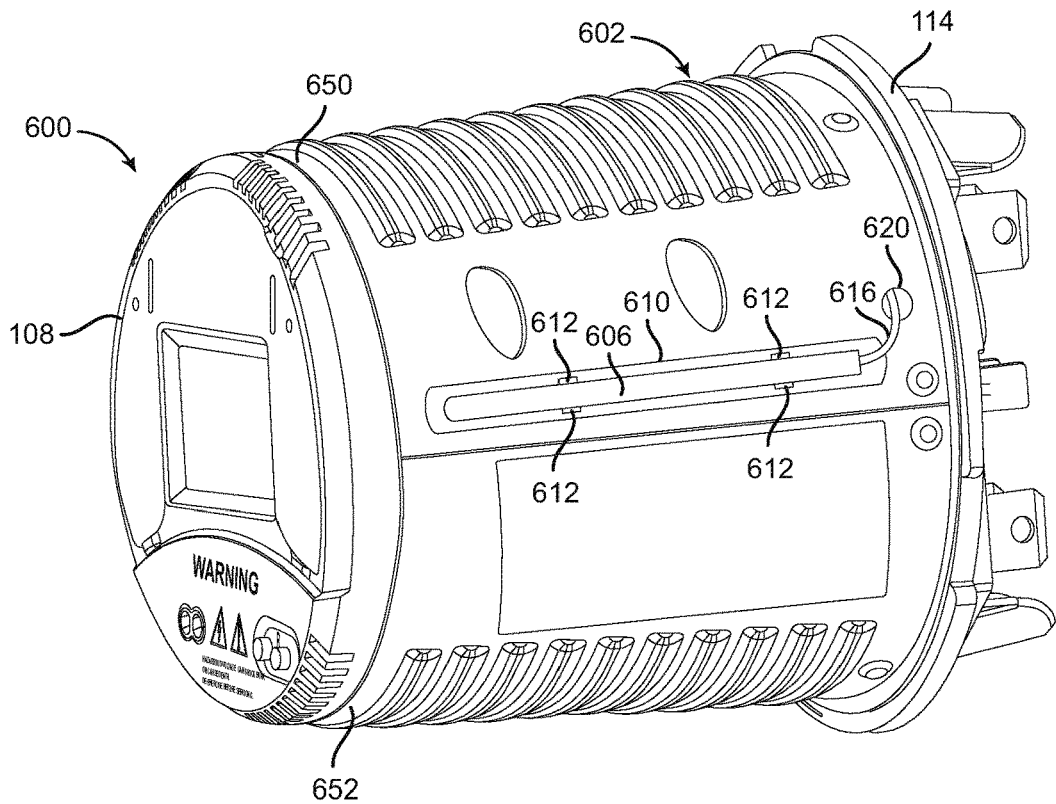
FIG. 36B is a right perspective view of the IED shown in FIG. 36A in accordance with an embodiment of the present disclosure.

In another embodiment, at least one antenna is disposed on an external surface of the housing while remaining under the cover, i.e., under glass. Referring to FIGS. 36A and 36B, IED 600 is shown with the cover 104 removed. Antennas 604, 606 are shown disposed on the outer surface of housing 602. It is to be appreciated that IED 600 may include some or all of the components included in IED 100. Furthermore, it is to be appreciated that, in one embodiment, antennas 604, 606 may be omni-directional and/or bi-direction antennas.

Similar to the above described embodiments, housing 602 includes an upper clam shell half 650 and a lower clam shell half 652. Lower clam shell half 652 includes channel 608 for retaining antenna 604, while upper clam shell half 650 includes channel 608 for retaining antenna 606. In one embodiment, the antennas 604, 606, e.g., rod-shaped antennas, are retained in their respective channels 608, 610 by clips 612. In another embodiment, the channels 608, 610 are configured to retain the antennas by a press-fit. Other methods of retaining the antennas 604, 608 to the exterior surface of the housing 602 are contemplated to be within the scope of the present disclosure.

Each antenna 604, 606 includes a cable 614, 616 respectively, for coupling the antenna 604, 606 to the communication device 502 disposed in the housing 602. In one embodiment, an aperture 618, 620 is configured in a respective clam shell half to route the cable 614, 616 to the communication device 502.

Figure 37A:
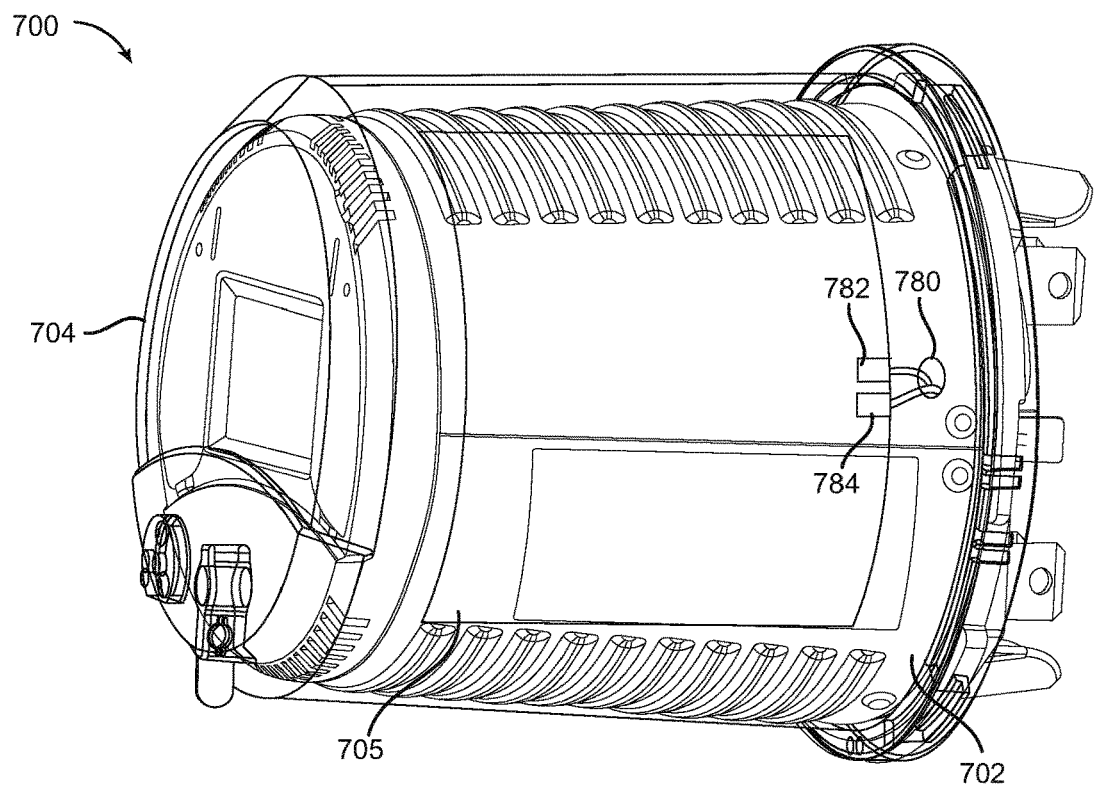
FIG. 37A is a perspective view of an IED including a cover for supporting an antenna in accordance with an embodiment of the present disclosure.
Figure 37B:
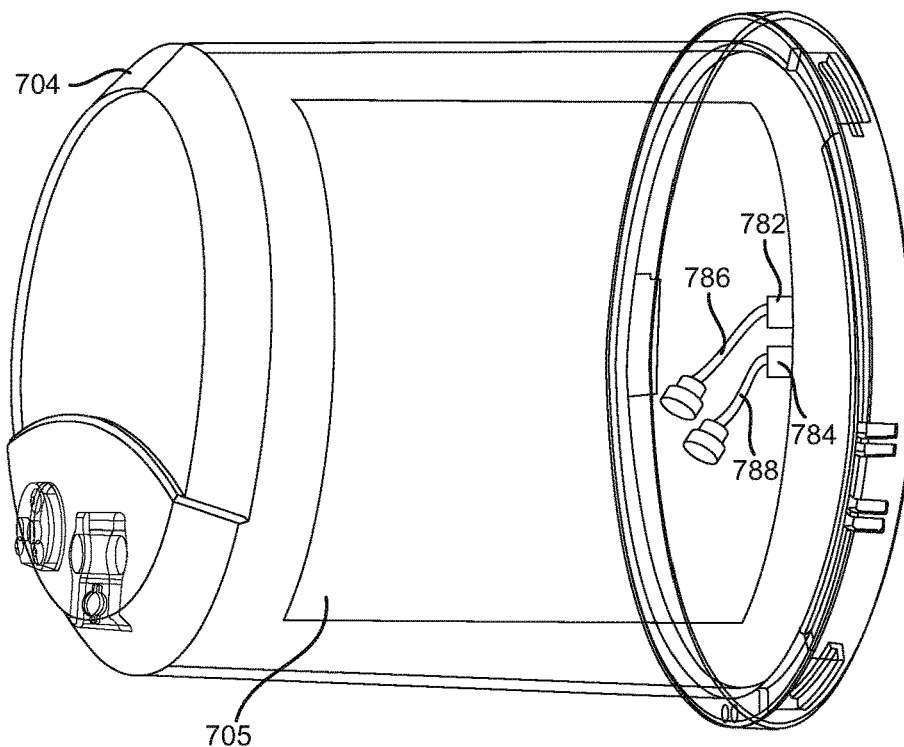
FIG. 37B illustrates the cover shown in FIG. 37A.

In another embodiment, the antenna is applied to an inner surface of the cover. Referring to FIGS. 37A and 37B, IED 700 is shown with cover 704 positioned over the housing 702. It is to be appreciated that IED 700 may include some or all of the components included in IED 100. Antenna 705 is applied to an inner surface of generally cylindrical cover 704. It is to be appreciated that the antenna 705 may be configured to substantially cover the entire surface area of the inner surface of the cover 704 to increase signal strength. Similar to the embodiments described above, the antenna 705 includes terminals 782, 784 coupled to cables 786, 788 for coupling the antenna 705 to the communication device 502 disposed in the housing 702. In one embodiment, an aperture 780 is configured in a respective clam shell half of the housing 702 to route the cables 786, 788 to the communication device 502.

It is to be appreciated that, in another embodiment, the antenna 705 may be disposed on the outer surface of the cover 704.

Figure 38A:
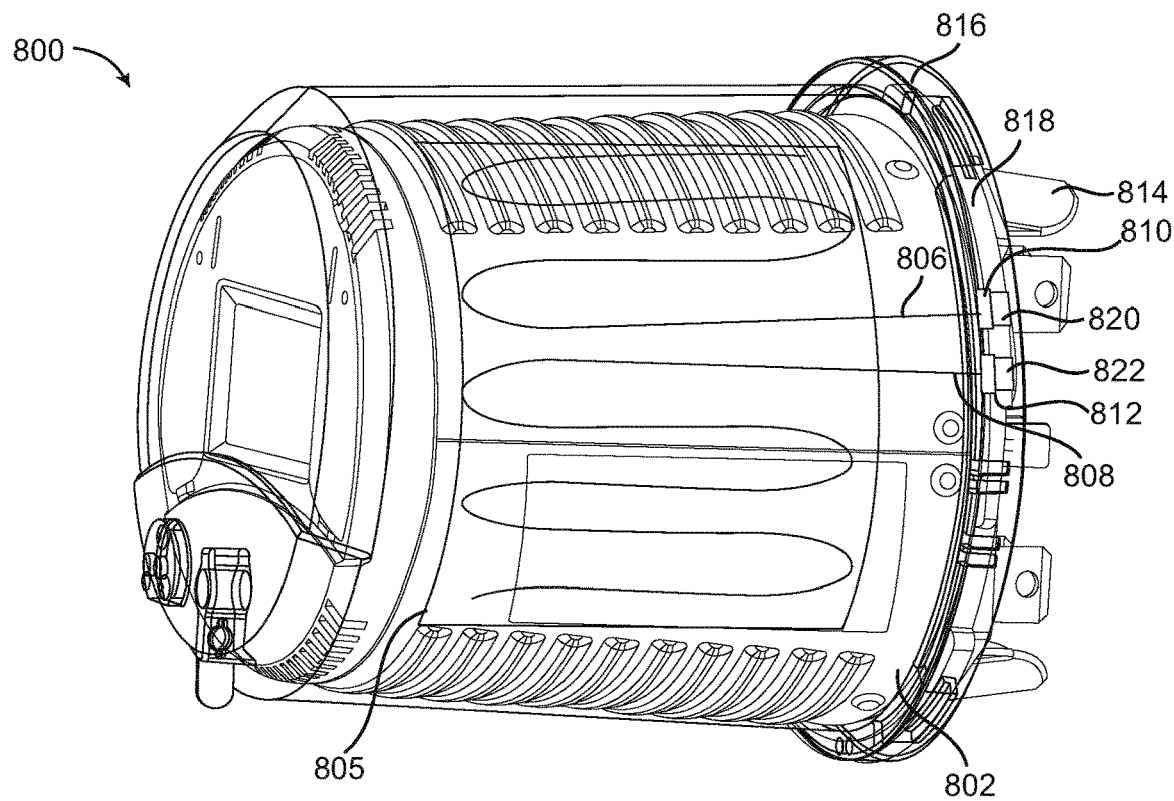
FIG. 38A is a perspective view of an IED including a cover for supporting an antenna in accordance with another embodiment of the present disclosure.
Figure 38B:
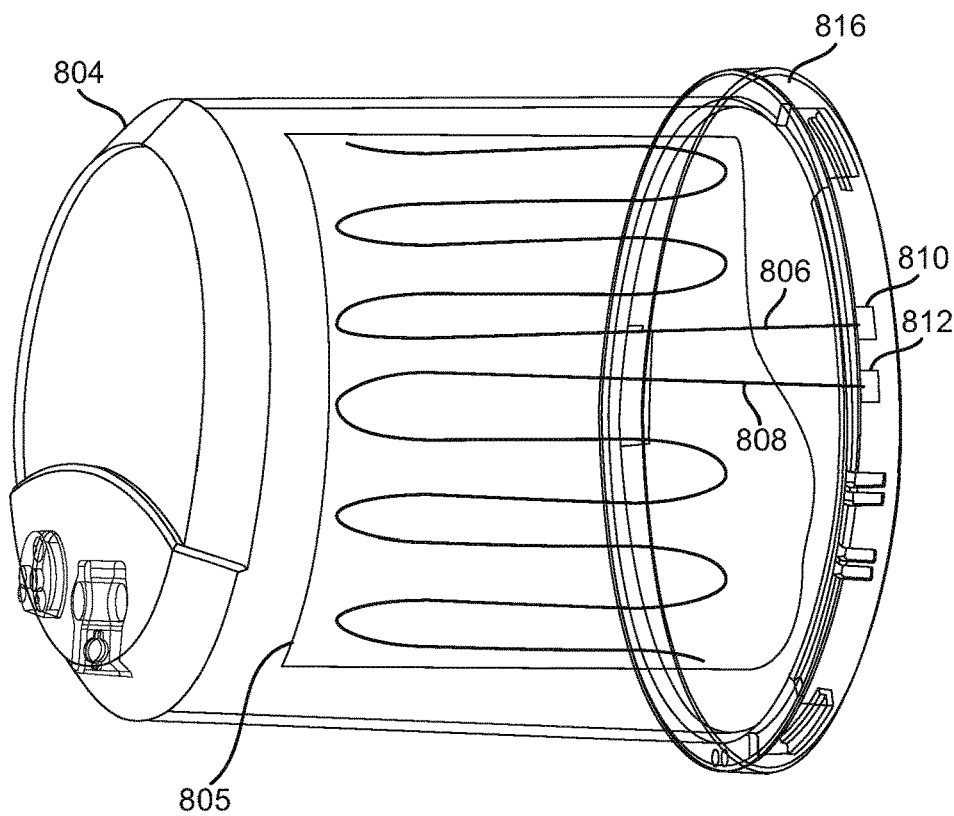
FIG. 38B illustrates the cover shown in FIG. 38A.

In another embodiment, an antenna is applied to the inner and/or outer cylindrical surface of the cover of an IED with an electrical connection through the base of the IED. Referring to FIGS. 38A and 38B, at least one electrical trace 806, 808 is provided to couple an antenna 805 to the internal electronics of the IED 800. It is to be appreciated that IED 800 may include some or all of the components included in IED 100.

In the embodiment shown in FIGS. 38A and 38B, the antenna 805 is applied to a surface of the cover 804. The at least one electrical trace 806, 808 is coupled on one end to the antenna 805 and, on the other end, terminates on at least one contact 810, 812 that is disposed on a rim 816 of the open end (i.e., the end configured to receive housing 802 of IED 800) of the cover 804. The at least one electrical trace 806, 808 is disposed on an inner surface of a cylindrical portion of the cover 804. When the cover 804 is disposed over the metering housing 802, the rim 816 of the cover 804 is coupled to an outer peripheral edge 818 of the base 814. The outer peripheral edge 818 of the base 814 includes at least one complementary contact 820, 822, which will make contact with the at least one contact 810, 812 when the cover 804 is secured to the base 814. The at least one complementary contact 820, 822 is electrically coupled to communication device 502 or other circuitry disposed in the housing 802 of the IED 800.

It is to be appreciated that the at least one contact 810, 812 and/or the at least one complementary contact 820, 822 may be a resilient type contact to allow for a wide range of tolerance in the dimension between the cover 804 and the base 814 to ensure an electrical connection. The resilient type contact may include, but is not limited to, a leaf spring type contact, a brush type contact, a wipe type contact, a ball-and-spring type contact, etc.

In another embodiment, the traces 806, 808 may be printed on the inner surface of the cylindrical portion of the cover 804 with highly transparent conductive ink. In this embodiment, the at least one trace 806, 808 need not be galvanically (DC) connected to a contact on the base 814, but can be connected via capacitive or inductive coupling through a non-conductive gap, e.g., air. In this embodiment, the at least one contact 810, 812 would come to rest, when the cover 804 is coupled to the base 814, in close proximity to the least one complementary contact 820, 822 on the outer peripheral edge 818 of the base 814. As described above, the capacitively or inductively coupled connection would allow for a wide range of tolerance in the dimension between the cover 804 and the base 814 to ensure an electrical connection. Furthermore, this "contact-less" type connection will not wear out upon repeated mounting and removal of the cover 804, nor will the contacts oxidize.

Figure 39B:
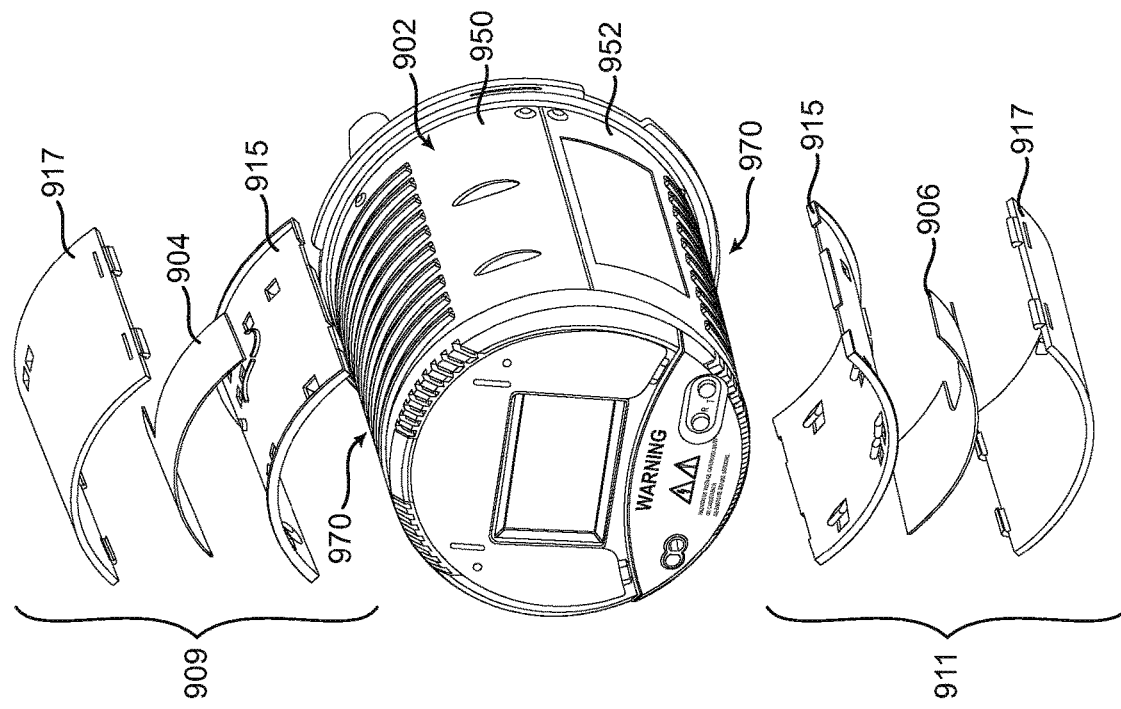
FIG. 39B is an exploded view of the IED with at least one antenna assembly shown in FIG. 39A.
Figure 39A:
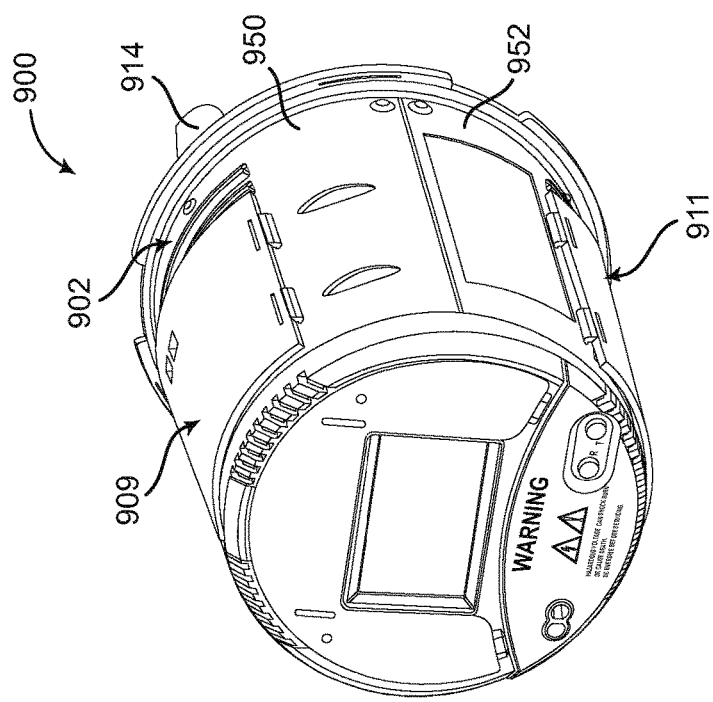
FIG. 39A is a perspective view of an IED with at least one antenna assembly in accordance with an embodiment of the present disclosure.

In another embodiment, an antenna is disposed within an antenna assembly, which is coupled to an outer surface of the housing of the IED. Referring to FIG. 39A, an IED 900 is shown with at least one antenna assembly 909, 911 coupled to the housing 902 of IED 900, where FIG. 39B is an exploded view of FIG. 39A. A first antenna assembly 909 is coupled to an upper clam shell half 950 of housing 902 and a second antenna assembly 911 is coupled to a lower clam shell half 911 of housing 902. It is to be appreciated that IED 900 may include some or all of the components included in IED 100.

Each antenna assembly 909, 911 includes an antenna mounting plate 915, an antenna cover 917 and an appropriate antenna, e.g., a main antenna 904 and/or a diversity antenna 906. Referring to FIGS. 41A-41D, various views of an antenna mounting plate 915 are illustrated. The antenna mounting plate 915 is generally rectangular and curved to match the curved surface of a respective clam shell half, e.g., upper clam shell half 950 and lower clam shell half 911. The antenna mounting plate 915 includes an upper surface 921 and a lower surface 923. The upper surface 921 includes a first wire or cable guide 925, a second wire or cable guide 927 and at least one aperture 929 for allowing a wire or cable to pass through to be extending within the housing 902, the details of which will be described below. Additionally, the upper surface 921 includes a raised edge 931 that includes at least one recess 933. The lower surface 923 includes a plurality of tabs 935 that extend away from the lower surface 923 at a predetermined angle. The tabs 935 are disposed on the lower surface 923 to align with the louvers 970 of the upper clam shell half 950 and lower clam shell half 911. The tabs 935 of the antenna mounting plate 915 are disposed into the louvers 970 to retain the antenna assembly 909, 911 on the housing 902 of the IED 900. The tabs 935 may be retained in the louvers 970 by an interference fit, adhesives, etc.

Referring to FIGS. 42A-42D, various views of an antenna cover 917 are illustrated. The antenna cover 917 is generally rectangular and curved to match the curved surface of the antenna mounting plate 915. The antenna cover 917 includes an upper surface 945 and a lower surface 947. The lower surface 947 includes tabs 949 and coupling members 951. Tabs 949 are configured to align with apertures 937 of antenna mounting plate 915 and coupling members 951 are configured to align with recesses 933 of antenna mounting plate 915.

Figure 43A:
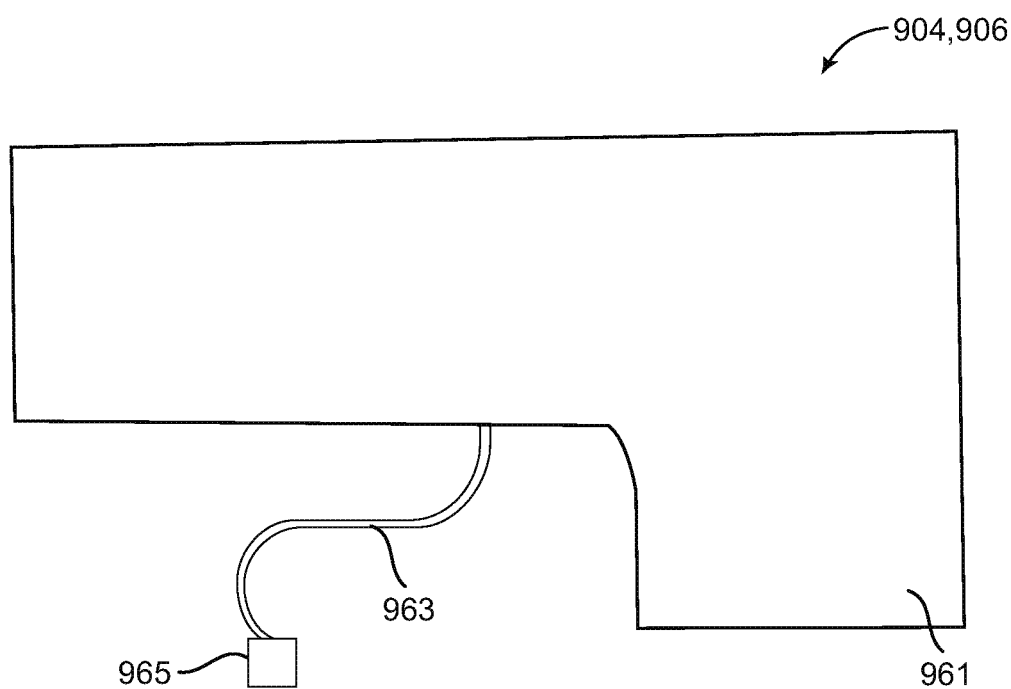
FIG. 43A is a top view of an antenna in accordance with an embodiment of the present disclosure.
Figure 43B:
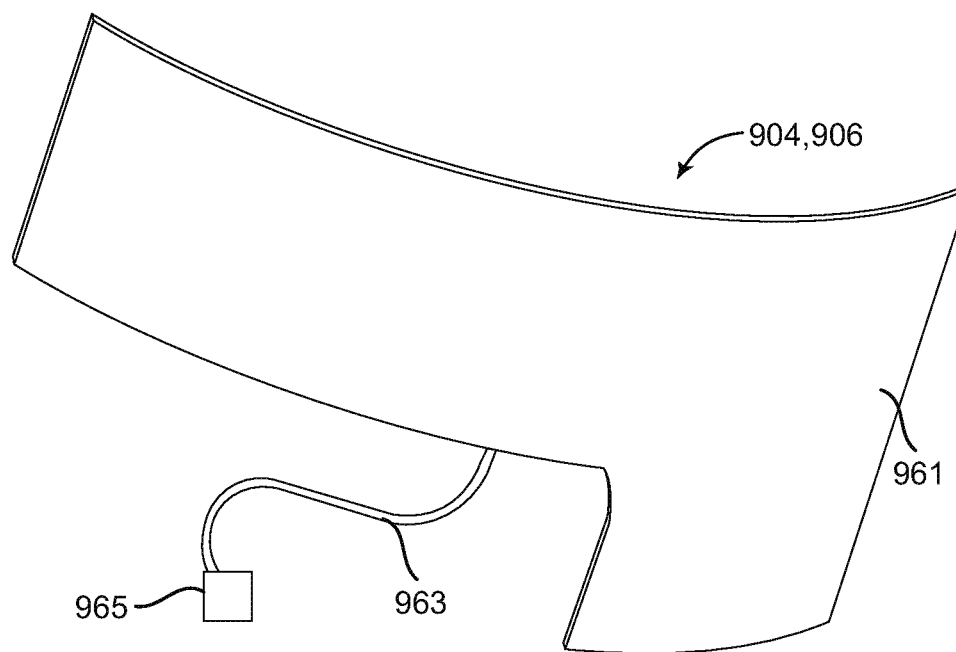
FIG. 43B is a perspective view of the antenna shown in FIG. 43A.

Referring to FIGS. 43A and 43B, in FIG. 43A a top view of an antenna 904, 906 is shown, while in FIG. 43B a perspective view of same is shown. The antenna 904, 906 includes a substrate 961, including at least one antenna element and a cable or wire 963 coupled to the antenna element and terminating in a connector 965. It is to be appreciated that the substrate 961 is flexible and may conform at least to the upper surface 921 of antenna mounting plate 915. It is further to be appreciated that connector 965 may be in various forms, e.g., a complementary connector to connectors 560, 562 on communication device 502.

In one embodiment, the at least one antenna element may be a conductive element, such as a metallic foil element. Such a metallic foil element may be adhered to, etched onto or inked onto the substrate 961. Exemplary metals for the foil element may include, but are not limited to, copper, gold, silver, platinum, alloys formed from at least one conductive metal, etc. In another embodiment, the at least one antenna element is disposed on a surface of the substrate 961, then another layer of a dielectric material may be disposed over the at least one antenna element to encapsulate the at least one antenna element.

It is to be appreciated that various types of antennas may be employed as antennas 904, 906, e.g., a dipole antenna, a dual-dipole, multi-band antenna, etc.

Figure 40:
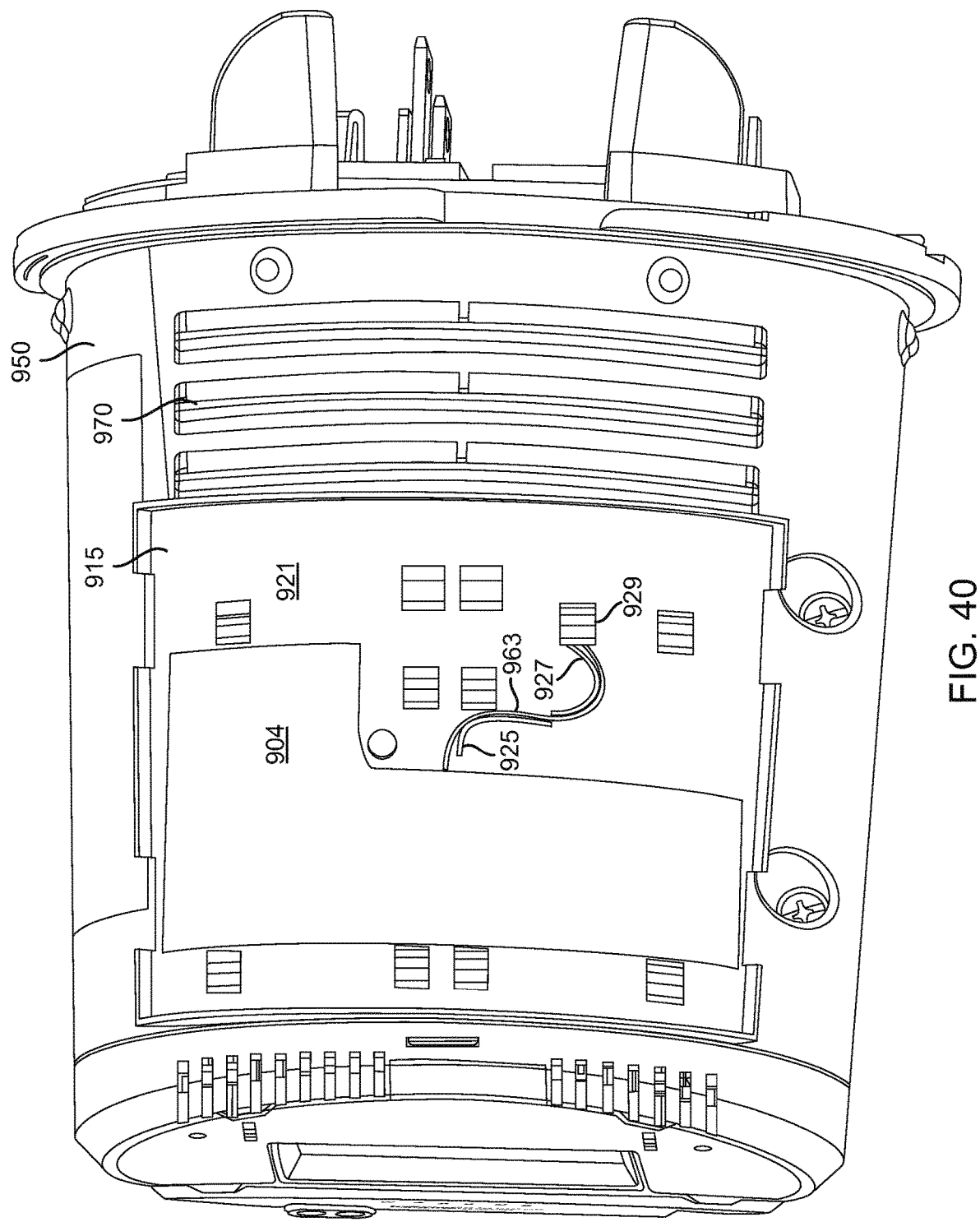
FIG. 40 is a top view of the IED shown in FIG. 39A with an antenna cover removed.
Figure 41A:
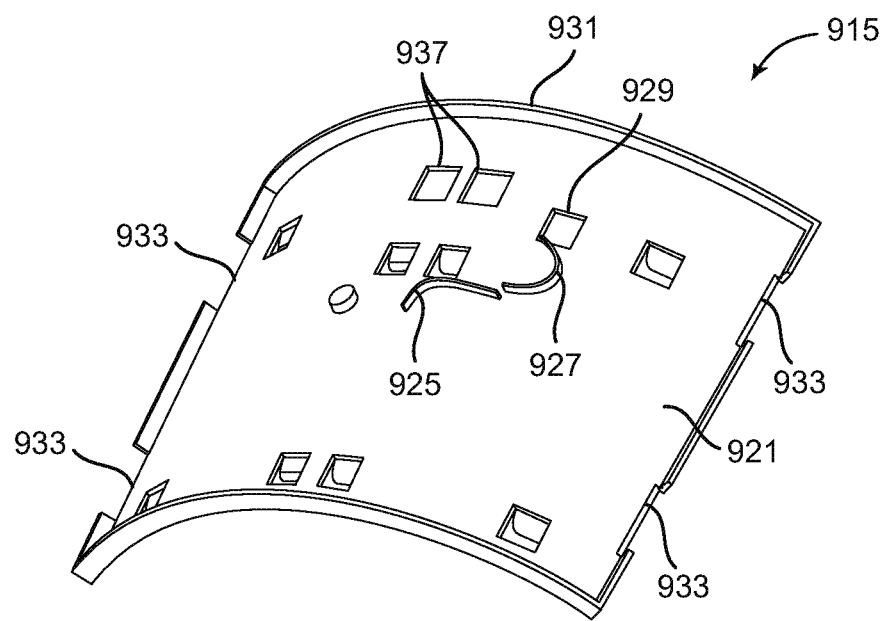
FIG. 41A is a top perspective view of an antenna mounting plate in accordance with an embodiment of the present disclosure.
Figure 41B:
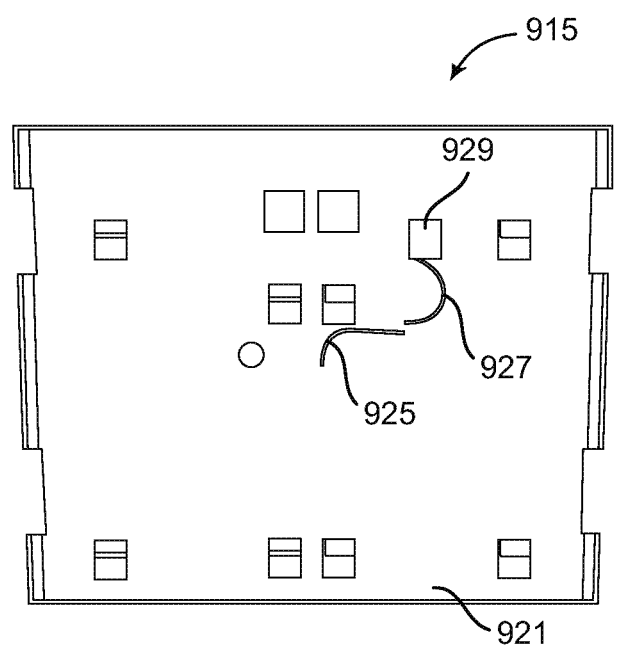
FIG. 41B is a top view of the antenna mounting plate shown in FIG. 41A.
Figure 41C:
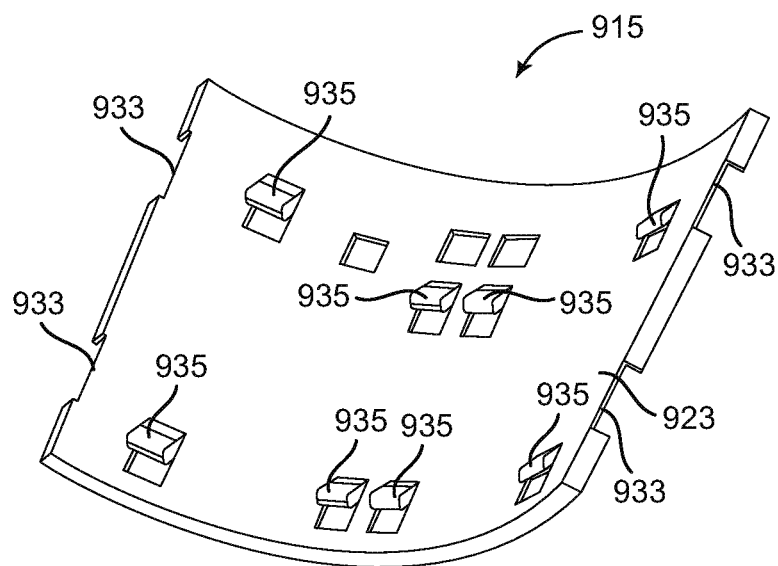
FIG. 41C is a bottom perspective view of the antenna mounting plate shown in FIG. 41A.
Figure 41D:
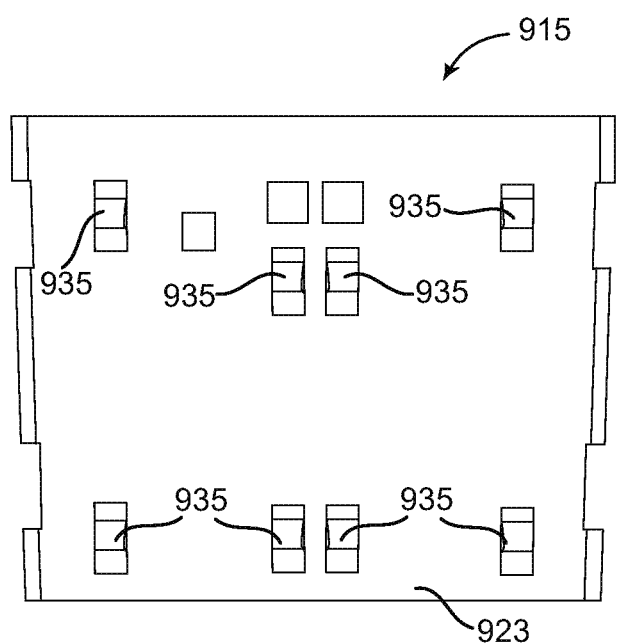
FIG. 41D is a bottom view of the antenna mounting plate shown in FIG. 41A.
Figure 42A:
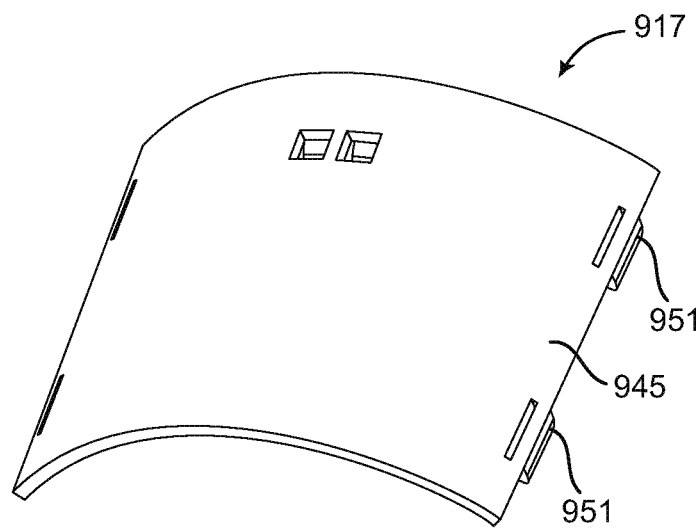
FIG. 42A is a top perspective view of an antenna cover in accordance with an embodiment of the present disclosure.
Figure 42B:
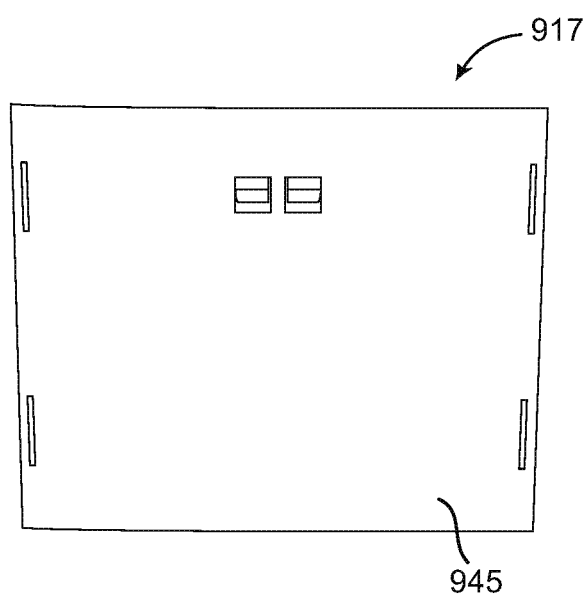
FIG. 42B is a top view of the antenna cover shown in FIG. 41A.
Figure 42C:
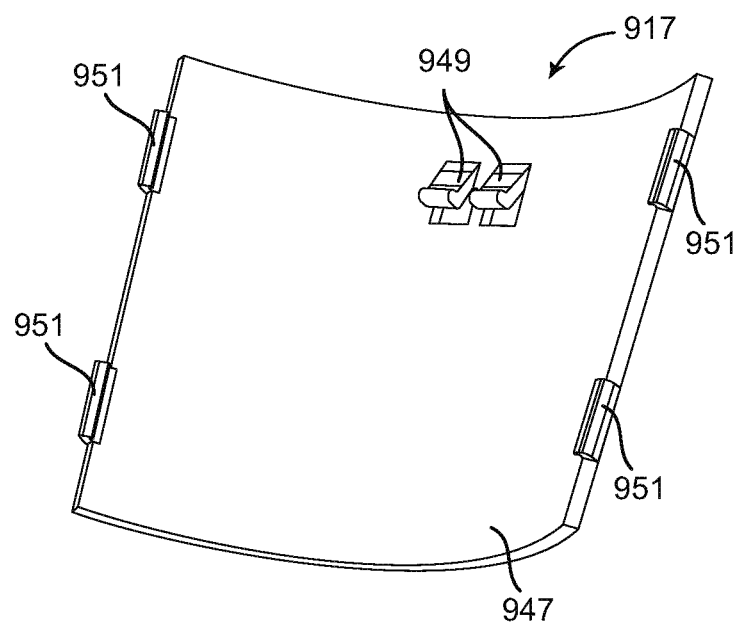
FIG. 42C is a bottom perspective view of the antenna cover shown in FIG. 41A.
Figure 42D:
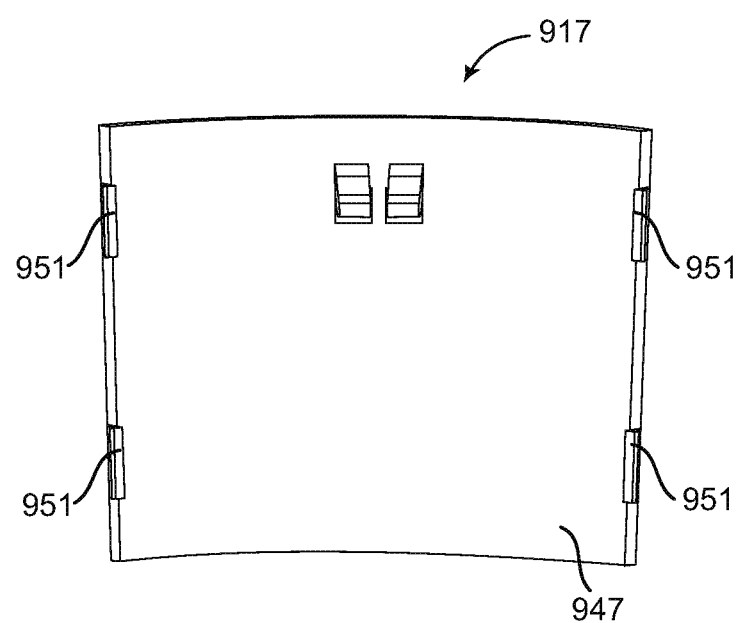
FIG. 42D is a bottom view of the antenna cover shown in FIG. 41A.

Referring to FIG. 40, antenna mounting plate 915 is coupled to the upper clam shell half 950. The tabs 935 of the antenna mounting plate 915 are disposed into the louvers 970 to retain the antenna mounting plate 915 to the housing of the IED 900. The tabs 935 may be retained in the louvers 970 by an interference fit, adhesives, etc. The antenna 904 is disposed on the upper surface 921 of the antenna mounting plate 915. Cable 963 may be routed along first and second wire or cable guides 925, 927. An end of cable 963 including the connector 965 is disposed through aperture 929. The cable 963 and connector 965 are then routed to the appropriate connector, e.g., connector 560, 562, on the communication device 502. The antenna cover 917 is then disposed over the antenna mounting plate 915. Tabs 949 of the antenna cover 917 are configured to align with apertures 937 of antenna mounting plate 915 and coupling members 951 of the antenna cover 917 are configured to align with recesses 933 of antenna mounting plate 915. The antenna cover 917 then mates with the antenna mounting plate 915 to lock in the antenna 904.

It is to be appreciated that the antenna assembly 909, 911 may be completely assembled before coupling to the housing 902 of the IED 900. In one embodiment, the antenna assembly 909, 911 is assembled then coupled to the housing 902 by disposing the tabs 935 of the antenna mounting plate 915 into the louvers 970 of the housing 902 to retain the antenna assembly 909, 911 to the housing of the IED 900. The tabs 935 may be retained in the louvers 970 by an interference fit, adhesives, etc. In other embodiments, the antenna assembly 909, 911 may be coupled to the housing 902 by, for example, clips, screws, hooks, loop and hook fasteners, connectors, retention straps, tie wraps, etc. It is further to be appreciated that the antenna mounting plate 915 and antenna cover 917 may be formed form any suitable material, such as an electrically insulating, non-conductive material, including but not limited to plastics, ceramics and the like. In this manner, the antenna assembly 909, 911 provides protection to an operator, for example, from making accidental contact with the antenna and potentially high voltages associated with the IED. Additionally, the non-conductive material may be chosen so the potential for antenna interference is minimized.

In one embodiment, one or more antennas may be mounted to inner surfaces of housing 102 of IED 100 using antenna mounts. For example, referring to FIGS. 44A and 44B, exploded perspective views of IED 100 including antenna mounts 1050, 1052 and antennas 1002 and 1004 are shown in accordance with the present disclosure. It is to be appreciated that antennas 1002 and 1004 may be any type of antenna for radiating and receiving wireless communication signals, such as RF signals. In one embodiment, antennas 1002, 1004 are multiband internal printed circuit board (PCB) antennas configured for wireless communication in various frequencies, such as, but not limited to, 2G, 3G, 4G/LTE frequencies.

Figure 44A:
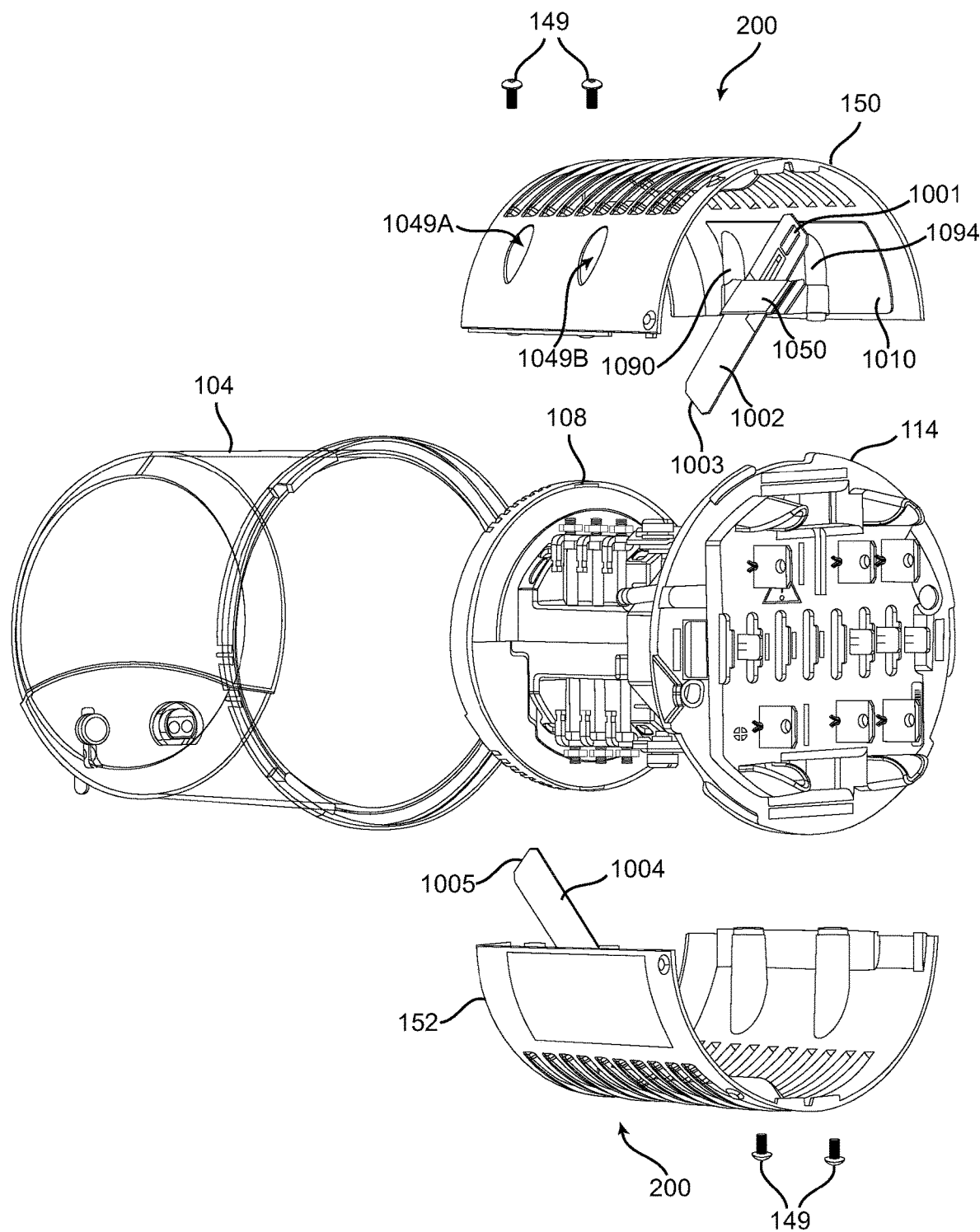
FIGS. 44A and 44B illustrate exploded perspective views of an IED including antenna mounts for mounting antennas to an inner surface of the housing of the IED in accordance with an embodiment of the present disclosure.
Figure 44B:
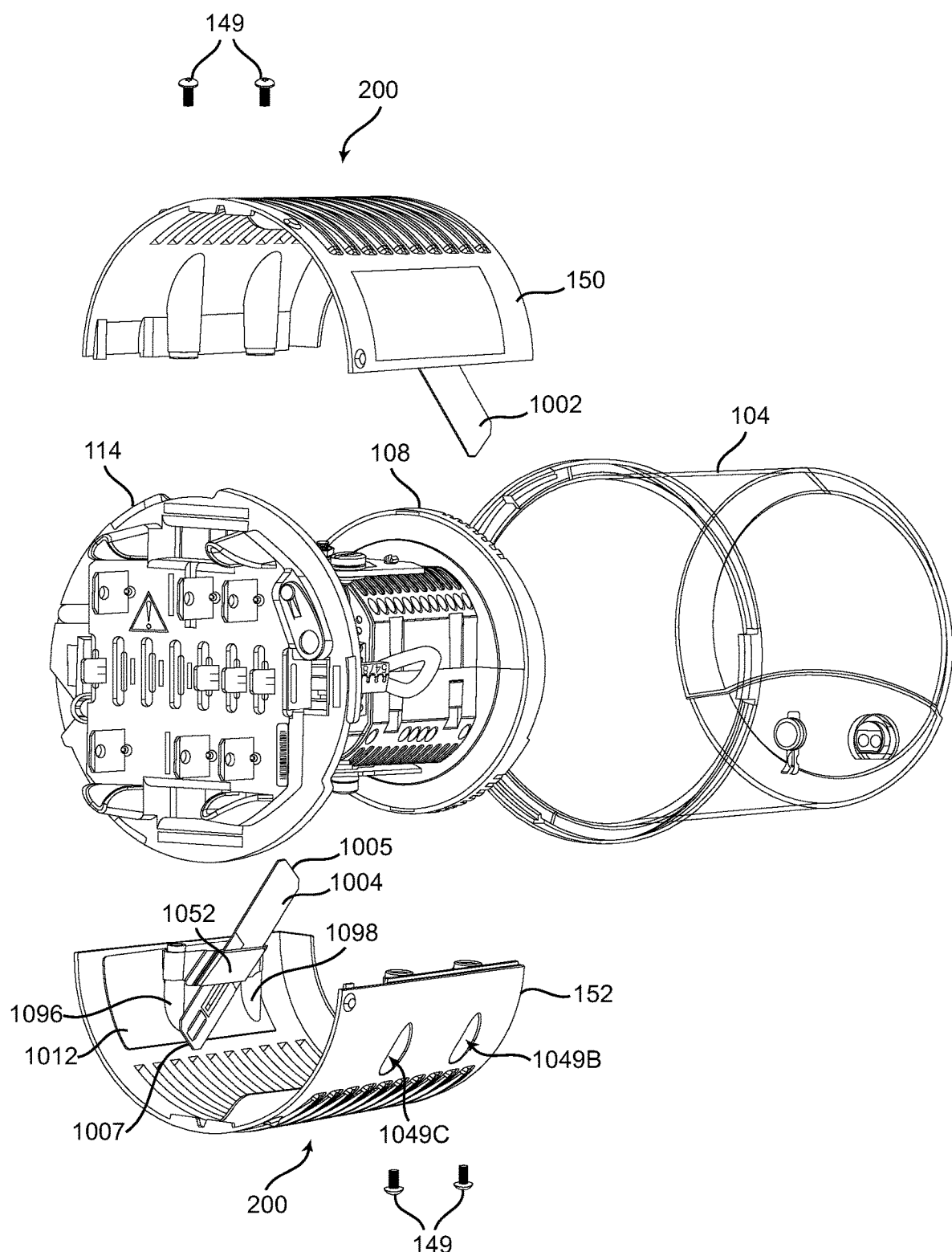

As shown in FIGS. 44A and 44B, antenna 1002 is mounted to an inner surface 1010 of upper clam shell half 150 via antenna mount 1050 and antenna 1004 is mounted to an inner surface 1012 of lower clam shell half 152 via antenna mount 1052.

Upper clam shell half 150 includes mounting bores or boreholes 1049A, 1049B, which are disposed through the outer walls of half 150. Upper clam shell half 150 further includes tubular mounting members 1090, 1094, which are disposed on inner surface 1010. Lower clam shell half 152 includes mounting bores or boreholes 1049C, 1049D, which are disposed through the outer walls of half 152. Lower clam shell half 152 further includes tubular mounting members 1096, 1098, which are disposed on inner surface 1012. Bores 1049A, 1049B are configured to receive screws 149 to be coupled to tubular mounting members 1096, 1098, and bores 1049C, 1049D are configured to receive screws 149 to be coupled to tubular mounting members 1090, 1094. It is to be appreciated that tubular mounting members 1090, 1094 are disposed proximately to a first side of housing 102 and tubular mounting members 1096, 1098 are disposed proximately to a second side of housing 102, where the first side of housing 102 and the second side of housing 102 are disposed opposite to each other, i.e., diametrically opposed.

In one embodiment, mount 1050 is configured to be coupled to tubular mounting members 1090, 1094 to mount antenna 1002 to inner surface 1010 proximately to the first side of housing 102, and mount 1052 is configured to be coupled to tubular mounting members 1096, 1098 to mount antenna 1004 to inner surface 1012 proximately to the second side of housing 102. In this way, when upper clam shell half 150 and lower clam shell half 152 are coupled together, antennas 1002, 1004 are mounted to the inner surface of housing 102 proximately to opposite sides of housing 102, such that antennas 1002, 1004 are oppositely disposed (or diametrically opposed) with respect to each other.

In one embodiment, antennas 1002, 1004 are each configured in a substantially elongated, linear and flat rectangular shape, e.g., a printed circuit board (PCB) antenna. As will be described in greater detail below, mounts 1050, 1052 are configured to mount antennas 1002, 1004 to the inner surface of housing 102, such that antennas 1002, 1004 are disposed lengthwise at an angle relative to each other. In one embodiment, the angle may be on or about 90 degrees, however, other angles are contemplated to be within the scope of the present disclosure.

Figure 44C:
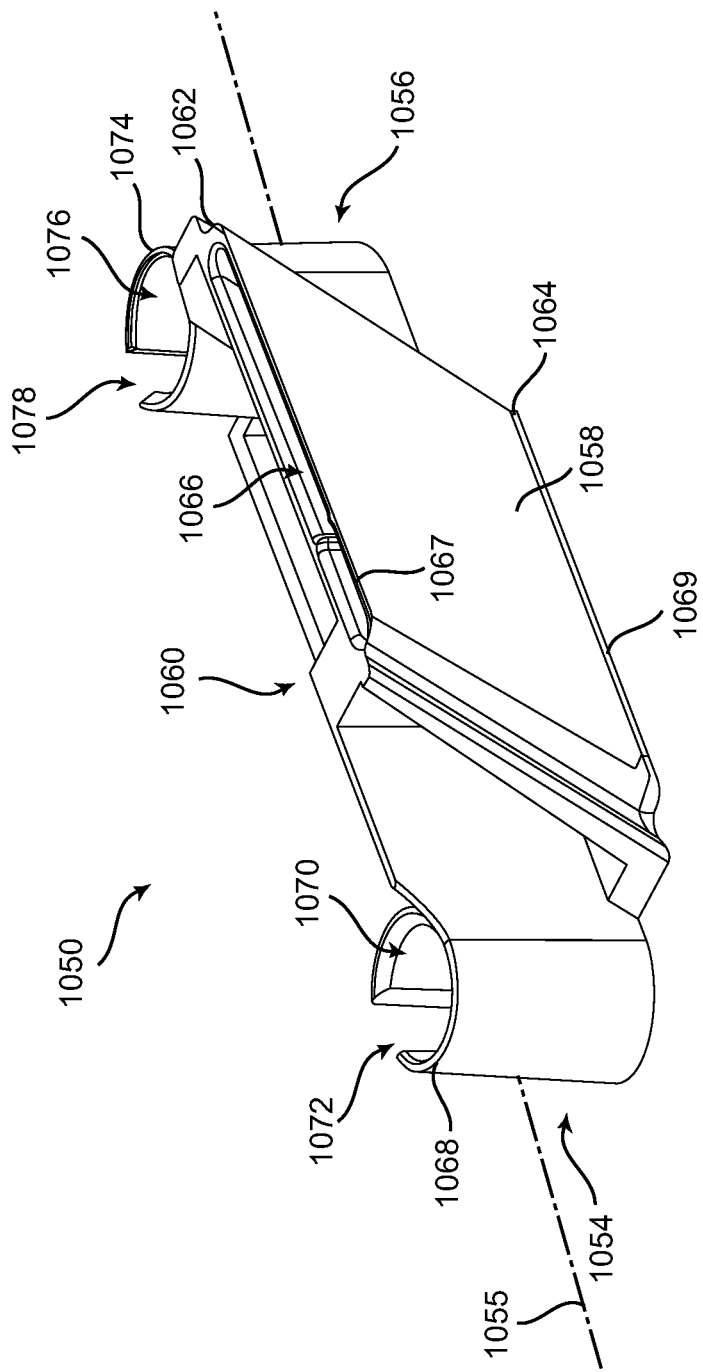
FIGS. 44C and 44D are perspective views of an antenna mount shown in FIGS. 44A and 44B in accordance with an embodiment of the present disclosure.
Figure 44D:
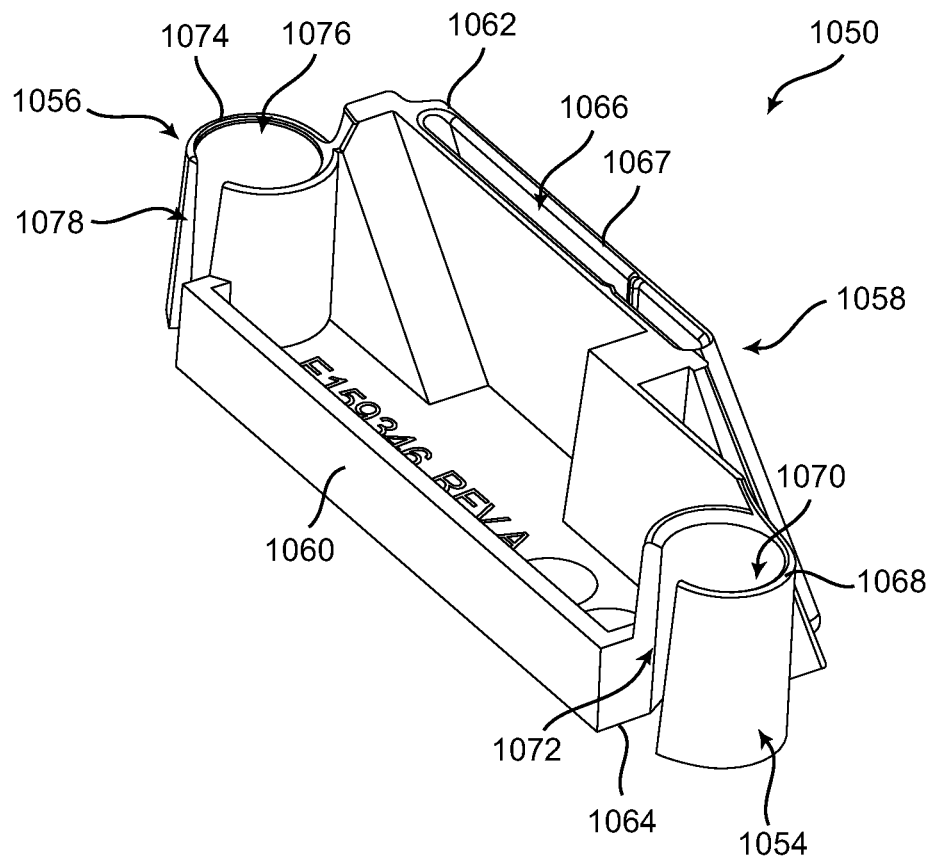
Figure 44E:
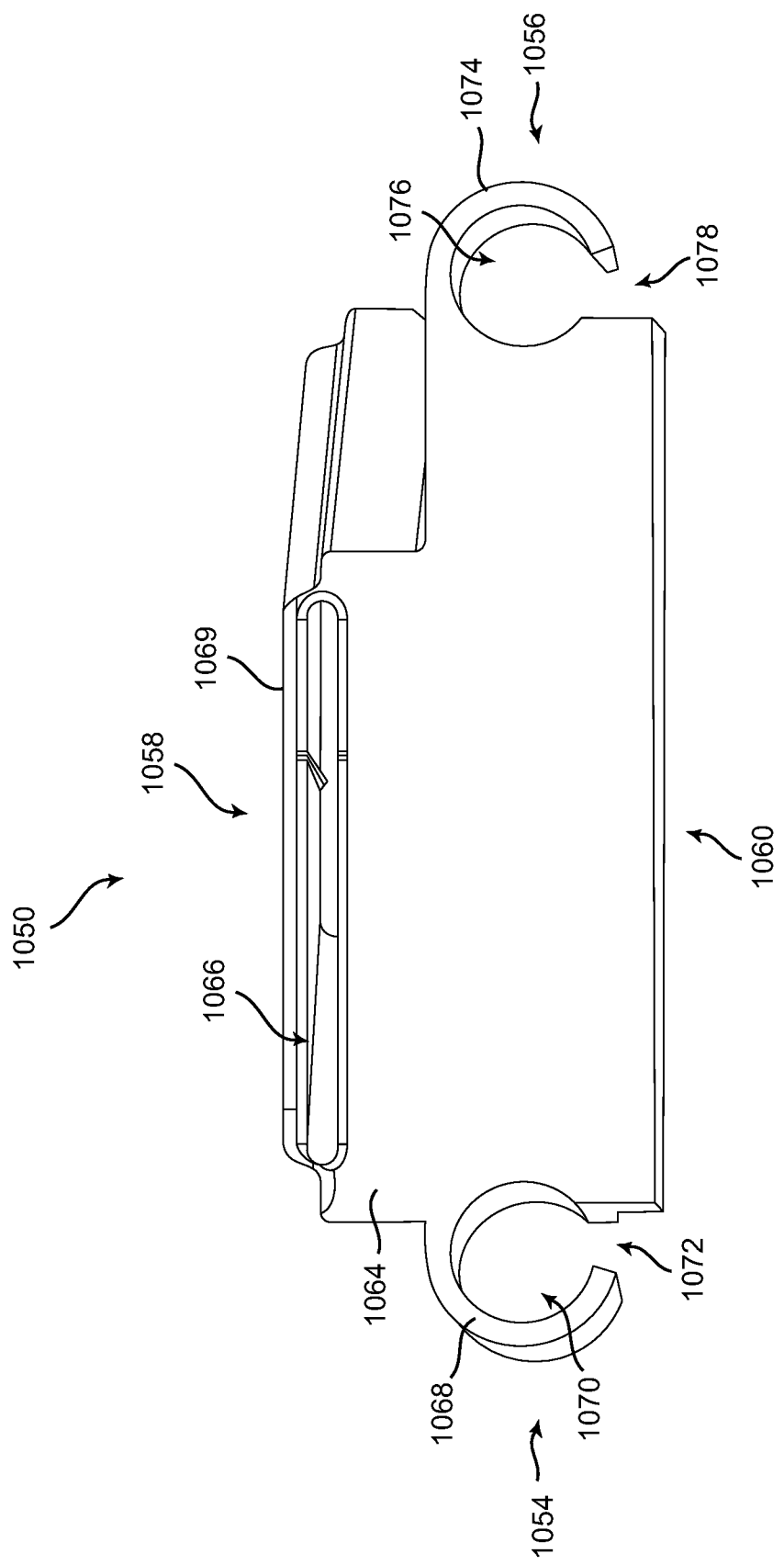
FIG. 44E is a bottom view of the antenna mount shown in FIGS. 44A and 44B.

Referring to FIGS. 44C, D, and E, various views of antenna mount 1050 are shown in accordance with the present disclosure. It is to be appreciated that antenna mounts 1050, 1052, are configured in the same manner and tubular mounting members 1090, 1094 are configured in the same manner as tubular mounting members 1096, 1098. Therefore, the description of antenna mount 1050 and the method for coupling antenna mount 1050 to tubular mounting members 1090, 1094 also describes the configuration and features of antenna mount 1052 and the method for coupling antenna mount 1052 to tubular mounting members 1096, 1098.

Mount 1050 includes sides 1054, 1056, 1058 and 1060, where sides 1054, 1056 are opposite to each other and sides 1058, 1060 are opposite to each other. Mount 1050 further includes opposite ends 1062, 1064. Mount 1050 extends from side 1054 to side 1056 along a longitudinal axis 1055. A tubular mounting member 1068 is disposed on side 1054 and a tubular mounting member 1074 is disposed on side 1056. Tubular mounting member 1068 includes a slot 1072 and a hollow interior forming a tubular channel 1070, where channel 1070 and slot 1072 extend from a first end of member 1068 to a second end of member 1068. Tubular mounting member 1074 includes a slot 1078 and a hollow interior forming a tubular channel 1076, where channel 1076 and slot 1078 extend from a first end of member 1074 to a second end of member 1074.

Mount 1050 further includes a slanted slot 1066 disposed on side 1058. A first end 1067 of slot 1066 is disposed proximately to end 1062 of mount 1050 and a second end 1069 (i.e., opposite to end 1067) of slot 1066 is disposed proximately to end 1064 of mount 1050. As shown in FIG. 44C, end 1067 of slot 1066 is disposed more proximately to side 1056 of mount 1050 than end 1069 of slot 1066 and end 1069 of slot 1066 is disposed more proximately to side 1054 of mount 1050 than end 1067 of slot 1060. In this way, slot 1066 extends from end 1067 to end 1069 of mount 1050 at an angle other than 90 degrees (e.g., in one embodiment, 45 degrees) relative to axis 1055. Slot 1066 is configured to receive and retain antenna 1002.

Figure 44F:
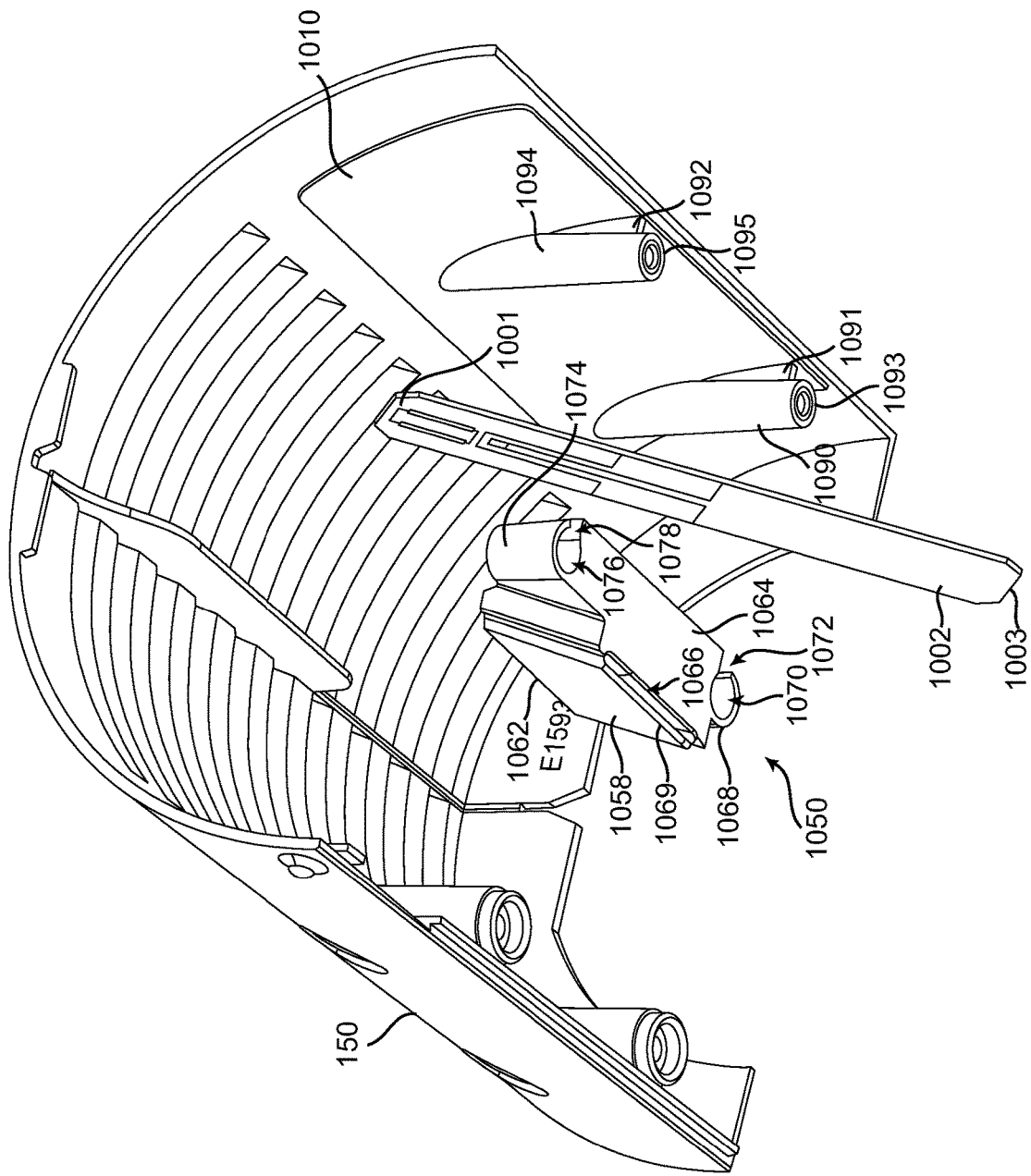
FIG. 44F is an exploded perspective view of a portion of the housing, one of the antennas mounts, and one of the antennas of the IED of FIGS. 44A and 44B.

Referring to FIG. 44F, an exploded perspective view of mount 1050, antenna 1002, and upper clam shell half 150 is shown in accordance with the present disclosure. Upper clam shell half 150 includes tubular coupling members 1090, 1094, which are coupled to interior surface 1010. Coupling member 1090 includes an end 1093 and coupling member 1094 includes end 1095. End 1093 is coupled to a coupling or extension member 1091 such that end 1093 is disposed at a distance from surface 1010. End 1095 is coupled to a coupling or extension member 1092 such that end 1095 is disposed at a distance from surface 1010.

Slots 1072, 1078 and channels 1070, 1076 are configured to enable mount 1050 to be coupled to mounting members 1090, 1094, such that mount 1050 is mounted to surface 1010. Channel 1070 is configured to receive at least a portion of coupling member 1090, slot 1072 is configured to receive at least a portion of coupling member 1091, channel 1076 is configured to receive at least a portion of coupling member 1094, and slot 1078 is configured to receive at least a portion of coupling member 1092. To mount antenna 1002 to interior surface 1010, end 1093 of tubular coupling member 1090 is disposed through channel 1070, such that tubular mounting member 1068 is disposed around a portion of tubular coupling member 1090 and coupling member 1091 is disposed through slot 1072. Furthermore, end 1095 of tubular coupling member 1094 is disposed through channel 1076, such that tubular mounting member 1074 is disposed around a portion of tubular coupling member 1094 and coupling member 1092 is disposed through slot 1078.

Figure 44G:
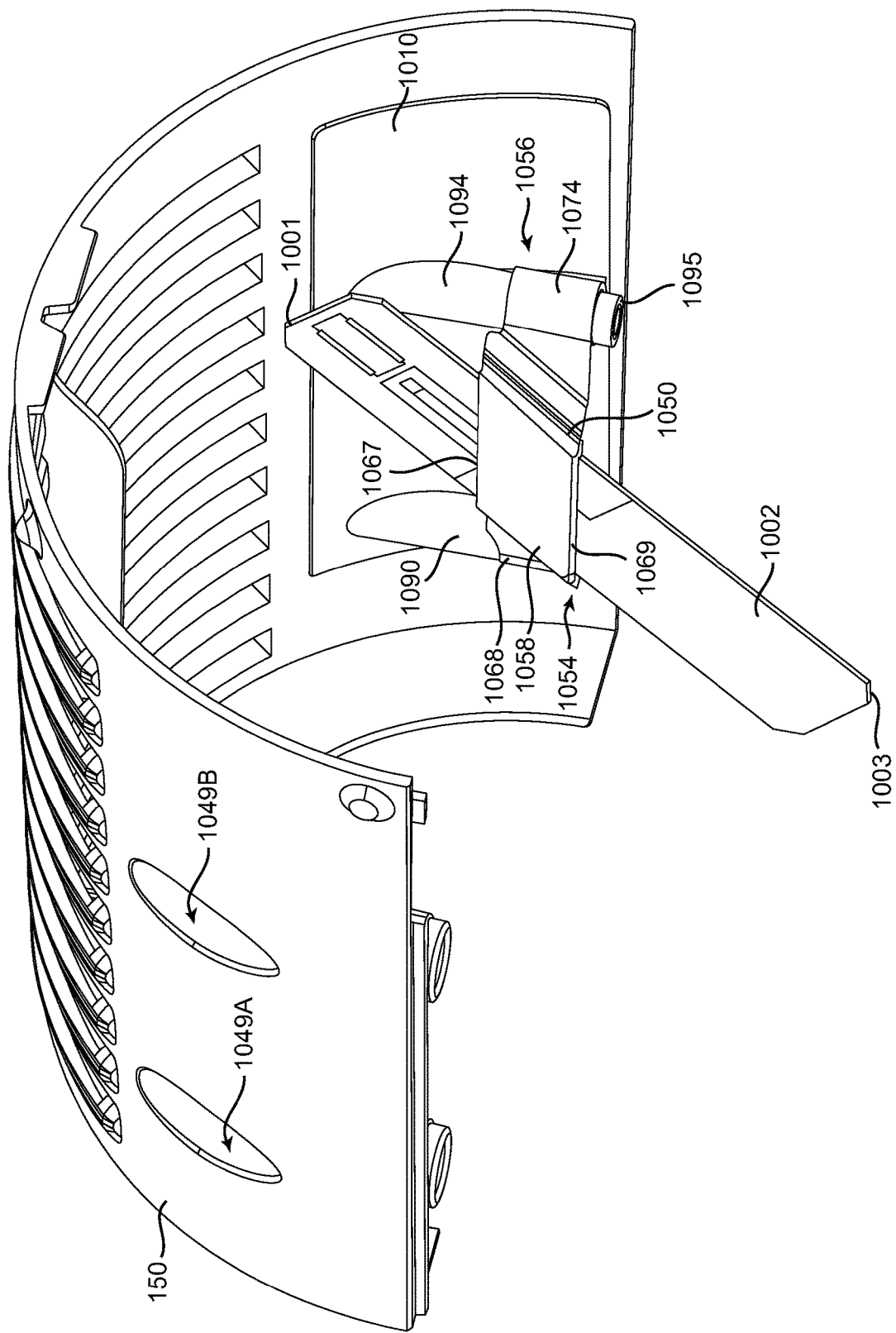
FIGS. 44G and 44H are perspective views of the components in FIG. 44F coupled together in accordance with an embodiment of the present disclosure.
Figure 44H:
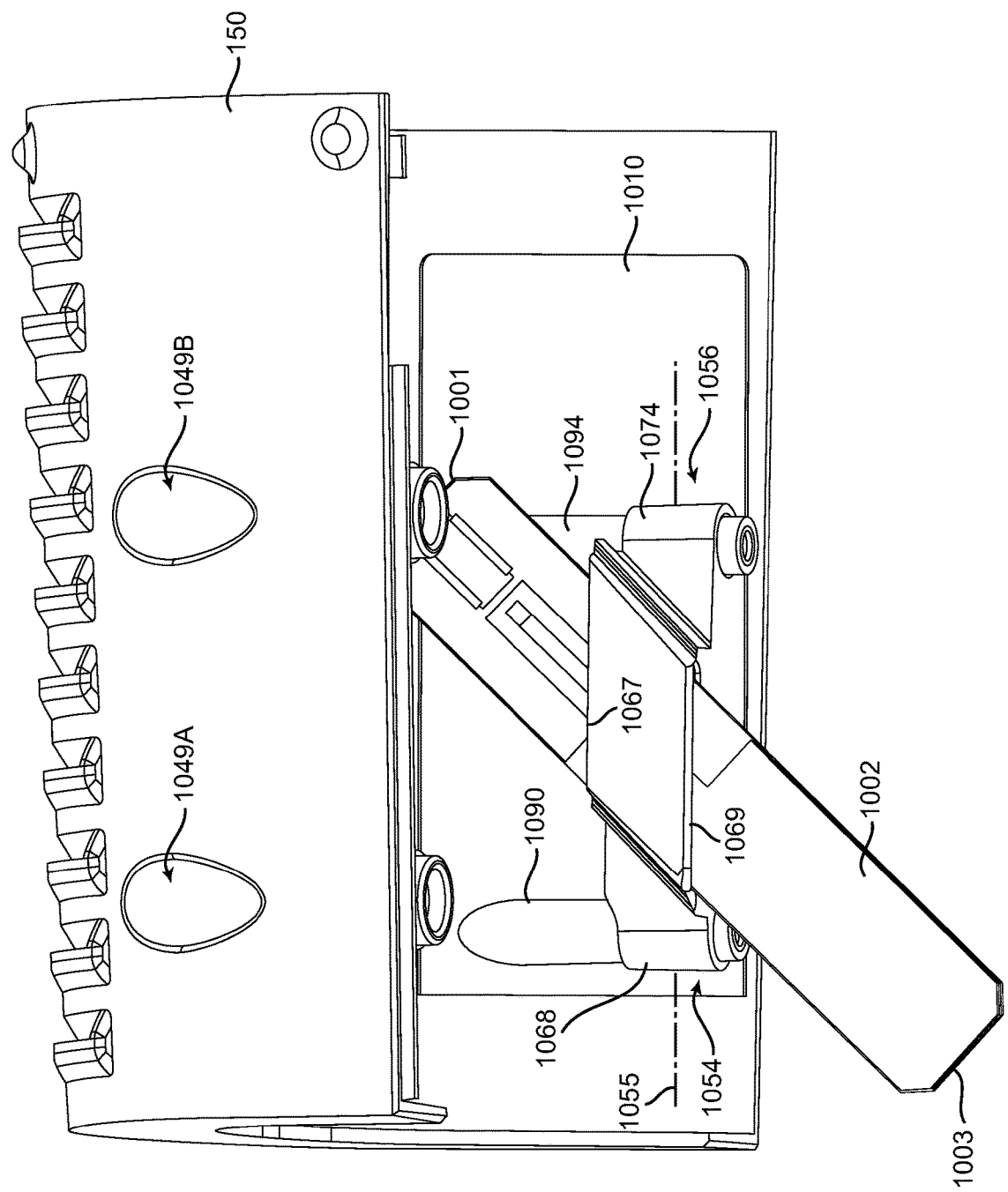

Referring to FIGS. 44G and 44H, antenna 1002 is shown mounted to interior surface 1010 via mount 1050. As described above, end 1067 of slot 1066 is disposed more proximately to side 1056 of mount 1050 than end 1069 of slot 1066, such that slot 1066 extends or slants at an angle other than 90 degrees relative to axis 1055. In this way, as shown in FIGS. 44G and 44H, when antenna 1002 is disposed through, and retained in, slot 1066, a first end 1001 of antenna 1002 disposed more proximately to side 1056 of mount 1050 than side 1054 and a second end 1003 of antenna 1002 is disposed more proximately to side 1054 than side 1056, such that antenna 1002 extends lengthwise (i.e., from end 1001 to end 1003) at an angle other than 90 degrees relative to axis 1055.

Referring to FIGS. 44A and 44B, in the manner described above with respect to antenna 1002, mounting member 1050, and tubular coupling members 1090, 1094, antenna 1004 is mounted to inner surface 1012 of half 152 via mounting member 1052 and tubular coupling members 1096, 1098 of half 152. Mounts 1050, 1052 are mounted to the inner surface of housing 102, such that the respective slots of mounts 1050, 1052 for retaining antennas 1002, 1004 are slanted or angled (i.e., with respect to axis 155) in an opposite manner. In this way, when antenna 1002 is mounted to inner surface 1010 via mount 1050 and antenna 1004 is mounted to inner surface 1012 via mount 1052, antennas 1002, 1004 each extend lengthwise (i.e., from end 1001 to end 1003 of antenna 1002 and from end 1005 to end 1007 of antenna 1004) at an angle (e.g., 90 degrees, or any other desired angle) relative to each other.

Antennas 1002, 1004 are coupled via coupling cables to a communication device of IED 100, such as, device 502, to be used for sending and receiving wireless communications by the communication device 502. It is to be appreciated that communication device 502 is configured to use antennas 1002, 1004 in any of the ways described above with respect to antennas 504, 578, 580 and/or any of the other antennas described above. In one embodiment, one of antennas 1002, 1004 is used by the communication device 502 as a main antenna and the other as a diversity antenna, in the manner described above, to improve the quality and reliability of wireless communications. It is to be appreciated that in an antenna diversity configuration configuring the antennas 1002, 1004 at an approximately 90 degree angle relative to each other, the effects of polarization/directionally of each antenna is reduced so as to not reduce the quality of the potential wireless or radio link. In a further embodiment, in addition to mounting antennas 1002, 1004 at approximately a 90 degree angle relative to each other, the antennas 1002, 1004 may be mounted at a distance of at least ¼ the wavelength (i.e., of the wireless or radio signal being used) apart from each other to ensure that at least one antenna of IED 100 is in a peak of a received wireless or radio signal. In one example, if the received wireless or radio signal is about 700 MHz, the antennas 1002, 1004 may be mounted approximately 4.21 inches apart, i.e., antenna mounts 1050, 1052 are configured to hold the respective antennas the determined distance apart.

Figure 45:
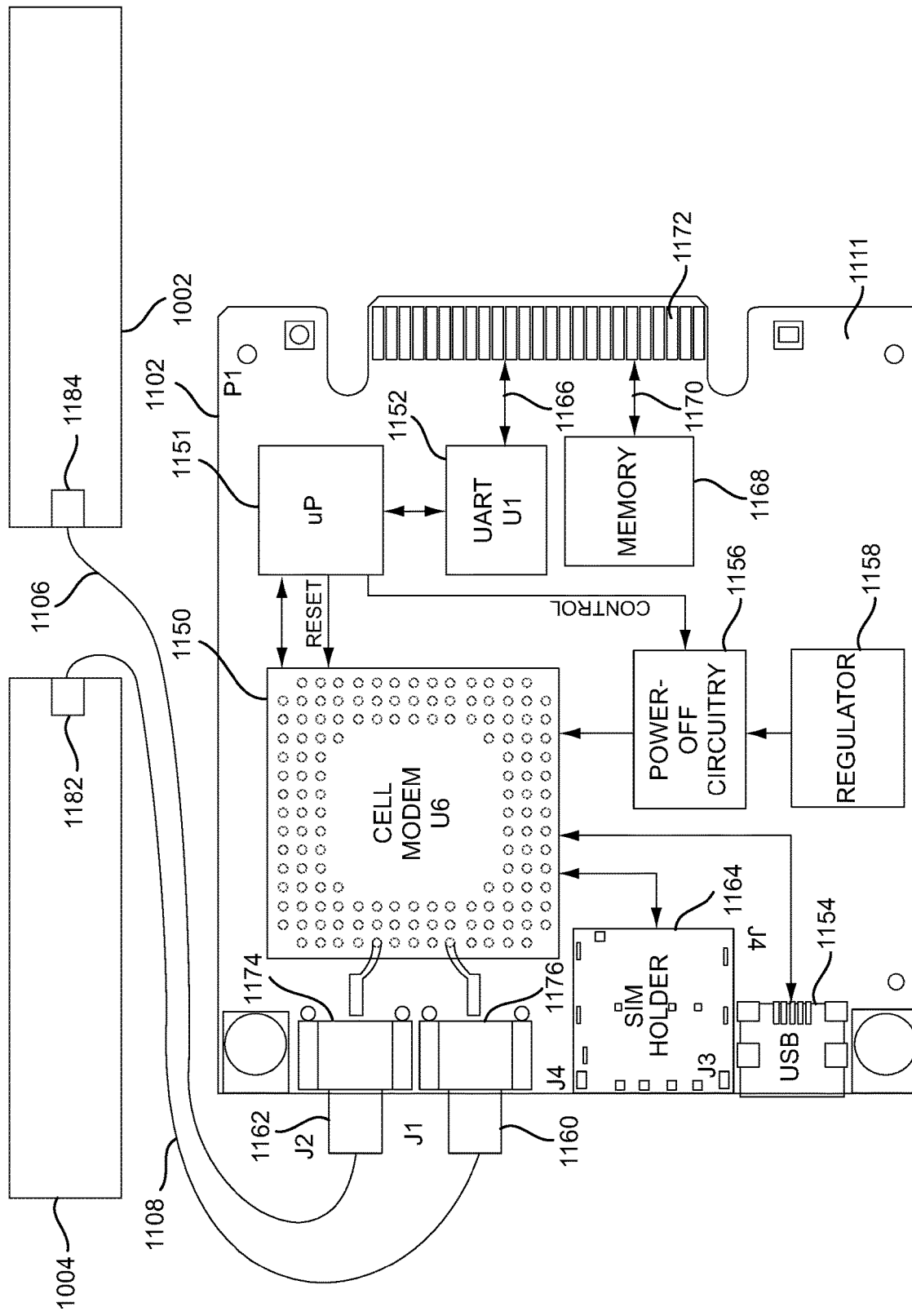
FIG. 45 illustrates a wireless communication card and two antennas in accordance with an embodiment of the present disclosure.

In one embodiment, communication device 502 is replaced by communication device 1102. Communication device 1102 is configured to be inserted into slot 324 of IED 100 and retained therein. Referring to FIG. 45, communication device 1102 is shown coupled to antennas 1002, 1004. It is to be appreciated that components 1108, 1106, 1162, 1160, 1174, 1176, 1150, 1152, 1168, 1166, 1170, 1172, 1156, 1158, 1154, 1164 of device 1102 are configured in a similar manner to components 582, 584, 508, 506, 562, 560, 574, 576, 550, 552, 568, 566, 570, 572, 556, 558, 554, 564, respectively, which were described above with respect to communication device 502. It is to be appreciated that communication device 1102 may include any of the features described above with respect to device 502.

Antennas 1002, 1004 are each coupled to cell modem 1150, where antenna 1002 is coupled to cell modem 1150 via cable 1106 and antenna 1004 is coupled to cell modem 1150 via cable 1108. It is to be appreciated that cables 1006, 1008 may be configured as any one of the types of cables described above with respect to cables 506, 508. In one embodiment, cables 1006, 1108 are coupled to cell modem 1150 via soldered connection (e.g., soldered to a surface of device 1102 and connected to cell modem 1150 via traces) to coupled antennas 1002, 1004 to cell modem 1150. In another embodiment, antennas 1002, 1004 are coupled to cell modem 1150 via communication ports 1174, 1176. In some embodiments, antenna 1002 is coupled to port 1174 via connector 1162 (e.g., a screw-on, or other type of connector) and antenna 1004 is coupled to port 1176 via connector 1160. It is to be appreciated that connectors 1160, 1162 may be configured as any of the types of connectors described above with respect to connectors 560, 562.

Cell modem 1150 is configured to use antennas 1002, 1104 for wireless communication with other devices. It is to be appreciated that communication device 1102 is configured to use antennas 1002, 1004 in any of the ways described above with respect to device 502, antennas 504, 578, 580 and/or any of the other antennas described above. In one embodiment, one of antennas 1002, 1004 is used by the communication device 1102 as a main antenna and the other as a diversity antenna, in the manner described above, to improve the quality and reliability of wireless communications. In one embodiment, the cell modem 1150 selects either of the antennas 1002, 1004 for communication use. In another embodiment, both antennas 1002, 1004 receive the same signal or at least a portion of the same signal and the cell modem 1150 multiplies the received signals to generate a composite signal having improved characteristics than either of the singly received signals.

Communication device 1102 includes processor 1151, which is coupled to cell modem 1150, power-off circuitry 1156, and UART U1 1152. Although not shown, processor 1151 is further coupled to memory 1168. UART U1 1152 is configured to send and receive communications to/from one or more processing units (e.g., a DSP of DSP board assembly 210) of IED 100. Communication received via UART U1

1152 are provided to processor 1151 to be processed in accordance with instructions stored on processor 1151 and/or memory 1168. Processor 1151 is configured to control the various functions of each of the components of device 1102. Furthermore, processor 1151 may be configured to perform one or more functions of DSP units in DSP board assembly 210. For example, processor 1151 may be configured to control cell model 1150 and/or power-off circuitry 1156. In one embodiment, processor 1151 is configured to monitor cell modem 1150 and perform a soft reset if processor 1151 determines that cell modem 1150 is not functioning properly. Processor 1151 is further configured to send a control signal to power-off circuitry 1156 to cause circuitry 1156 to provide a power off analog switch to cell modem 1150. The power off analog switch causes cell modem 1150 to perform a full reinitialization. In one embodiment, processor 1151 is configured to send a control signal to circuitry 1156 to cause the reinitialization of modem 1150 in the event that a soft reset fails.

Figure 46:
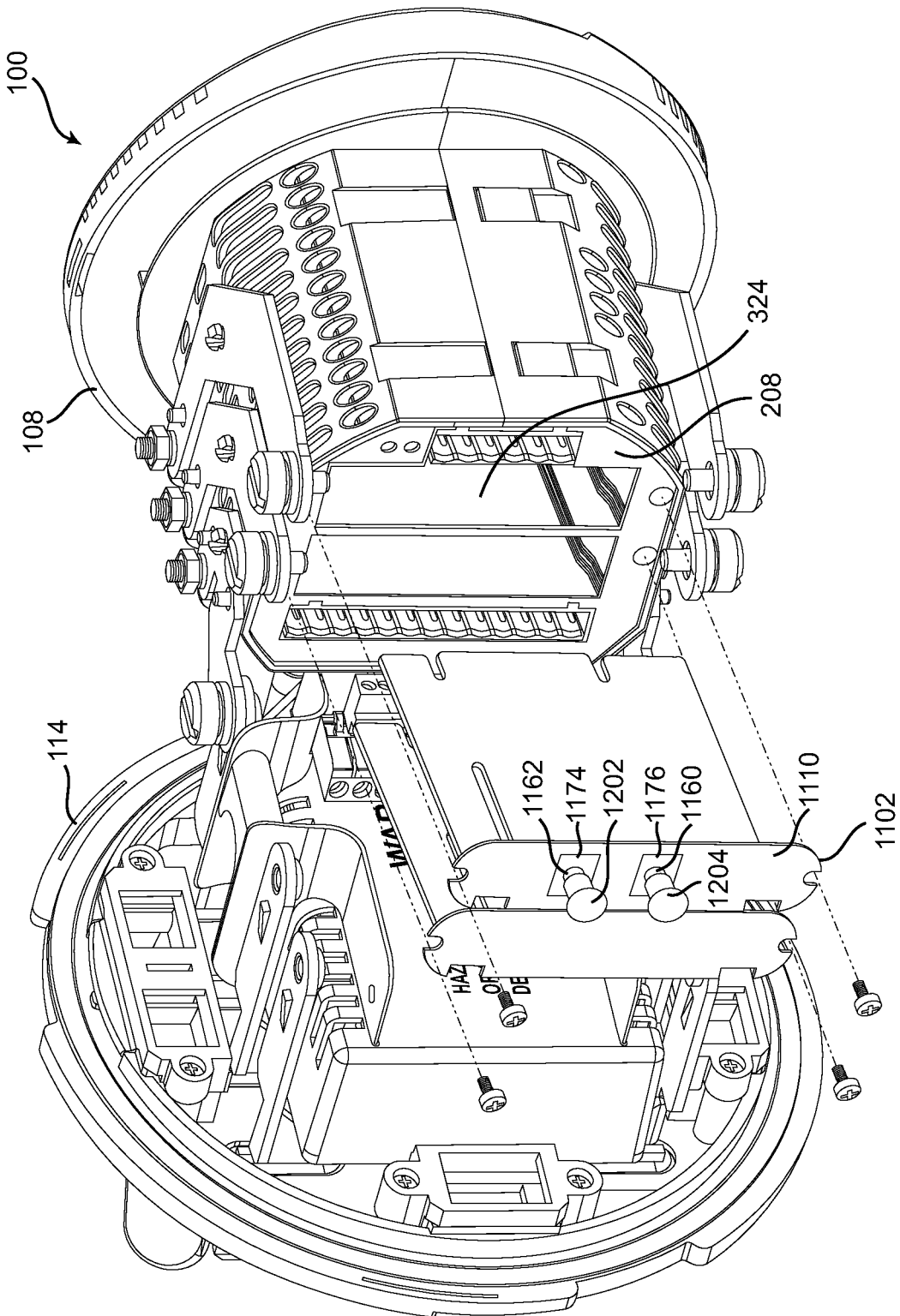
FIG. 46 illustrates an IED in an open position and a wireless communication card including two antennas coupled to a portion of the communication card in accordance with an embodiment of the present disclosure.

In one embodiment, one or more antennas may be mounted to a face plate or mounting member of communication device 1102. For example, referring to FIG. 46, communication device 1102 includes face plate or mounting member 1110. Mounting member 1110 is configured to be coupled to backplate 208 to securely retain device 1102 in slot 324. As shown in FIG. 46, ports 1174, 1176 are disposed through mounting member 1110, such that antenna connectors 1162, 1160 extend from mounting member 1110 in a direction away from device 1102. Antenna connectors 1162, 1160 are configured to be coupled to antennas 1202, 1204, respectively. Antennas 1202, 1204 are configured to extend from mounting member 1110 with a sufficiently short length to enable antennas 1202, 1204 to fit between metering sub-assembly 154 and input base module sub-assembly 156 when IED 100 is in a closed position (i.e., the current plates of metering sub-assembly 154 are each coupled to the current input blades of input base module sub-assembly 156). In one embodiment, antennas 1202, 1204 are configured as twist-on (e.g., SMA connected), stubby antennas. An exemplary antenna is a AXII stubby antenna commercially available from Lumemier of Sarasota, Fla. Antennas 1202, 1204 may be configured as right hand and/or left hand circular polarized antennas.

Antennas 1202, 1204 are coupled to communication device 1102 via connectors 1162, 1160 and ports 1174, 1176. In one embodiment, connectors 1162, 1160 are configured as male threaded connectors (e.g., male SMA connectors) and antennas 1202, 1204 are configured with female threaded connector (e.g., female SMA connectors), such that antennas 1202, 1204 can be screwed or twisted onto connectors 1162, 1160, respectively via threaded connection to couple antennas 1202, 1206. It is to be appreciated that the threaded connections may be reversed, i.e., connectors 1162, 1160 are configured as female threaded connectors (e.g., female SMA connectors) and antennas 1202, 1204 are configured with male threaded connector (e.g., male SMA connectors). Additionally, other types of connectors/connections are contemplated to be within the scope of the present disclosure such as but not limited to push-on type connections, solder-type connections, etc.

Figure 47:
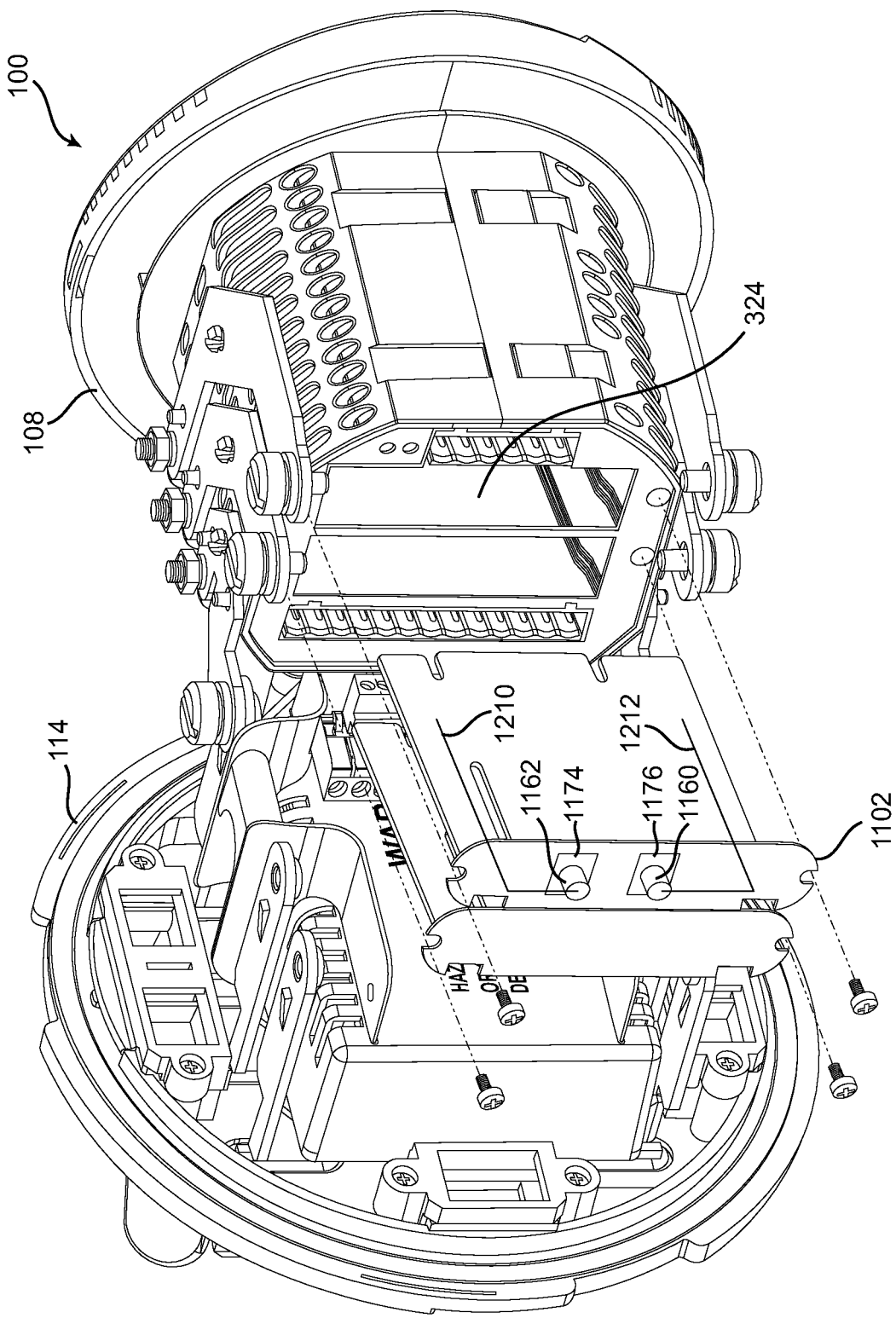
FIG. 47 illustrates an IED in an open position and a wireless communication card of including two antennas coupled to a portion of the communication card in accordance with another embodiment of the present disclosure.

It is to be appreciated that other types of antennas may be coupled to connectors 1162, 1160 for use with communication device 1102. For example, referring to FIG. 47, antennas 1210, 1212 are coupled to connectors 1162, 1160, respectively. Antennas 1210, 1212 may be wire or rod antennas that extend from connectors 1160, 1162 within the interior of housing 102. It is to be appreciated that antennas 1210, 1212 may be mounted at an angle with respect to one another (e.g., 90 degrees, or any other angle). In some embodiments, antennas 1210, 1212 are coupled to the inner surface of housing 102. Communications device 1102 is configured to use antennas 1210, 1212 in any one of the ways described above with respect to antennas 504, 578, 580, 1102, 1104, or any other antennas of the present disclosure. In one embodiment, one of antennas 1210, 1212 may be used as a diversity antenna by cell modem 1150 and the other of antennas 1210, 1212 may be used as a main antenna by cell modem 1150.

Figure 48:
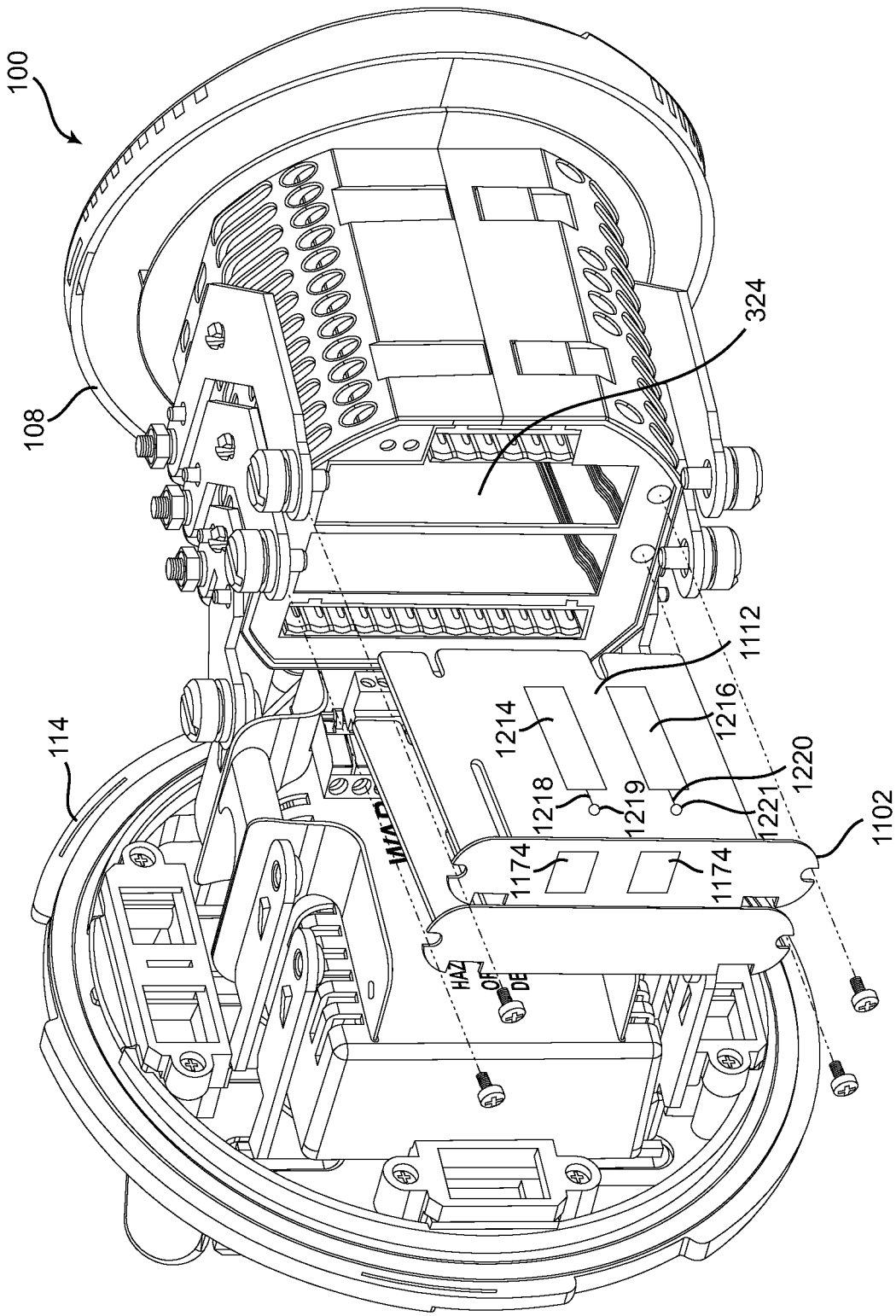
FIG. 48 illustrates an IED in an open position and a wireless communication card including two antennas coupled to a portion of the communication card in accordance with yet another embodiment of the present disclosure.

In another embodiment of the present disclosure, one or more antennas may be mounted to a side or surface of communication device 1102 that is opposite to the side or surface including the electronics (i.e., components 1150, 1151, 1152, etc., shown in FIG. 45) of communication device 1102. For example, referring to FIG. 45, the electronics of communication device 1102 are disposed on side or surface 1111 of communication device 1102. Referring to FIG. 48, antennas 1214, 1216 are coupled to a side or surface 1112 of device 1102 opposite to side or surface 1111. In one embodiment, antennas 1214, 1216 may be flat, flexible polymer monopole types antennas, e.g., strip antennas. Antennas 1214, 1216 may be coupled to side or surface 1112 via adhesive or other coupling means. In one embodiment, side 1112 is coated with an isolation material before antennas 1214, 1216 are mounted to side 1112 to avoid interference with the electronics of communication device 1102 on side 1111.

Side or surface 1112 includes through holes or vias 1219, 1221, which provide access to cell modem 1150 on side or surface 1111. Antenna 1214 is coupled to cell modem 1150 via cable or trace 1218, which is disposed through hole 1219, and antenna 1216 is coupled to cell modem 1150 via cable or trace 1220, which is disposed through hole 1219. It is to be appreciated that antennas 1214, 1216 may be coupled to the cell modem 1150 via an electrically conductive trace, the trace being formed using conventional PCB technology and methods.

In one embodiment, antennas 1214, 1216 may be coupled or mounted to surface 1112 at an angle with respect to each other (e.g., 90 degrees, or any other angle) and one of antennas 1214, 1216 may be used as a diversity antenna by cell modem 1150. In one embodiment, antennas 1214, 1216 are coupled to surface 1112 at an angle relative to each other but configured to not overlap each other. In another embodiment, the antennas 1214, 1216 are coupled to surface 1112 at an angle relative to each other but are configured to overlap each other at a central point to, for example, form a cross or "x" configuration. In this embodiment, an insulating material may be place between the two antennas 1214, 1216 where the antennas overlap so the antennas are not in contact with each other. Communications device 1102 is configured to use antennas 1214, 1216 in any one of the ways described above with respect to antennas 504, 578, 580, 1102, 1104, or any other antennas of the present disclosure. In one embodiment, one of antennas 1214, 1216 may be used as a diversity antenna by cell modem 1150 and the other of antennas 1214, 1216 may be used as a main antenna by cell modem 1150.

It is to be appreciated that each of the embodiments described above in relation to IEDs 600, 700, 800, and 900 including various antennas and antenna assemblies may be configured for use and implemented in IED 100 in accordance with the present disclosure. It is further to be appreciated that although various embodiments above have been described using two antennas in a diversity scheme, the present disclosure also contemplates using a single antenna.

In certain embodiments, the cell modem 550/1150 may recognize that only one antenna is attached and may then continue to operate in a non-diversity mode, i.e., to transmit and receive data using a single antenna.

In an even further embodiment, a first of two antennas in any of the embodiments described above is used for transmitting data and a second of the two antennas in any of the embodiments described above is used for receiving data.

It is to be appreciated that the communication device 502/1102 may operate under any of the various wireless protocols including but not limited to Bluetooth™ interconnectivity, infrared connectivity, radio transmission connectivity including computer digital signal broadcasting and reception commonly referred to as Wi-Fi™ or 802.11.X (where x denotes the type of transmission), satellite transmission or any other type of communication protocols, communication architecture or systems currently existing or to be developed for wirelessly transmitting data including spread spectrum 900 MHz, or other frequencies, ZigBee™, WiFi™ or any mesh enabled wireless communication.

It is further to be appreciated that any communication port (e.g., port 112, modem, Ethernet) may be disabled via a secure communication session, a front panel interface, etc., also known as port hardening. A user, e.g., via a secure session, may turn off any or all ports independently. Additionally, a user is enabled to change port number assignments for all protocols, e.g., Ethernet protocols.

It is to be appreciated that the various features shown and described are interchangeable, that is a feature shown in one embodiment may be incorporated into another embodiment.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. An intelligent electronic device for monitoring power usage of an electrical circuit comprising:
   a housing including an interior;
   at least one sensor coupled to the electric circuit, the at least one sensor measures at least one parameter of the electrical circuit and generates at least one analog signal indicative of the at least one parameter;
   at least one analog to digital converter coupled to the at least one sensor, the at least one analog to digital converter receives the at least one analog signal and converts the at least one analog signal to at least one digital signal;
   at least one first processor that receives the at least one digital signal and calculates at least one power parameter of the electrical circuit; and
   a removable communication card disposed in the interior of the housing that receives the calculated at least one power parameter from the at least one processor and wirelessly transmits the calculated at least one power parameter to at least one other device, the communication card including at least one first antenna and at least one second antenna, wherein the at least one first antenna is configured as a main antenna and the at least one second antenna is configured as a diversity antenna;
   wherein the communication card receives the at least one analog signal via the at least one first antenna and/or the at least one second antenna and the communication card further comprises at least one second processor that determines which of the at least one first and the at least one second antenna is receiving a strongest signal and selects the determined antenna for communications to the at least one other device.

2. The intelligent electronic device of claim 1, wherein the communication card includes a mounting member that retains the communication card in the housing, the mounting member including at least two connectors that couple the at least one first antenna and the at least one second antenna to the communication card, the at least two connectors extend from the mounting member in a direction away from the interior of the housing.

3. The intelligent electronic device of claim 2, wherein the at least one first antenna and the at least one second antenna are twist-on stubby antennas.

4. The intelligent electronic device of claim 2, wherein the at least one first antenna and the at least one second antenna are wire antennas.

5. The intelligent electronic device of claim 4, wherein the at least one first antenna and the at least one second antenna are mounted at a predetermined angle relative to each other.

6. The intelligent electronic device of claim 5, wherein the predetermined angle is about 90 degrees.

7. The intelligent electronic device of claim 4, wherein the at least one first antenna and the at least one second antenna are mounted at a predetermined distance relative to each other, the predetermined distance is determined by a wavelength used to transmit the calculated at least one power parameter.

8. The intelligent electronic device of claim 7, wherein the predetermined distance is about a ¼ of the wavelength.

9. The intelligent electronic device of claim 4, wherein the at least one first antenna and the at least one second antenna are mounted at a predetermined distance and predetermined angle relative to each other, the predetermined distance is about a ¼ of a wavelength used to transmit the calculated at least one power parameter and the predetermined angle is about 90 degrees.

10. The intelligent electronic device of claim 1, wherein the housing is selected from the group consisting of a socket type meter housing, a panel meter type housing, a switchboard type meter housing and A-base type meter housing.

11. The intelligent electronic device of claim 1, wherein the communication card wirelessly transmits via at least one of 2G communication protocol, 3G communication protocol and/or 4G/LTE communication protocol.

12. The intelligent electronic device of claim 1, wherein the communication card further comprises at least one memory that stores a IP stack with TCP and/or UDP protocols.

13. The intelligent electronic device of claim 1, wherein the communication card is configured to communicate wirelessly via at least one protocol, wherein the at least one protocol includes Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA) and/or Integrated Digital Enhanced Network (iDEN).

14. The intelligent electronic device of claim 1, wherein the at least one first antenna and the at least one second antenna are mounted to a first surface of the communication card.

15. The intelligent electronic device of claim 14, wherein the at least one first antenna and the at least one second antenna are mounted at a predetermined angle relative to each other.

16. The intelligent electronic device of claim 15, wherein the predetermined angle is about 90 degrees.

17. The intelligent electronic device of claim 14, wherein the at least one first antenna and the at least one second antenna are mounted at a predetermined angle relative to each other and to overlap each other at a central point to form cross configuration.

18. The intelligent electronic device of claim 17, further comprising an insulating material disposed between the at least one first antenna and the at least one second antenna so the at least one first antenna and the at least one second antenna are not in contact with each other.

19. The intelligent electronic device of claim 4, wherein the wire antennas are coupled to an inner surface of the housing.

20. The intelligent electronic device of claim 14, wherein each of the at least one first antenna and the at least one second antenna is a flat, flexible polymer monopole type antenna.

21. The intelligent electronic device of claim 14, wherein the first surface of the communication card includes an isolation material applied thereto before the mounting of the at least one first antenna and the at least one second antenna to prevent interface with electronics disposed on a second, opposite surface of the communication card.

22. The intelligent electronic device of claim 1, wherein the communication card receives the at least one signal via the at least one first antenna and/or the at least one second antenna and the at least one second processor combines the at least one signal receive from the at least one first antenna and the at least one second antenna to produce a single signal, the single signal being a stronger signal than the at least one signal being received at the at least one first antenna and the at least one second antenna.

23. The intelligent electronic device of claim 1, wherein the communication card receives at least a portion of the at least one signal via the at least one first antenna and the at least one second antenna and the at least one second processor multiplies the received signals to generate a single composite signal, the single composite signal having improved characteristics than the received portion of the at least one signal.

24. The intelligent electronic device of in claim 1, wherein the at least one first antenna and the at least one second antenna are configured as a MIMO (multiple in and multiple out) type antenna system.

25. The intelligent electronic device as in claim 1, wherein each of the at least one first antenna and the at least one second antenna is tuned to at least one predetermined frequency band, the at least one first antenna and the at least one second antenna being positioned to optimize correlation patterns therebetween.

* * * * *